United States Patent
LeTourneau

(10) Patent No.: US 11,243,975 B2
(45) Date of Patent: *Feb. 8, 2022

(54) METHOD AND/OR SYSTEM FOR TRANSFORMING BETWEEN TREES AND STRINGS

(71) Applicant: Robert T. and Virginia T. Jenkins as Trustees of the Jenkins Family Trust Dated Feb. 8, 2002, Sacramento, CA (US)

(72) Inventor: Jack J. LeTourneau, Ventura, CA (US)

(73) Assignee: Robert T. and Virginia T. Jenkins, Sacramento, CA (US), as Trustees of the Jenkins Family Trust Dated Feb. 8, 2002

( * ) Notice: Subject to any disclaimer, the term of this patent is extended or adjusted under 35 U.S.C. 154(b) by 0 days.

This patent is subject to a terminal disclaimer.

(21) Appl. No.: 16/898,134

(22) Filed: Jun. 10, 2020

(65) Prior Publication Data

US 2020/0372041 A1  Nov. 26, 2020

Related U.S. Application Data

(63) Continuation of application No. 16/164,430, filed on Oct. 18, 2018, now Pat. No. 10,713,274, which is a
(Continued)

(51) Int. Cl.
*G06F 16/25* (2019.01)
*G06F 16/21* (2019.01)
(Continued)

(52) U.S. Cl.
CPC ............ *G06F 16/258* (2019.01); *G06F 16/21* (2019.01); *G06F 16/2246* (2019.01); *G06F 16/282* (2019.01); *G06F 16/9027* (2019.01)

(58) Field of Classification Search
CPC .... G06F 16/258; G06F 16/21; G06F 16/2246; G06F 16/282; G06F 16/9027
(Continued)

(56) References Cited

U.S. PATENT DOCUMENTS 3,201,701 A    8/1965   Maitra
3,704,345 A   11/1972   Coker
(Continued)

OTHER PUBLICATIONS

Yang et al, "Interactive Hierarchical Dimension Ordering, Spacing and Filtering for Exploration of High Dimensional Datasets", IEEE , pp. 1-8 (Year: 2013).*
(Continued)

*Primary Examiner* — Anil Khatri
(74) *Attorney, Agent, or Firm* — Berkeley Law & Technology Group, LLP

(57) ABSTRACT

Embodiments of articles, apparatuses, devices and/or systems transform a database, or portion thereof, to one or more first expressions in a second view. Signal values for the one or more first expression in the first view are accessed from one or more physical memory devices. The signal values for the first expression in the first view are transformed to signal values for the first expression in the second view.

24 Claims, 14 Drawing Sheets

Related U.S. Application Data continuation of application No. 15/411,823, filed on Jan. 20, 2017, now Pat. No. 10,140,349, which is a continuation of application No. 14/614,292, filed on Feb. 4, 2015, now Pat. No. 9,563,653, which is a continuation of application No. 13/860,482, filed on Apr. 10, 2013, now Pat. No. 8,990,769, which is a continuation of application No. 12/702,243, filed on Feb. 8, 2010, now Pat. No. 8,443,339, which is a continuation of application No. 11/361,500, filed on Feb. 23, 2006, now Pat. No. 7,681,177.

(60) Provisional application No. 60/657,264, filed on Feb. 28, 2005.

(51) Int. Cl.
*G06F 16/28* (2019.01)
*G06F 16/22* (2019.01)
*G06F 16/901* (2019.01)

(58) Field of Classification Search
USPC .................................................. 707/756, 705
See application file for complete search history.

(56) References Cited

U.S. PATENT DOCUMENTS

| | | | | |
|---|---|---|---|---|
| 4,001,951 | A | 1/1977 | Fasse | |
| 4,134,218 | A | 1/1979 | Adams | |
| 4,156,910 | A | 5/1979 | Barton | |
| 4,286,330 | A | 8/1981 | Isaacson | |
| 4,439,162 | A | 3/1984 | Blaine | |
| 4,677,550 | A | 6/1987 | Ferguson | |
| 4,737,109 | A | 4/1988 | Abramson | |
| 4,745,561 | A | 5/1988 | Hirosawa | |
| 4,751,684 | A | 6/1988 | Holt | |
| 4,831,525 | A | 5/1989 | Saito | |
| 4,867,686 | A | 9/1989 | Goldstein | |
| 4,905,138 | A | 1/1990 | Bourne | |
| 4,916,655 | A * | 4/1990 | Ohsone | G06F 16/90344 |
| 4,931,928 | A | 6/1990 | Greenfeld | |
| 4,949,388 | A | 8/1990 | Bhaskaran | |
| 4,989,132 | A | 1/1991 | Mellender | |
| 4,991,087 | A | 2/1991 | Burkowski | |
| 5,010,478 | A * | 4/1991 | Deran | G06F 16/40 |
| 5,021,943 | A | 6/1991 | Grimes | |
| 5,021,992 | A | 6/1991 | Kondo | |
| 5,050,071 | A | 9/1991 | Harris | |
| 5,136,593 | A | 8/1992 | Moon | |
| 5,191,522 | A | 3/1993 | Bosco | |
| 5,235,701 | A | 8/1993 | Ohler | |
| 5,265,245 | A | 11/1993 | Nordstrom | |
| 5,295,261 | A | 3/1994 | Simonetti | |
| 5,325,531 | A | 6/1994 | McKeeman | |
| 5,335,320 | A | 8/1994 | Iwata | |
| 5,335,345 | A | 8/1994 | Frieder | |
| 5,355,496 | A | 10/1994 | Fant | |
| 5,450,581 | A * | 9/1995 | Bergen | G06F 16/258 |
| 5,463,777 | A | 10/1995 | Bialkowski | |
| 5,493,504 | A | 2/1996 | Minato | |
| 5,493,678 | A | 2/1996 | Arcuri | |
| 5,497,500 | A | 3/1996 | Rogers | |
| 5,509,088 | A | 4/1996 | Robson | |
| 5,511,159 | A * | 4/1996 | Baker | C12N 15/11 715/700 |
| 5,519,627 | A | 5/1996 | Mahmood | |
| 5,522,068 | A | 5/1996 | Berkowitz | |
| 5,544,301 | A | 8/1996 | Orton | |
| 5,548,755 | A * | 8/1996 | Leung | G06F 16/24547 |
| 5,577,253 | A | 11/1996 | Blickstein | |
| 5,598,350 | A | 1/1997 | Kawanishi | |
| 5,606,669 | A | 2/1997 | Bertin | |
| 5,636,155 | A | 6/1997 | Kabuo | |
| 5,687,362 | A | 11/1997 | Bhargava | |
| 5,706,406 | A | 1/1998 | Pollock | |
| 5,724,512 | A | 3/1998 | Winterbottom | |
| 5,724,576 | A | 3/1998 | Letourneau | |
| 5,742,806 | A | 4/1998 | Reiner | |
| 5,745,892 | A | 4/1998 | Miyata | |
| 5,748,975 | A | 5/1998 | Van De Vanter | |
| 5,758,152 | A | 5/1998 | Letourneau | |
| 5,778,354 | A | 7/1998 | Leslie | |
| 5,778,371 | A | 7/1998 | Fujihara | |
| 5,781,906 | A | 7/1998 | Aggarwal | |
| 5,784,557 | A | 7/1998 | Oprescu | |
| 5,787,415 | A | 7/1998 | Jacobson | |
| 5,787,432 | A | 7/1998 | Letourneau | |
| 5,796,356 | A | 8/1998 | Okada | |
| 5,802,370 | A | 9/1998 | Sitbon | |
| 5,822,593 | A | 10/1998 | Lamping | |
| 5,826,262 | A | 10/1998 | Bui | |
| 5,838,319 | A | 11/1998 | Guzak | |
| 5,848,159 | A | 12/1998 | Collins | |
| 5,930,805 | A | 7/1999 | Marquis | |
| 5,937,181 | A | 8/1999 | Godefroid | |
| 5,960,425 | A | 8/1999 | Buneman | |
| 5,970,490 | A * | 10/1999 | Morgenstern | G06F 16/258 |
| 5,978,790 | A | 11/1999 | Buneman | |
| 5,987,449 | A | 11/1999 | Suciu | |
| 5,999,926 | A | 12/1999 | Suciu | |
| 6,002,879 | A | 12/1999 | Radigan | |
| 6,003,033 | A | 12/1999 | Amano | |
| 6,022,879 | A | 2/2000 | Crow | |
| 6,028,987 | A | 2/2000 | Hirairi | |
| 6,055,537 | A | 4/2000 | Letourneau | |
| 6,076,087 | A | 6/2000 | Suciu | |
| 6,088,691 | A | 7/2000 | Bhargava | |
| 6,141,655 | A | 10/2000 | Johnson | |
| 6,199,059 | B1 * | 3/2001 | Dahan | G06F 16/2423 |
| 6,199,103 | B1 | 3/2001 | Sakuguchi | |
| 6,236,410 | B1 | 5/2001 | Politis | |
| 6,240,418 | B1 | 5/2001 | Shadmon | |
| 6,243,859 | B1 | 6/2001 | Chen-Kuang | |
| 6,272,495 | B1 | 8/2001 | Hetherington | |
| 6,279,007 | B1 | 8/2001 | Uppala | |
| 6,289,354 | B1 | 9/2001 | Aggarwal | |
| 6,292,938 | B1 | 9/2001 | Sarkar | |
| 6,314,559 | B1 | 11/2001 | Sollich | |
| 6,336,812 | B1 | 1/2002 | Cooper | |
| 6,341,372 | B1 | 1/2002 | Datig | |
| 6,377,953 | B1 | 4/2002 | Gawlick | |
| 6,411,957 | B1 | 6/2002 | Dijkstra | |
| 6,442,584 | B1 | 8/2002 | Kolli | |
| 6,446,256 | B1 | 9/2002 | Hymen | |
| 6,466,240 | B1 | 10/2002 | Maslov | |
| 6,480,857 | B1 | 11/2002 | Chandler | |
| 6,499,036 | B1 * | 12/2002 | Gurevich | G06F 9/542 707/778 |
| 6,505,205 | B1 | 1/2003 | Kothuri | |
| 6,542,899 | B1 | 4/2003 | Saulpaugh | |
| 6,550,024 | B1 | 4/2003 | Pagurek | |
| 6,556,983 | B1 | 4/2003 | Altschuler | |
| 6,598,052 | B1 | 7/2003 | Saulpaugh | |
| 6,598,502 | B1 | 7/2003 | Rosa | |
| 6,606,632 | B1 | 8/2003 | Saulpaugh | |
| 6,606,741 | B2 | 8/2003 | Kojima | |
| 6,609,130 | B1 | 8/2003 | Saulpaugh | |
| 6,610,106 | B1 | 8/2003 | Jenks | |
| 6,611,844 | B1 | 8/2003 | Saulpaugh | |
| 6,640,218 | B1 | 10/2003 | Golding | |
| 6,658,649 | B1 | 12/2003 | Bates | |
| 6,665,664 | B2 * | 12/2003 | Paulley | G06F 16/24534 |
| 6,687,734 | B1 | 2/2004 | Sellink | |
| 6,691,301 | B2 | 2/2004 | Bowen | |
| 6,714,939 | B2 | 3/2004 | Saldanha | |
| 6,728,953 | B1 | 4/2004 | Walster | |
| 6,742,054 | B1 * | 5/2004 | Upton, IV | G06F 40/14 710/6 |
| 6,745,384 | B1 | 6/2004 | Biggerstaff | |
| 6,748,378 | B1 | 6/2004 | Lavender | |
| 6,763,515 | B1 | 7/2004 | Vazquez | |
| 6,785,673 | B1 | 8/2004 | Fernandez | |

(56) References Cited

U.S. PATENT DOCUMENTS

| | | | |
|---|---|---|---|
| 6,795,868 B1 * | 9/2004 | Dingman | G06F 16/258 |
| | | | 709/246 |
| 6,804,677 B2 | 10/2004 | Shadmon | |
| 6,817,865 B2 | 11/2004 | Charbonneau | |
| 6,829,695 B1 | 12/2004 | Ross | |
| 6,847,979 B2 | 1/2005 | Allemang | |
| 6,854,976 B1 | 2/2005 | Suhr | |
| 6,874,005 B2 | 3/2005 | Fortenberry | |
| 6,880,148 B1 | 4/2005 | Raph | |
| 6,941,511 B1 | 9/2005 | Hind | |
| 6,965,990 B2 | 11/2005 | Barsness | |
| 6,968,330 B2 | 11/2005 | Edwards | |
| 6,978,271 B1 | 12/2005 | Hoffman | |
| 7,043,555 B1 | 5/2006 | McClain | |
| 7,051,033 B2 | 5/2006 | Agarwal | |
| 7,072,904 B2 | 7/2006 | Najork | |
| 7,103,838 B1 | 9/2006 | Krishnamurthy | |
| 7,107,265 B1 | 9/2006 | Calvignac | |
| 7,111,016 B2 | 9/2006 | Gurevich | |
| 7,117,196 B2 | 10/2006 | Gaur | |
| 7,117,479 B2 | 10/2006 | Van De Vanter | |
| 7,127,704 B2 | 10/2006 | Van De Vanter et al. | |
| 7,134,075 B2 | 11/2006 | Hind | |
| 7,139,765 B1 | 11/2006 | Balkany | |
| 7,140,006 B2 | 11/2006 | Harrison | |
| 7,162,485 B2 | 1/2007 | Gottlobb | |
| 7,167,856 B2 * | 1/2007 | Lawder | G06F 16/2264 |
| 7,190,376 B1 | 3/2007 | Tonisson | |
| 7,191,182 B2 | 3/2007 | Anonsen | |
| 7,203,680 B2 | 4/2007 | Parida | |
| 7,203,774 B1 | 4/2007 | Zhou | |
| 7,225,183 B2 | 5/2007 | Gardner | |
| 7,225,199 B1 * | 5/2007 | Green | G06F 40/30 |
| 7,287,026 B2 | 10/2007 | Oommen | |
| 7,313,563 B2 | 12/2007 | Bordawekar | |
| 7,318,066 B2 * | 1/2008 | Kaufman | G06F 16/252 |
| 7,318,215 B1 | 1/2008 | Krishnan | |
| 7,337,163 B1 | 2/2008 | Srinivasan | |
| 7,356,802 B2 | 4/2008 | De Sutter | |
| 7,360,202 B1 | 4/2008 | Seshadri | |
| 7,392,239 B2 | 6/2008 | Fontoura | |
| 7,409,673 B2 | 8/2008 | Kuo | |
| 7,419,376 B2 | 9/2008 | Sarvazyan | |
| 7,421,648 B1 | 9/2008 | Davis | |
| 7,437,666 B2 | 10/2008 | Ramarao | |
| 7,475,070 B2 | 1/2009 | Fan | |
| 7,496,892 B2 | 2/2009 | Nuss | |
| 7,512,932 B2 | 3/2009 | Davidov | |
| 7,536,675 B2 | 5/2009 | Gallagher | |
| 7,536,676 B2 | 5/2009 | Baker | |
| 7,544,062 B1 | 6/2009 | Hauschild | |
| 7,561,927 B2 | 7/2009 | Oyama | |
| 7,571,156 B1 | 8/2009 | Gupta | |
| 7,571,169 B2 | 8/2009 | Jones | |
| 7,574,692 B2 | 8/2009 | Herscu | |
| 7,575,434 B2 | 8/2009 | Palakodeti | |
| 7,620,632 B2 | 11/2009 | Andrews | |
| 7,627,591 B2 | 12/2009 | Letourneau | |
| 7,630,995 B2 | 12/2009 | Letourneau | |
| 7,636,727 B2 | 12/2009 | Schiffmann | |
| 7,650,592 B2 | 1/2010 | Eckels | |
| 7,669,183 B2 | 2/2010 | Bowman | |
| 7,681,177 B2 | 3/2010 | Letourneau | |
| 7,720,830 B2 | 5/2010 | Wen | |
| 7,761,847 B2 | 7/2010 | Kornerup | |
| 7,761,858 B2 | 7/2010 | Chang | |
| 7,765,183 B2 | 7/2010 | Williams, Jr. | |
| 7,779,396 B2 | 8/2010 | Meijer | |
| 7,801,923 B2 | 9/2010 | Letourneau | |
| 7,827,523 B2 | 11/2010 | Ahmed | |
| 7,861,304 B1 | 12/2010 | Nachenberg | |
| 7,882,147 B2 | 2/2011 | Letourneau | |
| 7,890,471 B2 | 2/2011 | Fan | |
| 7,890,927 B2 | 2/2011 | Eldridge | |
| 7,890,928 B2 | 2/2011 | Patrudu | |
| 7,899,821 B1 | 3/2011 | Schiffmann | |
| 7,962,494 B2 | 6/2011 | Furusho | |
| 8,005,869 B2 | 8/2011 | Corl | |
| 8,020,145 B2 | 9/2011 | Fant | |
| 8,032,860 B2 | 10/2011 | Piehler | |
| 8,037,102 B2 | 10/2011 | Letourneau | |
| 8,060,868 B2 | 11/2011 | Meijer | |
| 8,086,998 B2 | 12/2011 | Bansal | |
| 8,112,740 B2 | 2/2012 | Meijer | |
| 8,151,276 B2 | 4/2012 | Grechanik | |
| 8,181,155 B2 | 5/2012 | Pinto | |
| 8,203,972 B2 | 6/2012 | Sauermann | |
| 8,230,526 B2 | 7/2012 | Holland | |
| 8,250,526 B2 | 8/2012 | Anderson | |
| 8,307,102 B2 * | 11/2012 | Skog | H04W 88/02 |
| | | | 709/230 |
| 8,316,059 B1 | 11/2012 | Schiffmann | |
| 8,332,428 B2 * | 12/2012 | Bonneau | G06Q 40/06 |
| | | | 707/772 |
| 8,356,040 B2 | 1/2013 | Letourneau | |
| 8,365,137 B2 | 1/2013 | Fant | |
| 8,438,534 B2 | 5/2013 | Thomson | |
| 8,443,339 B2 | 5/2013 | Letourneau | |
| 8,458,191 B2 | 6/2013 | Bhattacharjee | |
| 8,484,236 B1 | 7/2013 | Andrews | |
| 8,606,794 B2 | 12/2013 | Amer-Yahia | |
| 8,612,461 B2 | 12/2013 | Schiffmann | |
| 8,615,530 B1 | 12/2013 | Letourneau | |
| 8,626,777 B2 | 1/2014 | Letourneau | |
| 8,645,346 B2 * | 2/2014 | Dumitru | G06F 16/2471 |
| | | | 707/705 |
| 8,650,201 B2 | 2/2014 | Letourneau | |
| 8,683,431 B2 | 3/2014 | Thomson | |
| 8,745,070 B2 * | 6/2014 | Krishnamurthy | |
| | | | G06F 16/24568 |
| | | | 707/751 |
| 8,762,942 B2 | 6/2014 | Langworthy | |
| 8,868,621 B2 | 10/2014 | D'Onofrio, II | |
| 8,869,106 B2 | 10/2014 | Jazdzewski | |
| 8,930,896 B1 | 1/2015 | Wiggins | |
| 8,935,232 B2 | 1/2015 | Abadi | |
| 8,990,769 B2 | 3/2015 | Letourneau | |
| 9,002,862 B2 | 4/2015 | Schiffmann | |
| 9,015,202 B2 | 4/2015 | Letourneau | |
| 9,020,961 B2 | 4/2015 | Letourneau | |
| 9,043,347 B2 | 5/2015 | Letourneau | |
| 9,077,515 B2 | 7/2015 | Letourneau | |
| 9,167,579 B2 | 10/2015 | Fettweis | |
| 9,177,003 B2 | 11/2015 | Letourneau | |
| 9,245,050 B2 | 1/2016 | Schiffmann | |
| 9,330,128 B2 | 5/2016 | Schiffmann | |
| 9,411,841 B2 | 8/2016 | Schiffmann | |
| 9,425,951 B2 | 8/2016 | Letourneau | |
| 9,430,512 B2 | 8/2016 | Letourneau | |
| 9,563,653 B2 | 2/2017 | Letourneau | |
| 9,563,663 B2 | 2/2017 | Shukla | |
| 9,646,034 B2 | 5/2017 | Schiffmann | |
| 9,646,107 B2 | 5/2017 | Letourneau | |
| 9,842,130 B2 | 12/2017 | Schiffmann | |
| 10,055,438 B2 | 8/2018 | Schiffmann | |
| 10,068,003 B2 | 9/2018 | Letourneau | |
| 10,140,349 B2 | 11/2018 | Letourneau | |
| 10,255,311 B2 | 4/2019 | Letourneau | |
| 10,275,489 B1 | 4/2019 | Muniswamy Reddy | |
| 10,325,031 B2 | 6/2019 | Letourneau | |
| 10,380,039 B2 | 8/2019 | Cooray | |
| 10,380,089 B2 | 8/2019 | Letourneau | |
| 10,394,785 B2 | 8/2019 | Letourneau | |
| 10,411,878 B2 | 9/2019 | Letourneau | |
| 10,437,886 B2 | 10/2019 | Andrews | |
| 10,713,274 B2 | 7/2020 | Letourneau | |
| 10,725,989 B2 | 7/2020 | Schiffmann | |
| 10,733,234 B2 | 8/2020 | Letourneau | |
| 11,100,070 B2 | 8/2021 | Schiffmann | |
| 11,100,137 B2 | 8/2021 | Letourneau | |
| 11,194,777 B2 | 12/2021 | Letourneau | |
| 11,204,906 B2 | 12/2021 | Letourneau | |
| 2001/0003211 A1 | 6/2001 | Bera | |
| 2001/0037496 A1 | 11/2001 | Simonyi | |

(56) References Cited

U.S. PATENT DOCUMENTS

| | | |
|---|---|---|
| 2002/0023166 A1 | 2/2002 | Bar-Noy |
| 2002/0040292 A1 | 4/2002 | Marcu |
| 2002/0059281 A1 | 5/2002 | Watanabe |
| 2002/0062259 A1 | 5/2002 | Katz |
| 2002/0091676 A1 | 7/2002 | Agrawal |
| 2002/0107860 A1 | 8/2002 | Gobeille |
| 2002/0129129 A1 | 9/2002 | Bloch |
| 2002/0130796 A1 | 9/2002 | Tsuchido |
| 2002/0130907 A1 | 9/2002 | Chi |
| 2002/0133347 A1 | 9/2002 | Schoneburg |
| 2002/0133497 A1 | 9/2002 | Draper |
| 2002/0149604 A1 | 10/2002 | Wilkinson |
| 2002/0169563 A1 | 11/2002 | De Carvalho |
| 2002/0194163 A1 | 12/2002 | Hopeman |
| 2003/0041088 A1 | 2/2003 | Wilson |
| 2003/0065659 A1 | 4/2003 | Agarwal |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su |
| 2003/0195885 A1 | 10/2003 | Emmick |
| 2003/0195890 A1 | 10/2003 | Oommen |
| 2003/0236787 A1 | 12/2003 | Burges |
| 2003/0236794 A1 | 12/2003 | Hostetter |
| 2004/0003028 A1 | 1/2004 | Emmett |
| 2004/0010752 A1 | 1/2004 | Chan |
| 2004/0019599 A1 | 1/2004 | Trappen |
| 2004/0024724 A1 | 2/2004 | Rubin |
| 2004/0024790 A1 | 2/2004 | Everett |
| 2004/0044659 A1 | 3/2004 | Judd |
| 2004/0054692 A1 | 3/2004 | Seyrat |
| 2004/0060006 A1 | 3/2004 | Lindblad |
| 2004/0060007 A1 | 3/2004 | Gottlob |
| 2004/0068498 A1 | 4/2004 | Patchet |
| 2004/0075677 A1 | 4/2004 | Loyall |
| 2004/0103105 A1 | 5/2004 | Lindblad |
| 2004/0122844 A1 | 6/2004 | Malloy |
| 2004/0125124 A1 | 7/2004 | Kim |
| 2004/0160464 A1 | 8/2004 | Reyna |
| 2004/0205047 A1 | 10/2004 | Carpenter |
| 2004/0215642 A1 | 10/2004 | Cameron |
| 2004/0239674 A1 | 12/2004 | Ewald |
| 2004/0254909 A1 | 12/2004 | Testa |
| 2004/0260683 A1 | 12/2004 | Chan |
| 2004/0260684 A1 | 12/2004 | Agarwal |
| 2004/0267958 A1 | 12/2004 | Reed |
| 2004/0268236 A1 | 12/2004 | Chidlovskii |
| 2005/0021548 A1 | 1/2005 | Bohannon |
| 2005/0021683 A1 | 1/2005 | Newton |
| 2005/0023524 A1 | 2/2005 | Beatty |
| 2005/0027495 A1 | 2/2005 | Matichuk |
| 2005/0027743 A1 | 2/2005 | O'Neil |
| 2005/0028091 A1 | 2/2005 | Bordawekar |
| 2005/0050016 A1 | 3/2005 | Stanoi |
| 2005/0050066 A1 | 3/2005 | Hughes |
| 2005/0055369 A1 | 3/2005 | Gorelik |
| 2005/0058976 A1 | 3/2005 | Vernon |
| 2005/0060320 A1 | 3/2005 | Bostrom |
| 2005/0060332 A1 | 3/2005 | Bernstein |
| 2005/0065964 A1 | 3/2005 | Ziemann |
| 2005/0065965 A1 | 3/2005 | Ziemann |
| 2005/0097084 A1 | 5/2005 | Balmin |
| 2005/0102636 A1 | 5/2005 | McKeon |
| 2005/0125432 A1 | 6/2005 | Lin |
| 2005/0138073 A1 | 6/2005 | Zhou |
| 2005/0149471 A1 | 7/2005 | Lassalle |
| 2005/0154265 A1 | 7/2005 | Miro |
| 2005/0154979 A1 | 7/2005 | Chidlovskii |
| 2005/0156761 A1 | 7/2005 | Oh |
| 2005/0165732 A1 | 7/2005 | Burges |
| 2005/0171962 A1 | 8/2005 | Martin |
| 2005/0187900 A1 | 8/2005 | LeTourneau |
| 2005/0195741 A1 | 9/2005 | Doshi |
| 2005/0210014 A1 | 9/2005 | Asano |
| 2005/0214727 A1 | 9/2005 | Stoianovici |
| 2005/0216445 A1 | 9/2005 | Rao |
| 2005/0267908 A1 | 12/2005 | Letourneau |
| 2005/0286788 A1 | 12/2005 | Orr |
| 2006/0004817 A1 | 1/2006 | Andrews |
| 2006/0005122 A1 | 1/2006 | Lemoine |
| 2006/0015538 A1 | 1/2006 | Letourneau |
| 2006/0053122 A1 | 3/2006 | Korn |
| 2006/0074838 A1 | 4/2006 | Srivastava |
| 2006/0095442 A1 | 5/2006 | Letourneau |
| 2006/0095455 A1 | 5/2006 | Letourneau |
| 2006/0123029 A1 | 6/2006 | Letourneau |
| 2006/0129582 A1 | 6/2006 | Schiffmann |
| 2006/0209351 A1 | 9/2006 | Saito |
| 2006/0259533 A1 | 11/2006 | Letourneau |
| 2006/0271573 A1 | 11/2006 | Letourneau |
| 2007/0003917 A1 | 1/2007 | Kitching |
| 2007/0198538 A1 | 8/2007 | Palacios |
| 2008/0270435 A1 | 10/2008 | Furusho |
| 2008/0313196 A1 | 12/2008 | Furusho |
| 2010/0094885 A1 | 4/2010 | Andrews |
| 2010/0094908 A1 | 4/2010 | Letourneau |
| 2010/0114969 A1 | 4/2010 | Letourneau |
| 2010/0191775 A1 | 7/2010 | Schiffmann |
| 2010/0205581 A1 | 8/2010 | Letourneau |
| 2010/0318521 A1 | 12/2010 | Letourneau |
| 2011/0131259 A1 | 6/2011 | Letourneau |
| 2011/0282898 A1 | 11/2011 | Schiffmann |
| 2011/0320499 A1 | 12/2011 | Letourneau |
| 2012/0144388 A1 | 6/2012 | Schiffmann |
| 2013/0151566 A1 | 6/2013 | Letourneau |
| 2013/0198239 A1 | 8/2013 | Letourneau |
| 2014/0040293 A1 | 2/2014 | Letourneau |
| 2014/0184430 A1 | 7/2014 | Jiang |
| 2014/0289266 A1 | 9/2014 | Letourneau |
| 2014/0289278 A1 | 9/2014 | Schiffmann |
| 2014/0289279 A1 | 9/2014 | Letourneau |
| 2014/0362961 A1 | 12/2014 | Letourneau |
| 2015/0193517 A1 | 7/2015 | Letourneau |
| 2015/0220582 A1 | 8/2015 | Letourneau |
| 2015/0242449 A1 | 8/2015 | Schiffmann |
| 2015/0242450 A1 | 8/2015 | Letourneau |
| 2015/0310048 A1 | 10/2015 | Letourneau |
| 2015/0341165 A1 | 11/2015 | Letourneau |
| 2016/0117353 A1 | 4/2016 | Schiffmann |
| 2016/0162528 A1 | 6/2016 | Letourneau |
| 2016/0283611 A1 | 9/2016 | Letourneau |
| 2016/0328431 A1 | 11/2016 | Schiffmann |
| 2016/0359616 A1 | 12/2016 | Letourneau |
| 2017/0032053 A1 | 2/2017 | Letourneau |
| 2017/0053006 A1 | 2/2017 | Letourneau |
| 2017/0132301 A1 | 5/2017 | Letourneau |
| 2017/0255660 A1 | 9/2017 | Letourneau |
| 2018/0107698 A1 | 4/2018 | Schiffmann |
| 2019/0026326 A1 | 1/2019 | Schiffmann |
| 2019/0034510 A1 | 1/2019 | Letourneau |
| 2019/0121795 A1 | 4/2019 | Schiffmann |
| 2019/0129899 A1 | 5/2019 | Letourneau |
| 2019/0171628 A1 | 6/2019 | Letourneau |
| 2019/0236078 A1 | 8/2019 | Letourneau |
| 2019/0356465 A1 | 11/2019 | Letourneau |
| 2019/0377718 A1 | 12/2019 | Letourneau |
| 2019/0384753 A1 | 12/2019 | Letourneau |
| 2019/0384792 A1 | 12/2019 | Andrews |
| 2020/0218707 A1 | 7/2020 | Letourneau |
| 2020/0372041 A1 | 11/2020 | Letourneau |
| 2020/0394168 A1 | 12/2020 | Schiffmann |
| 2020/0394224 A1 | 12/2020 | Letourneau |
| 2021/0149860 A1 | 5/2021 | Letourneau |
| 2021/0349871 A1 | 11/2021 | Letourneau |

OTHER PUBLICATIONS

Mart0n et al., "Hierarchical Object Geometric Categorization and Appearance Classification for Mobile Manipulation", IEEE, pp. 365-370 (Year: 2010).*

Goldstein et al, "Using Aggregation and Dynamic Queries for Exploring Large Data Sets", ACM, pp. 23-29 (Year: 1994).*

(56) References Cited

OTHER PUBLICATIONS

Zanibbi et al, "Recognizing Mathematical Expressions Using Tree Transformation", IEEE, pp. 1455-1467 (Year: 2002).*
Zhang et al., "B ed-Tree: An All-Purpose Index Structure for String Similarity Search Based on Edit Distance", ACM, pp. 915-926 (Year: 2010).*
Fluri et al, "Change Distilling: Tree Differencing for Fine-Grained Source Code Change Extraction", IEEE, pp. 725-743 (Year: 2007).*
Sahinalp et al, "Distance Based Indexing for String Proximity Search", IEEE, pp. 125-136 (Year: 2003).*
Vion-Dury et al, "Experimenting with the Circus Language for XML Modeling and Transformation", ACM, pp. 82-87 (Year: 2002).*
U.S. Appl. No. 11/005,859 / Application filed Dec. 6, 2004, 124 pages.
U.S. Appl. No. 11/005,859 / Notice of File Missing parts, dated Jan. 10, 2005, 2 pages.
U.S. Appl. No. 11/005,859 / Response to Notice to File Missing Parts, dated Mar. 29, 2005, 9 pages.
U.S. Appl. No. 11/005,859 / Preliminary Amendment dated Apr. 28, 2005, 193 pages.
U.S. Appl. No. 11/005,859 / Restriction Requirement dated Dec. 12, 2007, 7 pages.
U.S. Appl. No. 11/005,859 / Response to Restriction Requirement dated Jan. 14, 2008, 82 pages.
U.S. Appl. No. 11/005,859 / Office Action, dated Mar. 21, 2008, 21 pages.
U.S. Appl. No. 11/005,859 / Response to Office Action, dated Jul. 21, 2008, 89 pages, Doc 1077.
U.S. Appl. No. 11/005,859 / Final Office Action, dated Oct. 30, 2008, 14 pages, Doc 1078.
U.S. Appl. No. 11/005,859 / Response to Final Office Action, dated Dec. 30, 2008, 84 pages, Doc 1079.
U.S. Appl. No. 11/005,859 / Advisory Action, dated Jan. 13, 2009, 3 pages, Doc 1080.
U.S. Appl. No. 11/005,859 / RCE Amendment, dated Apr. 30, 2009, 88 pages, Doc 1081.
U.S. Appl. No. 11/005,859 / Final Office Action, dated Jul. 8, 2009, 8 pages, Doc 1082.
U.S. Appl. No. 11/005,859 / Interview Summary, dated Oct. 27, 2009, 3 pages, Doc 1083.
U.S. Appl. No. 11/005,859 / Response to Final Office Action, dated Dec. 8, 2009, 85 pages, Doc 1084.
U.S. Appl. No. 11/005,859 / Advisory Action, dated Dec. 22, 2009, 2 pages, Doc 1085.
U.S. Appl. No. 11/005,859 / RCE Amendment, dated Jan. 7, 2010, 87 pages, Doc 1086.
U.S. Appl. No. 11/005,859 / Office Action, dated Jan. 21, 2010, 17 pages, Doc 1087.
U.S. Appl. No. 11/005,859 / Response to Office Action, dated Feb. 25, 2020, 85 pages, Doc 1088.
U.S. Appl. No. 11/005,859 / Final Office Action, dated Jun. 8, 2010, 9 pages, Doc 1089.
U.S. Appl. No. 11/005,859 / Response to Final Office Action, dated Sep. 1, 2010, 91 pages, Doc 1090.
U.S. Appl. No. 11/005,859 / Advisory Action, dated Sep. 14, 2010, 7 pages, Doc 1091.
U.S. Appl. No. 11/005,859 / Notice of Appeal, dated Sep. 29, 2010, 3 pages, Doc 1092.
U.S. Appl. No. 11/005,859 / Office Action, dated Oct. 15, 2010, 5 pages, Doc 1093.
U.S. Appl. No. 11/005,859 / Response to Office Action, dated Jan. 18, 2011, 97 pages, Doc 1094.
U.S. Appl. No. 11/005,859 / Final Office Action, dated Mar. 30, 2011, 8 pages, Doc 1095.
U.S. Appl. No. 11/005,859 / Proposed Examiner's Amendment, dated May 4, 2011, 4 pages, Doc 1096.
U.S. Appl. No. 11/005,859 / Clarification of Examiner's Amendment, dated May 11, 2011, 4 pages, Doc 1097.
U.S. Appl. No. 11/005,859 / Notice of Allowance, dated Jun. 9, 2011, 19 pages, Doc 1098.
U.S. Appl. No. 11/005,859 / Issue Fee, dated Sep. 9, 2011, 6 pages, Doc 1099.
U.S. Appl. No. 11/005,859 / Issue Notification, dated Sep. 21, 2011, 1 page, Doc 1100.
U.S. Appl. No. 13/229,624 / Application, filed Sep. 9, 2011, 137 pages, Doc 1101.
U.S. Appl. No. 13/229,624 / Filing Receipt, dated Sep. 21, 2011, 3 pages, Doc 1102.
U.S. Appl. No. 13/229,624 / Office Action, dated Nov. 23, 2011, 8 pages, Doc 1104.
U.S. Appl. No. 13/229,624 / Notice of Publication, dated Dec. 29, 2011, 1 page, Doc 1103.
U.S. Appl. No. 13/229,624 / Response to Office Action, dated Feb. 23, 2012, 24 pages, Doc 1105.
U.S. Appl. No. 13/229,624 / Final Office Action, dated Mar. 20, 2012, 10 pages, Doc 1106.
U.S. Appl. No. 13/229,624 / Response to Final Office Action, dated Jun. 13, 2012, 25 pages, Doc 1107.
U.S. Appl. No. 13/229,624 / Advisory Action, dated Jun. 20, 2012, 3 pages, Doc 1108.
U.S. Appl. No. 13/229,624 / RCE Amendment, dated Jul. 20, 2012, 28 pages, Doc 1109.
U.S. Appl. No. 13/229,624 / Office Action, dated Oct. 2, 2013, 38 pages, Doc 1110.
U.S. Appl. No. 13/229,624 / Response to Office Action, dated Dec. 27, 2013, 13 pages, Doc 1111.
U.S. Appl. No. 13/229,624 / Office Action, dated Apr. 4, 2014, 9 pages, Doc 1112.
U.S. Appl. No. 13/229,624 / Response to Office Action, dated Aug. 1, 2014, 11 pages, Doc 1113.
U.S. Appl. No. 13/229,624 / Final Office Action, dated Oct. 30, 2014, 9 pages, Doc 1114.
U.S. Appl. No. 13/229,624 / Response to Final Office Action, dated Jan. 30, 2015, 13 pages, Doc 1115.
U.S. Appl. No. 13/229,624 / Advisory Action, dated Mar. 11, 2015, 3 pages, Doc 1116.
U.S. Appl. No. 13/229,624 / Interview Summary, dated Mar. 19, 2015, 3 pages, Doc 1117.
U.S. Appl. No. 13/229,624 / Interview Summary, dated Mar. 27, 2015, 4 pages, Doc 1118.
U.S. Appl. No. 13/229,624 / Response to Advisory Action & Final Office Action, dated Mar. 27, 2015, 18 pages, Doc 1119.
U.S. Appl. No. 13/229,624 / Advisory Action, dated Apr. 15, 2015, 6 pages, Doc 1120.
U.S. Appl. No. 13/229,624 / RCE Amendment, dated Apr. 27, 2015, 19 pages, Doc 1121
U.S. Appl. No. 13/229,624 / Notice of Allowance, dated Jul. 6, 2015, 10 pages, Doc 1122.
U.S. Appl. No. 13/229,624 / Issue Fee, dated Sep. 28, 2015, 6 pages, Doc 1123.
U.S. Appl. No. 13/229,624 / Issue Notification, dated Oct. 14, 2015, 1 page, Doc 1124.
U.S. Appl. No. 14/870,744 / Application, filed Sep. 30, 2015, 131 pages, Doc 1125.
U.S. Appl. No. 14/870,744 / Preliminary Amendment, dated Oct. 6, 2015, 12 pages, Doc 1128.
U.S. Appl. No. 14/870,744 / Filing Receipts Notice to File Missing Parts, dated Oct. 16, 2015, 5 pages, Doc 1126.
U.S. Appl. No. 14/870,744 / Response to Notice to File Missing Parts, dated Feb. 19, 2016, 6 pages, Doc 1129.
U.S. Appl. No. 14/870,744 / Updated Filing Receipts Informational Notice, dated Mar. 2, 2016, 4 pages, Doc 1130.
U.S. Appl. No. 14/870,744 / Notice of Publication, dated Jun. 9, 2016, 1 page, Doc 1127.
U.S. Appl. No. 14/870,744 / Response to Informational Notice, dated Jun. 22, 2016, 5 pages, Doc 1131.
U.S. Appl. No. 14/870,744 / Office Action, dated Aug. 24, 2017, 58 pages, Doc 1132.
U.S. Appl. No. 14/870,744 / Response to Office Action, dated Nov. 24, 2017, 32 pages, Doc 1133.

(56) References Cited

OTHER PUBLICATIONS

U.S. Appl. No. 14/870,744 / Final Office Action, dated Mar. 30, 2018, 30 pages, Doc 1134.
U.S. Appl. No. 14/870,744 / Response to Final Office Action, dated May 30, 2018, 35 pages, Doc 1135.
U.S. Appl. No. 14/870,744 / Advisory Action, dated Jul. 3, 2018, 7 pages, Doc 1136.
U.S. Appl. No. 14/870,744 / RCE Amendment, dated Jul. 27, 2018, 35 pages, Doc 1137.
U.S. Appl. No. 14/870,744 / Notice of Allowance, dated Sep. 6, 2018, 11 pages, Doc 1138.
U.S. Appl. No. 14/870,744 / Issue Fee, dated Dec. 4, 2018, 21 pages, Doc 1139.
U.S. Appl. No. 14/870,744 / Interview Summary, dated Mar. 8, 2019, 2 pages, Doc 1140.
U.S. Appl. No. 14/870,744 / Issue Notification, dated Mar. 20, 2019, 1 page, Doc 1141.
U.S. Appl. No. 16/209,872 / Application, filed Dec. 4, 2018, 134 pages, Doc 1142.
U.S. Appl. No. 16/209,872 / Filing Receipt & Notice to File Missing Parts, dated Dec. 28, 2018, 5 pages, Doc 1143.
U.S. Appl. No. 16/209,872 / Preliminary Amendment and Response to Notice to File Missing Parts, dated Feb. 21, 2019, 20 pages, Doc 1145.
U.S. Appl. No. 16/209,872 / Update Filing Receipt, dated Feb. 26, 2019, 3 pages, Doc 1146.
U.S. Appl. No. 16/209,872 / Notice of Publication, dated Jun. 6, 2019, 1 page, Doc 1144.
U.S. Appl. No. 16/209,872 / Office Action, dated Sep. 17, 2020, 63 pages, Doc 2155.
U.S. Appl. No. 16/209,872 / Response to Office Action, dated Sep. 17, 2020, 63 pages, Doc 2156.
U.S. Appl. No. 16/209,872 / Terminal Disclaimer, dated Sep. 17, 2020, 6 pages, Doc 2157.
U.S. Appl. No. 16/209,872 / Notice of Allowance and Allowability dated Mar. 26, 2021, 17 pages, Doc 2171.
U.S. Appl. No. 16/209,872 / 312 Amendment After filed Apr. 30, 2021, 11 pages, Doc 2245.
U.S. Appl. No. 16/209,872 / Notice of Allowance/Allowability dated Jun. 10, 2021, 4 pages, Doc 2297.
U.S. Appl. No. 16/209,872 / Request for Continued Examination and Amendment filed Jun. 25, 2021, 17 pages, Doc 2299.
U.S. Appl. No. 16/820,457 / Application and Preliminary Amendment filed Mar. 16, 2020, 148 pages, Doc 1147.
U.S. Appl. No. 16/820,457 / Filing Receipt, dated Mar. 31, 2020, 3 pages, Doc 1148.
U.S. Appl. No. 16/820,457 / Notice of Publication, dated Jul. 9, 2020, 1 page, Doc 1149.
U.S. Appl. No. 17/158,804 / Patent Application, filed Jan. 26, 2021, 146 pages, Doc 2158.
U.S. Appl. No. 17/158,804 / Filing Receipt dated Feb. 9, 2021, 5 pages, Doc 2172.
U.S. Appl. No. 17/158,804 / Notice of Publication dated Feb. 9, 2021, 1 page, Doc 2246.
U.S. Appl. No. 11/007,139 / Application, filed Dec. 7, 2004, 90 pages, Doc 1152.
U.S. Appl. No. 11/007,139 / Notice to File Missing Parts dated Jan. 19, 2005, 2 pages, Doc 1153.
U.S. Appl. No. 11/007,139 / Response to Notice to File Missing Parts dated Mar. 29, 2005, 9 pages, Doc 1154.
U.S. Appl. No. 11/007,139 / Preliminary Amendment dated Apr. 28, 2005, 146 pages, Doc 1155.
U.S. Appl. No. 11/007,139 / Office Action, dated May 14, 2007, 2 pages, Doc 1156.
U.S. Appl. No. 11/007,139 / Response to Office Action dated Oct. 15, 2007, 29 pages, Doc 1157.
U.S. Appl. No. 11/007,139 / Supplemental Amendment dated Oct. 17, 2007, 6 pages, Doc 1158.
U.S. Appl. No. 11/007,139 / Office Action dated Jan. 2, 2008, 15 pages, Doc 1159.
U.S. Appl. No. 11/007,139 / Response to Office Action dated Apr. 2, 2008, 29 pages, Doc 1160.
U.S. Appl. No. 11/007,139 / Final Office Action dated Aug. 15, 2008, 22 pages, Doc 1161.
U.S. Appl. No. 11/007,139 / Response to Final Office Action dated Oct. 15, 2008, 25 pages, Doc 1162.
U.S. Appl. No. 11/007,139 / Advisory Action dated Oct. 22, 2008, 3 pages, Doc 1163.
U.S. Appl. No. 11/007,139 / RCE Amendment dated Nov. 14, 2008, 29 pages, Doc 1164.
U.S. Appl. No. 11/007,139 / Office Action, dated Dec. 8, 2008, 17 pages, Doc 1165.
U.S. Appl. No. 11/007,139 / Response to Office Action dated May 8, 2009, 28 pages, Doc 1166.
U.S. Appl. No. 11/007,139 / Final Office Action dated Aug. 4, 2009, 18 pages, Doc 1167.
U.S. Appl. No. 11/007,139 / Response to Final Office Action dated Dec. 4, 2009, 25 pages, Doc 1168.
U.S. Appl. No. 11/007,139 / Advisory Action dated Dec. 14, 2009, 3 pages, Doc 1169.
U.S. Appl. No. 11/007,139 / RCE Amendment dated Jan. 4, 2010, 3 pages, Doc 1170.
U.S. Appl. No. 11/007,139 / Office Action dated Jan. 27, 2010, 31 pages, Doc 1171.
U.S. Appl. No. 11/007,139 / Response to Office Action dated Apr. 27, 2010, 30 pages, Doc 1172.
U.S. Appl. No. 11/007,139 / Final Office Action dated Jul. 20, 2010, 22 pages, Doc 1173.
U.S. Appl. No. 11/007,139 / Response to Final Office Action dated Oct. 20, 2010, 35 pages, Doc 1174.
U.S. Appl. No. 11/007,139 / Advisory Action dated Oct. 25, 2010, 2 pages, Doc 1175.
U.S. Appl. No. 11/007,139 / Response to Final Office Action and Advisory Action dated Nov. 18, 2010, 26 pages, Doc 1176.
U.S. Appl. No. 11/007,139 / Advisory Action dated Dec. 1, 2010, 4 pages, Doc 1177.
U.S. Appl. No. 11/007,139 / Notice of Appeal dated Dec. 20, 2010, 3 pages, Doc 1178.
U.S. Appl. No. 11/007,139 / Response to Final Office Action and Advisory Action, dated Dec. 20, 2010, 30 pages, Doc 1179.
U.S. Appl. No. 11/007,139 / Office Action dated Jan. 3, 2011, 24 pages, Doc 1180.
U.S. Appl. No. 11/007,139 / Response to Office Action dated May 3, 2011, 29 pages, Doc 1181.
U.S. Appl. No. 11/007,139 / Final Office Action dated Jul. 18, 2011, 23 pages, Doc 1182.
U.S. Appl. No. 11/007,139 / Response to Final Office Action dated Oct. 18, 2011, 32 pages, Doc 1183.
U.S. Appl. No. 11/007,139 / Advisory Office Action dated Nov. 4, 2011, 12 pages, Doc 1184.
U.S. Appl. No. 11/007,139 / Notice of Appeal dated Nov. 16, 2011, 4 pages, Doc 1185.
U.S. Appl. No. 11/007,139 / Appeal Brief dated May 1, 2012, 91 pages, Doc 1186.
U.S. Appl. No. 11/007,139 / Notice of Non-Compliant Appeal Brief dated May 7, 2012, 3 pages, Doc 1187.
U.S. Appl. No. 11/007,139 / Response to Notice of Non-Compliant Appeal Brief dated May 15, 2012, 9 pages, Doc 1188.
U.S. Appl. No. 11/007,139 / Examiner's Answer dated Aug. 20, 2012, 35 pages, Doc 1189.
U.S. Appl. No. 11/007,139 / Reply Brief dated Oct. 22, 2012, 29 pages, Doc 1190.
U.S. Appl. No. 11/007,139 / Patent Trial and Appeal Board Docketing Notice dated Nov. 6, 2012, 2 pages, Doc 1191.
U.S. Appl. No. 11/007,139 / Decision on Appeal dated Jul. 24, 2015, 8 pages, Doc 1192.
U.S. Appl. No. 11/007,139 / RCE and Amendment dated Aug. 19, 2015, 21 pages, Doc 1193.
U.S. Appl. No. 11/007,139 / Office Action dated Dec. 31, 2015, 24 pages, Doc 1194.
U.S. Appl. No. 11/007,139 / Response to Office Action dated Mar. 28, 2016, 21 pages, Doc 1195.

(56) References Cited

OTHER PUBLICATIONS

U.S. Appl. No. 11/007,139 / Final Office Action dated Jun. 20, 2016, 13 pages, Doc 1196.
U.S. Appl. No. 11/007,139 / Response to Final Office Action dated Jul. 29, 2016, 19 pages, Doc 1197.
U.S. Appl. No. 11/007,139 / Notice of Allowance dated Aug. 23, 2016, 12 pages, Doc 1198.
U.S. Appl. No. 11/007,139 / Corrected Filing Receipt, dated Sep. 2, 2016, 3 pages, Doc 1199.
U.S. Appl. No. 11/007,139 / Application Data Sheet dated Oct. 24, 2016, 10 pages, Doc 1200.
U.S. Appl. No. 11/007,139 / Notice of Allowance dated Dec. 29, 2016, 14 pages, Doc 1201.
U.S. Appl. No. 11/007,139 / Issue Fee dated Mar. 23, 2017, 6 pages, Doc 1202.
U.S. Appl. No. 11/007,139 / Issue Notification dated Apr. 19, 2017, 1 page, Doc 1203.
U.S. Appl. No. 15/043,267 / Application dated Feb. 12, 2016, 104 pages, Doc 1204.
U.S. Appl. No. 15/043,267 / Filing Receipt dated Mar. 7, 2016, 3 pages, Doc 1205.
U.S. Appl. No. 15/043,267 / Informational Notice dated Mar. 7, 2016, 1 page, Doc 1206.
U.S. Appl. No. 15/043,267 / Request to Submit Priority Claim and Preliminary Amendment dated Jun. 10, 2016, 11 pages, Doc 1208.
U.S. Appl. No. 15/043,267 / Response to Informational Notice dated Oct. 14, 2016, 5 pages, Doc 1209.
U.S. Appl. No. 15/043,267 / Corrected Filing Receipt dated Oct. 25, 2016, 3 pages, Doc 1211.
U.S. Appl. No. 15/043,267 / Notice of Publication dated Feb. 2, 2017, 1 page, Doc 1207.
U.S. Appl. No. 15/043,267 / Office Action dated Apr. 2, 2019, 80 pages, Doc 1210.
U.S. Appl. No. 15/043,267 / Response to Office Action dated Jul. 2, 2019, 24 pages, Doc 1212.
U.S. Appl. No. 15/043,267 / Final Office Action dated Oct. 18, 2019, 14 pages, Doc 1213.
U.S. Appl. No. 15/043,267 / Response to Final Office Action dated Jan. 21, 2020, 20 pages, Doc 1214.
U.S. Appl. No. 15/043,267 / Advisory Action dated Jan. 29, 2020, 12 pages, Doc 1215.
U.S. Appl. No. 15/043,267 / RCE Amendment dated Mar. 3, 2020, 21 pages, Doc 1216.
U.S. Appl. No. 15/043,267 / Notice of Allowance dated Mar. 23, 2020, 9 pages, Doc 1217.
U.S. Appl. No. 15/043,267 / Issue Fee Payment, dated Jun. 23, 2020, 18 pages, Doc 1218.
U.S. Appl. No. 15/043,267 / Issue Notification dated Jul. 15, 2020, 1 page, Doc 1219.
U.S. Appl. No. 16/911,282 / Application, filed Jun. 24, 2020, 98 pages, Doc 1220.
U.S. Appl. No. 16/911,282 / Filing Receipt and Notice to File Missing Parts dated Jul. 7, 2020, 7 pages, Doc 1221.
U.S. Appl. No. 16/911,282 / Preliminary Amendment and Response to Notice to File Missing Parts filed Sep. 8, 2020, 18 pages, Doc 2145.
U.S. Appl. No. 16/911,282 / Updated Filing Receipt dated Sep. 10, 2020, 5 pages, Doc 2146.
U.S. Appl. No. 16/911,282 / Notice of Publication dated Dec. 17, 2020, 1 page, Doc 2159.
U.S. Appl. No. 11/006,320 / Application filed Dec. 6, 2004, 75 pages, Doc 1223.
U.S. Appl. No. 11/006,320 / Notice to File Missing Parts dated Feb. 7, 2005, 2 pages, Doc 1224
U.S. Appl. No. 11/006,320 / Response to Notice to File Missing Parts dated May 6, 2005, 140 pages, Doc 1225.
U.S. Appl. No. 11/006,320 / Notice of Publication dated Jan. 19, 2006, 1 page, Doc 1226.
U.S. Appl. No. 11/006,320 / Restriction Requirement dated Mar. 26, 2007, 6 pages, Doc 1227.
U.S. Appl. No. 11/006,320 / Response to Restriction Requirement dated Apr. 27, 2007, 32 pages, Doc 1228.
U.S. Appl. No. 11/006,320 / Notice of Non-Compliant Amendment dated Jul. 6, 2007, 3 pages, Doc 1229.
U.S. Appl. No. 11/006,320 / Response to Notice of Non-Compliant Amendment dated Jul. 25, 2007, 32 pages, Doc 1230.
U.S. Appl. No. 11/006,320 / Office Action dated Oct. 1, 2007, 19 pages, Doc 1231.
U.S. Appl. No. 11/006,320 / Response to Office Action dated Jan. 29, 2008, 42 pages, Doc 1232.
U.S. Appl. No. 11/006,320 / Notice of Non-Compliant Amendment dated Apr. 8, 2008, 4 pages, Doc 1233.
U.S. Appl. No. 11/006,320 / Response to Notice of Non-Compliant Amendment dated May 5, 2008, 43 pages, Doc 1234.
U.S. Appl. No. 11/006,320 / Office Action dated Aug. 15, 2008, 28 pages, Doc 1235.
U.S. Appl. No. 11/006,320 / Response to Office Action dated Nov. 14, 2008, 39 pages, Doc 1236.
U.S. Appl. No. 11/006,320 / Office Communication dated Jan. 27, 2009, 2 pages, Doc 1237.
U.S. Appl. No. 11/006,320 / Response to Office Communication dated Apr. 27, 2009, 43 pages, Doc 1238.
U.S. Appl. No. 11/006,320 / Final Office Action dated Jul. 29, 2009, 7 pages, Doc 1239.
U.S. Appl. No. 11/006,320 / Response to Final Office Action dated Nov. 30, 2009, 8 pages, Doc 1240.
U.S. Appl. No. 11/006,320 / Office Action, dated Dec. 4, 2009, 12 pages, Doc 1241.
U.S. Appl. No. 11/006,320 / Response to Office Action filed Feb. 23, 2010, 11 pages, Doc 1242.
U.S. Appl. No. 11/006,320 / Response to Final Office Action dated May 24, 2010, 11 pages, Doc 1243.
U.S. Appl. No. 11/006,320 / Response to Final Office Action filed Aug. 24, 2010, 17 pages, Doc 1244.
U.S. Appl. No. 11/006,320 / Notice of Allowance dated Sep. 17, 2010, 18 pages, Doc 1245.
U.S. Appl. No. 11/006,320 / Issue Fee dated Dec. 17, 2010, 12 pages, Doc. 1246.
U.S. Appl. No. 11/006,320 / Issue Notification dated Jan. 12, 2011, 1 page, Doc 1247.
U.S. Appl. No. 12/972,326 / Application filed Dec. 17, 2010, 76 pages, Doc 2247.
U.S. Appl. No. 12/972,326 / Filing Receipt and Notice to File Missing Parts dated Jan. 6, 2011, 5 pages, Doc 2248.
U.S. Appl. No. 12/972,326 / Preliminary Amendment and Response to Notice to File Missing Parts dated Jan. 26, 2011, 16 pages, Doc 2249.
U.S. Appl. No. 12/972,326 / Preliminary Amendment filed May 20, 2011, 17 pages, Doc 2250.
U.S. Appl. No. 12/972,326 / Notice of Non-compliant Amendment dated Jun. 2, 2011, 2 pages, Doc 2251.
U.S. Appl. No. 12/972,326 / Notice of Publication dated Jun. 2, 2011, 1 page, Doc 2252.
U.S. Appl. No. 12/972,326 / Substitute Preliminary Amendment filed Jul. 5, 2011, 23 pages, Doc 2253.
U.S. Appl. No. 12/972,326 / Preliminary Amendment filed Aug. 10, 2011, 9 pages, Doc 2254.
U.S. Appl. No. 12/972,326 / Non-final Office Action dated Feb. 23, 2011, 9 pages, Doc 2255.
U.S. Appl. No. 12/972,326 / Advisory Action dated Jun. 26, 2012, 3 pages, Doc 2256.
U.S. Appl. No. 12/972,326 / Notice of Abandonment dated Sep. 18, 2012, 2 pages, Doc 2257.
U.S. Appl. No. 11/006,848 / Application, filed Dec. 7, 2004, 61 pages, Doc 1249.
U.S. Appl. No. 11/006,848 / Notice to File Missing Parts dated Mar. 18, 2005, 2 pages, Doc 1250.
U.S. Appl. No. 11/006,848 / Response to Notice to File Missing Parts dated Apr. 28, 2005, 101 pages, Doc 1251.
U.S. Appl. No. 11/006,848 / Office Action dated Apr. 4, 2007, 38 pages, Doc 1252.
U.S. Appl. No. 11/006,848 / Response to Office Action filed Oct. 3, 2007, 22 pages, Doc 1253.

(56) References Cited

OTHER PUBLICATIONS

U.S. Appl. No. 11/006,848 / Supplemental Amendment filed Nov. 13, 2007, 6 pages, Doc 1254.
U.S. Appl. No. 11/006,848 / Office Action dated Feb. 5, 2008, 47 pages, Doc 1255.
U.S. Appl. No. 11/006,848 / Response to Office Action dated Aug. 4, 2008, 30 pages, Doc 1256.
U.S. Appl. No. 11/006,848 / Final Office Action dated Dec. 2, 2008, 30 pages, Doc 1257.
U.S. Appl. No. 11/006,848 / RCE and Amendment filed May 4, 2009, 26 pages, Doc 1258.
U.S. Appl. No. 11/006,848 / Notice of Allowance dated Jun. 11, 2009, 8 pages, Doc 1259.
U.S. Appl. No. 11/006,848 / Issue Fee Payment filed Sep. 11, 2009, 16 pages, Doc 1260.
U.S. Appl. No. 11/006,848 / Issue Notification dated Oct. 28, 2009, 1 page, Doc 1261.
U.S. Appl. No. 11/006,848 / Request to Correct Inventorship and for a Certificate of Correction filed Sep. 12, 2016, 14 pages, Doc 1262.
U.S. Appl. No. 11/006,848 / Certificate of Correction dated Aug. 8, 2017, 1 page, Doc 1263.
U.S. Appl. No. 12/573,829 / Patent Application filed Oct. 5, 2009, 67 pages, Doc 1264.
U.S. Appl. No. 12/573,829 / Notice to File Missing Parts dated Oct. 20, 2009, 2 pages, Doc 1265.
U.S. Appl. No. 12/573,829 / Filing Receipt dated Oct. 20, 2009, 3 pages, Doc 1266.
U.S. Appl. No. 12/573,829 / Preliminary Amendment filed Dec. 21, 2009, 17 pages, Doc 1267.
U.S. Appl. No. 12/573,829 / Filing Receipt dated Jan. 4, 2010, 3 pages, Doc 1268.
U.S. Appl. No. 12/573,829 / Notice of Publication dated Apr. 15, 20, 1 page, Doc 1269.
U.S. Appl. No. 12/573,829 / Non-Final Rejection dated Jun. 28, 2010, 49 pages, Doc 1271.
U.S. Appl. No. 12/573,829 / Amendment/Request for Reconsideration After Non-Final Rejection filed Sep. 28, 2010, 25 pages, Doc 1273.
U.S. Appl. No. 12/573,829 / Final Office Action dated Nov. 1, 2010, 53 pages, Doc 1274.
U.S. Appl. No. 12/573,829 / Response After Final Action filed Jan. 3, 2011, 32 pages, Doc 1275.
U.S. Appl. No. 12/573,829 / Advisory Action dated Jan. 7, 2011, 3 pages, Doc 1276.
U.S. Appl. No. 12/573,829 / Notice of Appeal filed Jan. 11, 2011, 5 pages, Doc 1277.
U.S. Appl. No. 12/573,829 / Appeal Brief filed May 4, 2011, 72 pages, Doc 1278.
U.S. Appl. No. 12/573,829 / Examiner's Answer to Appeal Brief, 31 pages, Doc 1279.
U.S. Appl. No. 12/573,829 / Reply Brief filed Sep. 21, 2011, 19 pages, Doc 1280.
U.S. Appl. No. 12/573,829 / Reply Brief Noted—Patent Board dated Oct. 5, 2011, 2 pages, Doc 1281.
U.S. Appl. No. 12/573,829 / Appeal Docketing Notice dated Oct. 11, 2011, 2 pages, Doc 1282.
U.S. Appl. No. 12/573,829 / Patent Board Decision—Examiner Affirmed dated May 9, 2014, 10 pages, Doc 1284.
U.S. Appl. No. 12/573,829 / Request for Continued Examination filed Jul. 9, 2014, 25 pages, Doc 1285.
U.S. Appl. No. 12/573,829 / Non-Final Office Action dated Apr. 28, 2015, 52 pages, Doc 1288.
U.S. Appl. No. 12/573,829 / Request for Consideration after Non-Final Rejection filed Jul. 27, 2015, 24 pages, Doc 1289.
U.S. Appl. No. 12/573,829 / Final Rejection dated Sep. 15, 2015, 24 pages, Doc 1291.
U.S. Appl. No. 12/573,829 / Response After Final Action filed Nov. 16, 2015, 21 pages, Doc 1293.
U.S. Appl. No. 12/573,829 / Advisory Action dated Dec. 2, 2015, 4 pages, Doc 1294.
U.S. Appl. No. 12/573,829 / Request for Continued Examination filed Dec. 14, 2015, 24 pages, Doc 1295.
U.S. Appl. No. 12/573,829 / Non-Final Rejection dated Jun. 13, 2016, 25 pages, Doc 1297.
U.S. Appl. No. 12/573,829 / Request for Corrected Filing Receipt to Correct Inventorship filed Sep. 13, 2016, 30 pages, Doc 1298.
U.S. Appl. No. 12/573,829 / Updated Filing Receipt and Notice of Acceptance of Request to Correct Inventorship dated Sep. 15, 2016, 5 pages, Doc 1299.
U.S. Appl. No. 12/573,829 / Non-Final Rejection dated Dec. 16, 2016, 21 pages, Doc 1300.
U.S. Appl. No. 12/573,829 / Request for Reconsideration After Non-Final Request filed Mar. 16, 2017, 21 pages, Doc 1301.
U.S. Appl. No. 12/573,829 / Final Rejection dated May 2, 2017, 24 pages, Doc 1303.
U.S. Appl. No. 12/573,829 / Response After Final Action filed Jul. 5, 2017, 23 pages, Doc 1304.
U.S. Appl. No. 12/573,829 / Advisory Action, Applicant Initiated Review Summary, Amendment After Final Action, After Final Consideration Program Decision dated Aug. 29, 2017, 8 pages, Doc 1305.
U.S. Appl. No. 12/573,829 / Request for Continued Examination filed Sep. 5, 2017, 29 pages, Doc 1306.
U.S. Appl. No. 12/573,829 / Non-Final Rejection dated Dec. 27, 2017, 24 pages, Doc 1308.
U.S. Appl. No. 12/573,829 / Request for Reconsideration After Non-Final Rejection filed Mar. 27, 2018, 25 pages, Doc 1309.
U.S. Appl. No. 12/573,829 / Final Rejection dated Jul. 11, 2018, 26 pages, Doc 1311.
U.S. Appl. No. 12/573,829 / Request for Consideration After Final Consideration filed Sep. 7, 2018, 25 pages, Doc 1312.
U.S. Appl. No. 12/573,829 / Advisory Action dated Sep. 24, 2018, 6 pages, Doc 1314.
U.S. Appl. No. 12/573,829 / Request for Continued Examination filed Oct. 9, 2018, 25 pages, Doc 1315.
U.S. Appl. No. 12/573,829 / Notice of Allowance dated May 21, 2019, 32 pages, Doc 1318.
U.S. Appl. No. 12/573,829 / Issue Fee & Terminal Disclaimer filed Aug. 21, 2019, 12 pages, 1320.
U.S. Appl. No. 12/573,829 / Issue Notification dated Sep. 18, 2019, 1 page, Doc 1322.
U.S. Appl. No. 16/549,185 / Application filed Sep. 23, 2019, 73 pages, Doc 1323.
U.S. Appl. No. 16/549,185 / Filing Receipt and Notice to File Missing Parts dated Sep. 4, 2019, 6 pages, Doc 1324.
U.S. Appl. No. 16/549,185 / Response to Notice to File Missing Parts and Preliminary Amendment filed Sep. 5, 2019, 18 pages, Doc 2147.
U.S. Appl. No. 16/549,185 / Notice of Publication dated Dec. 19, 2019, 1 page, Doc 1325.
U.S. Appl. No. 16/549,185 / Updated Filing Receipt dated Sep. 6, 2019, 4 pages, Doc 1326.
U.S. Appl. No. 11/006,841 / Application filed Dec. 7, 2004, 67 pages, Doc 1329.
U.S. Appl. No. 11/006,841 / Pre-Exam Formalities Notice dated Jan. 10, 2005, 2 pages, Doc 1330.
U.S. Appl. No. 11/006,841 / Applicant Response to Pre-Exam Formalities Notice filed Apr. 14, 2005, 105 pages, Doc 1331.
U.S. Appl. No. 11/006,841 / Examiner's Search Strategies and Results dated Mar. 30, 2007, 14 pages, Doc 1332.
U.S. Appl. No. 11/006,841 / Non-Final Rejection dated Apr. 6, 2007, 18 pages, Doc 1333.
U.S. Appl. No. 11/006,841 / Response to Non-Final Rejection filed Sep. 6, 2007, 67 pages, Doc 1334.
U.S. Appl. No. 11/006,841 / Requirement for Restriction/Election dated Nov. 27, 2007, 5 pages, Doc 1335.
U.S. Appl. No. 11/006,841 / Request for Reconsideration after Non-Final Rejection filed Dec. 27, 2007, 41 pages, Doc 1336.
U.S. Appl. No. 11/006,841 / Requirement for Restriction/Election dated Mar. 17, 2008, 9 pages, Doc 1337.
U.S. Appl. No. 11/006,841 / Response to Election/Restriction filed Jul. 17, 2008, 38 pages, Doc 1339.

(56) References Cited

OTHER PUBLICATIONS

U.S. Appl. No. 11/006,841 / Final Office Action dated Oct. 29, 2008, 79 pages, Doc 1340.
U.S. Appl. No. 11/006,841 / RCE and Amendment filed Dec. 29, 2008, 48 pages, Doc 1341.
U.S. Appl. No. 11/006,841 / Advisory Action dated Jan. 6, 2009, 3 pages, Doc 1342.
U.S. Appl. No. 11/006,841 / Request for Continued Examination filed Apr. 23, 2009, 54 pages, Doc 1343.
U.S. Appl. No. 11/006,841 / Information Disclosure Statement and Remarks in an Amendment filed Jun. 26, 2009, 43 pages, Doc 1345.
U.S. Appl. No. 11/006,841 / Notice of Allowance and Fees Due dated Jun. 29, 2009, 69 pages, Doc 1346.
U.S. Appl. No. 11/006,841 / Issue Fee Payment; Information Disclosure Statement; Amendment After Notice of Allowance filed Sep. 29, 2009, 17 pages, Doc 1350.
U.S. Appl. No. 11/006,841 / Miscellaneous Communication to Applicant dated Oct. 21, 2009, 5 pages, Doc 1351.
U.S. Appl. No. 11/006,841 / Issue Notification dated Nov. 11, 2009, 1 page, Doc 1352.
U.S. Appl. No. 12/578,411 / Application filed Oct. 13, 2009, 75 pages, Doc 1354.
U.S. Appl. No. 12/578,411 / Notice to File Missing Parts dated Oct. 28, 2009, 6 pages, Doc 1355.
U.S. Appl. No. 12/578,411 / Applicant Response to Pre-Exam Formalities Notice filed Dec. 28, 2009, 27 pages, Doc 1356.
U.S. Appl. No. 12/578,411 / Filing Receipt dated Jan. 7, 2010, 3 pages, Doc 1357.
U.S. Appl. No. 12/578,411 / Requirement for Restriction/Election dated Jun. 8, 2011, 6 pages, Doc 1358.
U.S. Appl. No. 12/578,411 / Response to Election/Restriction filed Jul. 6, 2011, 20 pages, Doc 1359.
U.S. Appl. No. 12/578,411 / Non-Final Rejection dated Aug. 23, 2011, 25 pages, Doc 1360.
U.S. Appl. No. 12/578,411 / Amendment After Non-Final Rejection filed Dec. 22, 2011, 42 pages, Doc 1361.
U.S. Appl. No. 12/578,411 / Search Results by Examiner dated Jan. 20, 2012, 57 pages, Doc 1363.
U.S. Appl. No. 12/578,411 / Applicant Amendment submitted/Entered with Filing of CPA/RCE filed May 21, 2012, 28 pages, Doc 1364.
U.S. Appl. No. 12/578,411 / Refund Request filed May 24, 2012, 4 pages, Doc 1365.
U.S. Appl. No. 12/578,411 / Advisory Action dated May 31, 2012, 4 pages, Doc 1366.
U.S. Appl. No. 12/578,411 / Request for Continued Examination filed Jun. 12, 2012, 38 pages, Doc 1367.
U.S. Appl. No. 12/578,411 / Notice of Allowance and Fees Due, dated Aug. 19, 2012, 35 pages, Doc 1369.
U.S. Appl. No. 12/578,411 / Amendment After Notice of Allowance dated Nov. 14, 2013, 16 pages, Doc 1371.
U.S. Appl. No. 12/578,411 / Amendment After Final and Response to Amendment dated Nov. 19, 2013, 2 pages, Doc 1372.
U.S. Appl. No. 12/578,411 / Response to Amendment dated Dec. 3, 2013, 8 pages, Doc 1373.
U.S. Appl. No. 12/578,411 / Issue Notification dated Dec. 18, 2013, 1 page, Doc 1375.
U.S. Appl. No. 12/578,411 / Terminal Disclaimer dated Nov. 8, 2017, 7 pages, Doc 1376.
U.S. Appl. No. 14/086,837 / Application filed Nov. 21, 2013, 70 pages, Doc 2258.
U.S. Appl. No. 14/086,837 / Filing Receipt dated Dec. 12, 2013, 3 pages, Doc 2259.
U.S. Appl. No. 14/086,837 / Notice to File Missing Parts dated Dec. 12, 2013, 2 pages, Doc 2261.
U.S. Appl. No. 14/086,837 / Preliminary Amendment and Response to Notice to File Missing Parts filed Jun. 11, 2013, 28 pages, Doc 2262.
U.S. Appl. No. 14/086,837 / Notice of Publication dated Sep. 25, 2014, 1 page, Doc 2260.
U.S. Appl. No. 14/086,837 / Two Terminal Disclaimers filed Nov. 14, 2014, 4 pages, Doc 2263.
U.S. Appl. No. 14/086,837 / Notice of Allowance/Allowability dated Dec. 2, 2014, 19 pages, Doc 2264.
U.S. Appl. No. 14/086,837 / Issue Fee and 312 Amendment filed Feb. 27, 2015, 12 pages, Doc 2265.
U.S. Appl. No. 14/086,837 / Issue Notification dated May 6, 2015, 1 page, Doc 2266.
U.S. Appl. No. 14/635,836 / Application filed Mar. 2, 2015, 75 pages, Doc 2267.
U.S. Appl. No. 14/635,836 / Filing Receipt dated Mar. 12, 2015, 3 pages, Doc 2268.
U.S. Appl. No. 14/635,836 / Notice to File Missing Parts dated Mar. 12, 2015, 2 pages, Doc 2270.
U.S. Appl. No. 14/635,836 / Preliminary Amendment and Response to Notice to File Missing Parts filed May 12, 2015, 42 pages, Doc 2271.
U.S. Appl. No. 14/635,836 / Notice of Publication dated Aug. 27, 2015, 1 page, Doc 2269.
U.S. Appl. No. 14/635,836 / Terminal Disclaimer filed Nov. 13, 2015, 5 pages, Doc 2272.
U.S. Appl. No. 14/635,836 / Notice of Allowance/Allowability dated Apr. 18, 2016, 65 pages, Doc 2273.
U.S. Appl. No. 14/635,836 / Issue Fee and 312 Amendment filed Jul. 15, 2016, 17 pages, Doc 2274.
U.S. Appl. No. 14/635,836 / Issue Notification dated Aug. 16, 2016, 1 page, Doc 2275.
U.S. Appl. No. 15/250,118 / Application filed Aug. 29, 2016, 96 pages, Doc 2276.
U.S. Appl. No. 15/250,118 / Notice to File Corrected Application Papers dated Sep. 9, 2016, 2 pages, Doc 2277.
U.S. Appl. No. 15/250,118 / Filing Receipt dated Sep. 9, 2016, 3 pages, Doc 2278.
U.S. Appl. No. 15/250,118 / Response to Notice to File Corrected Application Papers and Revised Figures filed Nov. 8, 2016, 23 pages, Doc 2280.
U.S. Appl. No. 15/250,118 / Notice of Publication dated Feb. 23, 2017, 1 page, Doc 2279.
U.S. Appl. No. 15/250,118 / Non-final Office Action dated Jun. 15, 2017, 30 pages, Doc 2281.
U.S. Appl. No. 15/250,118 / Response to Non-final Office Action filed Sep. 14, 2017, 46 pages, Doc 2282.
U.S. Appl. No. 15/250,118 / Final Office Action dated Dec. 15, 2017, 69 pages, Doc 2283.
U.S. Appl. No. 15/250,118 / RCE and Amendment filed Dec. 15, 2017, 48 pages, Doc 2284.
U.S. Appl. No. 15/250,118 / Terminal Disclaimer filed Dec. 11, 2017, 6 pages, Doc 2285.
U.S. Appl. No. 15/250,118 / Notice of Allowance/Allowability filed Jan. 8, 2019, 41 pages, Doc 2286.
U.S. Appl. No. 15/250,118 / Amendment filed Jan. 23, 2019, 20 pages, Doc 2287.
U.S. Appl. No. 15/250,118 / Issue Fee and 312 Amendment filed Apr. 5, 2019, 22 pages, Doc 2288.
U.S. Appl. No. 15/250,118 / Issue Notification dated Apr. 5, 2019, 1 page, Doc 2298.
U.S. Appl. No. 16/379,674 / Application filed Apr. 9, 2019, 88 pages, Doc 2148.
U.S. Appl. No. 16/379,674 / Filing Receipt Apr. 24, 2019, 4 pages, Doc 2149.
U.S. Appl. No. 16/379,674 / Notice of Publication dated Aug. 1, 2019, 1 page, Doc 1016.
U.S. Appl. No. 16/379,674 / Office Action, dated Oct. 19, 2020, 69 pages, Doc 2151.
U.S. Appl. No. 16/379,674 / Response to Office Action filed Feb. 19, 2021, 21 pages, Doc 2173.
U.S. Appl. No. 16/379,674 / Final Office Action dated Apr. 5, 2021, 21 pages, Doc 2289.
U.S. Appl. No. 16/379,674 / Final Office Action dated Apr. 9, 2021, 21 pages, Doc 2301.
U.S. Appl. No. 16/379,674 / Request for Continued Examination, Amendment and Terminal Disclaimer filed Jul. 1, 2021, 25 pages, Doc 2302.

(56) References Cited

OTHER PUBLICATIONS

U.S. Appl. No. 11/006,440 / Application filed Dec. 6, 2004, 87 pages, Doc 1377.
U.S. Appl. No. 11/006,440 / Pre-Exam Formalities Notice dated Jan. 11, 2005, 2 pages, Doc 1378.
U.S. Appl. No. 11/006,440 / Preliminary Amendment filed May 2, 2005, 140 pages, Doc 1379.
U.S. Appl. No. 11/006,440 / Preliminary Amendment filed Oct. 10, 2006, 139 pages, Doc 1380.
U.S. Appl. No. 11/006,440 / Requirement for Restriction/Election dated Mar. 29, 2007, 5 pages, Doc 1381.
U.S. Appl. No. 11/006,440 / Response to Election/Restriction filed Apr. 30, 2007, 43 pages, Doc 1382.
U.S. Appl. No. 11/006,440 / Examiner's Search Strategies and Results dated Jun. 19, 2007, 5 pages, Doc 1383.
U.S. Appl. No. 11/006,440 / Non-Final Rejection dated Jun. 21, 2007, 21 pages, Doc 1384.
U.S. Appl. No. 11/006,440 / Request for Reconsideration After Non-Final Rejection filed Nov. 20, 2007, 47 pages, 1385.
U.S. Appl. No. 11/006,440 / Examiner's Search Strategies and Results, dated Feb. 1, 2008, 11 pages, Doc 1386.
U.S. Appl. No. 11/006,440 / Final Rejection dated Feb. 6, 2008, 18 pages, Doc 1387.
U.S. Appl. No. 11/006,440 / Response After Final Action dated Apr. 7, 2008, 37 pages, Doc 1388.
U.S. Appl. No. 11/006,440 / Notice of Appeal filed Aug. 4, 2008, 6 pages, Doc 1390.
U.S. Appl. No. 11/006,440 / Request for Continued Examination filed Nov. 4, 2008, 43 pages, Doc 1391.
U.S. Appl. No. 11/006,440 / Non-Final Rejection dated Jan. 23, 2009, 69 pages, Doc 1392.
U.S. Appl. No. 11/006,440 / Request for Reconsideration After Non-Final Rejection filed Apr. 23, 2009, 36 pages, Doc 1393.
U.S. Appl. No. 11/006,440 / Supplemental Response or Supplemental Amendment filed Jul. 17, 2009, 31 pages, Doc 1394.
U.S. Appl. No. 11/006,440 / Notice of Allowance and Fees Due dated Jul. 31, 2009, 58 pages, Doc 1395.
U.S. Appl. No. 11/006,440 / Amendment After Notice of Allowance and Issue Fee Payment filed Nov. 2, 2009, 14 pages, Doc 1402.
U.S. Appl. No. 11/006,440 / Issue Notification dated Dec. 2, 2009, 1 page, Doc 1405.
U.S. Appl. No. 12/627,816 / Claims Worksheet filed Nov. 24, 2009, 1 page, Doc 1406.
U.S. Appl. No. 12/627,816 / Preliminary Amendment, Application and Declaration filed Nov. 30, 2009, 94 pages, Doc 1407.
U.S. Appl. No. 12/627,816 / Notice to File Missing Parts, dated Dec. 15, 2009, 5 pages, Doc 1408.
U.S. Appl. No. 12/627,816 / Applicant Response to Pre-Exam Formalities Notice filed Apr. 12, 2010, 25 pages, Doc 1409.
U.S. Appl. No. 12/627,816 / Filing Receipt dated Apr. 20, 2010, 3 pages, Doc 1410.
U.S. Appl. No. 12/627,816 / Notice of Publication dated Jul. 29, 2010, 1 page, Doc 1411.
U.S. Appl. No. 12/627,816 / Non-Final Rejection dated May 5, 2011, 94 pages, Doc 1412.
U.S. Appl. No. 12/627,816 / Response to Final Office Action filed Nov. 7, 2011, 17 pages, Doc 1413.
U.S. Appl. No. 12/627,816 / Final Rejection dated Nov. 17, 2011, 21 pages, Doc 1414.
U.S. Appl. No. 12/627,816 / Terminal Disclaimer Review Decision dated Feb. 7, 2012, 1 page, Doc 1416.
U.S. Appl. No. 12/627,816 / Request for Continued Examination filed Feb. 17, 2012, 21 pages, Doc 1415.
U.S. Appl. No. 12/627,816 / Notice of Allowance and Fees Due dated Aug. 1, 2013, 51 pages, Doc 1417.
U.S. Appl. No. 12/627,816 / Issue Fee Payment and Amendment After Notice of Allowance dated Nov. 1, 2013, 16 pages, Doc 1420.
U.S. Appl. No. 12/627,816 / Miscellaneous Communication to Applicant dated Nov. 5, 2013, 4 pages, Doc 1421.
U.S. Appl. No. 12/627,816 / Amendment After Final Initialed by Examiner dated Nov. 9, 2013, 2 pages, Doc 1422.
U.S. Appl. No. 12/627,816 / Response to Amendment Under Rule 312 dated Nov. 12, 2013, 3 pages, Doc 1423.
U.S. Appl. No. 12/627,816 / Issue Notification dated Nov. 26, 2013, 1 page, Doc 1425.
U.S. Appl. No. 14/086,808 / Application filed Nov. 21, 2013, 89 pages, Doc 1428.
U.S. Appl. No. 14/086,808 / Notice to File Missing Parts dated Dec. 11, 2013, 6 pages, Doc 1429.
U.S. Appl. No. 14/086,808 / Applicant Response to Pre-Exam Formalities Notice and Declaration and Preliminary Amendment filed Jun. 11, 2014, 71 pages, Doc 1430.
U.S. Appl. No. 14/086,808 / Filing Receipt dated Jun. 17, 2014, 4 pages, Doc 1431.
U.S. Appl. No. 14/086,808 / Notice of Publication dated Sep. 25, 2014, 1 page, Doc 1432.
U.S. Appl. No. 14/086,808 / Terminal Disclaimer filed Oct. 24, 2014, 6 page, Doc 1433.
U.S. Appl. No. 14/086,808 / Terminal Disclaimer Review Decision dated Oct. 29, 2014, 1 page, Doc 1434.
U.S. Appl. No. 14/086,808 / Terminal Disclaimer and Power of Attorney filed Nov. 4, 2014, 6 pages, Doc 1435.
U.S. Appl. No. 14/086,808 / Terminal Disclaimer Review Decision dated Nov. 13, 2014, 1 page, Doc 1437.
U.S. Appl. No. 14/086,808 / Notice of Allowance and Fees Due dated Nov. 17, 2014, 68 pages, Doc 1438.
U.S. Appl. No. 14/086,808 / Amendment After Notice of Allowance and Issue Fee Payment dated Feb. 17, 2015, 25 pages, Doc 1439.
U.S. Appl. No. 14/086,808 / Response to Amendment under Rule 312 and Miscellaneous Communication to Applicant dated Feb. 20, 2015, 2 pages, Doc 1440.
U.S. Appl. No. 14/086,808 / Amendment After Final, Initialed by Examiner and Response to Amendment Under Rule 312 dated Feb. 25, 2015, 10 pages, Doc 1441.
U.S. Appl. No. 14/086,808 / Issue Notification dated Mar. 18, 2015, 1 page, Doc 1443.
U.S. Appl. No. 14/625,473 / Application, Declaration and Power of Attorney filed Feb. 18, 2015, 97 pages, Doc 1444.
U.S. Appl. No. 14/625,473 / Notice to File Missing Parts dated Mar. 18, 2015, 6 pages, Doc 1445.
U.S. Appl. No. 14/625,473 / Applicant Response to Pre-Exam Formalities Notice and Applicant Arguments/ Remarks Made in an Amendment filed May 18, 2015, 33 pages, Doc 1446.
U.S. Appl. No. 14/625,473 / Filing Receipt dated May 20, 2015, 4 pages, Doc 1447.
U.S. Appl. No. 14/625,473 / Notice of Publication dated Aug. 27, 2015, 1 page, Doc 1448.
U.S. Appl. No. 14/625,473 / Terminal Disclaimer filed Nov. 13, 2015, 7 pages, Doc 1449.
U.S. Appl. No. 14/625,473 / Notice of Allowance and Fees Due and List of References dated Mar. 28, 2016, 91 pages, Doc 1450.
U.S. Appl. No. 14/625,473 / Amendment After Notice of Allowance and Issue Fee Paid filed Jun. 28, 2016, 28 pages, Doc 1453.
U.S. Appl. No. 14/625,473 / Response to Amendment Under Rule 312 dated Jun. 30, 2016, 1 page, Doc 1454.
U.S. Appl. No. 14/625,473 / Response to Amendment Under Rule 312 dated Jul. 6, 2016, 3 pages, Doc 1455.
U.S. Appl. No. 14/625,473 / Issue Notification dated Jul. 20, 2016, 1 page, Doc 1457.
U.S. Appl. No. 15/214,168 / Application, Declaration and Preliminary Amendment filed Jul. 19, 2016, 124 pages, Doc 1458.
U.S. Appl. No. 15/214,168 / Filing Receipt and Response Re: Informal Power of Attorney dated Aug. 3, 2016, 6 pages, Doc 1459.
U.S. Appl. No. 15/214,168 / Request for Corrected Filing Receipt and Power of Attorney filed Oct. 7, 2016, 14 pages, Doc 1462.
U.S. Appl. No. 15/214,168 / Filing Receipt dated Oct. 12, 2016, 5 pages, Doc 1463.
U.S. Appl. No. 15/214,168 / Notice of Publication dated Nov. 10, 2016, 1 page, Doc 1464.
U.S. Appl. No. 15/214,168 / Non-Final Rejection dated Mar. 2, 2017, 38 pages, Doc 1465.

(56) References Cited

OTHER PUBLICATIONS

U.S. Appl. No. 15/214,168 / Amendment / Request for Reconsideration After Non-Final Rejection filed Jun. 2, 2017, 42 pages, Doc 1466.
U.S. Appl. No. 15/214,168 / Terminal Disclaimer filed Jul. 17, 2017, 8 pages, 1467.
U.S. Appl. No. 15/214,168 / Notice of Allowance and Fees Due dated Aug. 1, 2017, 124 pages, Doc 1468.
U.S. Appl. No. 15/214,168 / Amendment After Notice of Allowance and Issue Fee Payment filed Nov. 1, 2017, 27 pages, Doc 1469.
U.S. Appl. No. 15/214,168 / Miscellaneous Communication to Applicant and Amendment After Final or Under 37CFR 1.312, Initialed by Examiner dated Nov. 6, 2017, 5 pages, Doc 1470.
U.S. Appl. No. 15/214,168 / Issue Notification dated Nov. 21, 2017, 1 page, Doc 1472.
U.S. Appl. No. 16/710,577 / US Reissue Patent Application and Preliminary Amendment filed Dec. 11, 2019, 88 pages, Doc 1017.
U.S. Appl. No. 16/710,577 / Filing Receipt dated Jan. 10, 2020, 4 pages, Doc 1018.
U.S. Appl. No. 16/710,577 / Non-final Office Action dated Mar. 19, 2021, 11 pages, Doc 2174.
U.S. Appl. No. 15/802,348 / Application, Preliminary Amendment and Declaration filed Nov. 2, 2017, 134 pages, Doc 1475.
U.S. Appl. No. 15/802,348 / Notice to File Corrected Application Papers dated Nov. 30, 2017, 7 pages, Doc 1476.
U.S. Appl. No. 15/802,348 / Applicant Response to Pre-Exam Formalities Notice filed Jan. 9, 2018, 19 pages, Doc 1477.
U.S. Appl. No. 15/802,348 / Filing Receipt dated Jan. 11, 2018, 5 pages, Doc 1478.
U.S. Appl. No. 15/802,348 / Notice of Publication dated Apr. 19, 2018, 1 page, Doc 1479.
U.S. Appl. No. 15/802,348 / Preliminary Amendment filed Oct. 26, 2018, 27 pages, Doc 1480.
U.S. Appl. No. 15/802,348 / Non-Final Rejection dated Feb. 11, 2019, 174 pages, Doc 1481.
U.S. Appl. No. 15/802,348 / Amendment/ Request for Reconsideration After Non-Final Rejection filed May 13, 2019, 25 pages, Doc 1482.
U.S. Appl. No. 15/802,348 / Final Office Action dated Jul. 9, 2019, 24 pages, Doc 1019.
U.S. Appl. No. 15/802,348 / Response to Final Office Action filed Aug. 20, 2019, 29 pages, Doc 1020.
U.S. Appl. No. 15/802,348 / Advisory Action dated Sep. 4, 2019, 3 pages, Doc 1021.
U.S. Appl. No. 15/802,348 / RCE and Amendment filed Sep. 16, 2019, 30 pages, Doc 1022.
U.S. Appl. No. 15/802,348 / Terminal Disclaimer filed Mar. 18, 2020, 9 pages, Doc 1488.
U.S. Appl. No. 15/802,348 / Notice of Allowance and Fees Due dated Mar. 27, 2020, 178 pages, Doc 1489.
U.S. Appl. No. 15/802,348 / Issue Fee Payment filed Jun. 19, 2020, 9 pages, Doc 1491.
U.S. Appl. No. 15/802,348 / Issue Notification dated Jul. 8, 2020, 1 page, Doc 1494.
U.S. Appl. No. 16/909,899 / Application filed Jun. 23, 2020, 98 pages, Doc 2140.
U.S. Appl. No. 16/909,899 / Filing Receipt and Notice to File Missing Parts Jul. 6, 2020, 8 pages, Doc 2141.
U.S. Appl. No. 16/909,899 / Preliminary Amendment and Response to Missing Parts filed Sep. 8, 2020, 31 pages, Doc 2142.
U.S. Appl. No. 16/909,899 / Updated Filing Receipt Sep. 10, 2020, 6 pages, Doc 2143.
U.S. Appl. No. 16/909,899 / Notice of Publication dated Dec. 17, 2020, 6 pages, Doc 2161.
U.S. Appl. No. 11/006,446 / New Application filed Dec. 6, 2004, 91 pages, Doc 1495.
U.S. Appl. No. 11/006,446 / Pre-Exam Formalities Notice dated Jan. 24, 2005, 3 pages, Doc 1496.
U.S. Appl. No. 11/006,446 / Preliminary Amendment filed May 2, 2005, 118 pages, Doc 1497.
U.S. Appl. No. 11/006,446 / Requirement for Restriction / Election dated Apr. 4, 2007, 5 pages, Doc 1498.
U.S. Appl. No. 11/006,446 / Response to Election / Restriction filed May 3, 2007, 6 pages, Doc 1499.
U.S. Appl. No. 11/006,446 / Non-Final Rejection dated Jul. 26, 2007, 34 pages, Doc 1502.
U.S. Appl. No. 11/006,446 / Amendment, Request for Reconsideration After Non-Final Rejection filed Nov. 26, 2007, 37 pages, Doc 1503.
U.S. Appl. No. 11/006,446 / Examiner's Search Strategies and Results dated Feb. 7, 2008, 1 page, Doc 1504.
U.S. Appl. No. 11/006,446 / Non-Final Rejection dated Feb. 20, 2008, 58 pages, Doc 1506.
U.S. Appl. No. 11/006,446 / Amendment / Request for Reconsideration After Non-Final Rejection dated Jul. 21, 2008, 33 pages, Doc 1507.
U.S. Appl. No. 11/006,446 / Final Rejection dated Oct. 28, 2008, 49 pages, Doc 1508.
U.S. Appl. No. 11/006,446 / Amendment Submitted / Entered with Filing of CPA/RCE filed Dec. 29, 2008, 33 pages, Doc 1509.
U.S. Appl. No. 11/006,446 / Advisory Action dated Jan. 7, 2009, 4 pages, Doc 1510.
U.S. Appl. No. 11/006,446 / Request for Continued Examination dated Apr. 28, 2009, 38 pages, Doc 1511.
U.S. Appl. No. 11/006,446 / Non-Final Rejection dated Jul. 7, 2009, 41 pages, Doc 1512.
U.S. Appl. No. 11/006,446 / Examiner Interview Summary Record and Examiner's Search Strategy and Results dated Oct. 26, 2009, 6 pages, Doc 1513.
U.S. Appl. No. 11/006,446 / Amendment / Request for Reconsideration After Non-Final Rejection dated Dec. 7, 2009, 33 pages, Doc 1514.
U.S. Appl. No. 11/006,446 / Notice of Allowance and Fees Due dated Mar. 19, 2010, 135 pages, Doc 1515.
U.S. Appl. No. 11/006,446 / Amendment After Notice of Allowance and Issue Fee Payment filed Jun. 21, 2010, 25 pages, Doc 1518.
U.S. Appl. No. 11/006,446 / Response to Amendment After Rule 312 dated Aug. 19, 2010, 3 pages, Doc 1520.
U.S. Appl. No. 11/006,446 / Drawings filed Aug. 25, 2010, 31 pages, Doc 1521.
U.S. Appl. No. 11/006,446 / Issue Notification dated Sep. 1, 2010, 1 page, Doc 1522.
U.S. Appl. No. 12/830,236 / Application, Declaration and Preliminary Amendment filed Jul. 2, 2010, 106 pages, Doc 1524.
U.S. Appl. No. 12/830,236 / Fee Worksheet filed Jul. 15, 2010, 1 page, Doc 1525.
U.S. Appl. No. 12/830,236 / Notice to File Corrected Application Papers dated Jul. 16, 2010, 5 pages, Doc 1526.
U.S. Appl. No. 12/830,236 / Applicant Response to Pre-Exam Formalities Notice filed Aug. 25, 2010, 34 pages, Doc 1527.
U.S. Appl. No. 12/830,236 / Filing Receipt dated Sep. 3, 2010, 3 pages, Doc 1528.
U.S. Appl. No. 12/830,236 / Notice of Publication dated Dec. 16, 2010, 1 page, Doc 1529.
U.S. Appl. No. 12/830,236 / Requirement for Restriction / Election dated Mar. 18, 2011, 6 pages, Doc 1530.
U.S. Appl. No. 12/830,236 / Response to Election / Restriction filed Apr. 18, 2011, 8 pages, Doc 1531.
U.S. Appl. No. 12/830,236 / Non-Final Rejection dated May 11, 2011, 29 pages, Doc 1532.
U.S. Appl. No. 12/830,236 / Amendment / Request for Reconsideration After Non-Final Rejection filed Jul. 6, 2011, 20 pages, Doc 1533.
U.S. Appl. No. 12/830,236 / Final Rejection dated Oct. 14, 2011, 54 pages, Doc 1534.
U.S. Appl. No. 12/830,236 / Response After Final Action filed Jan. 17, 2012, 26 pages, Doc 1535.
U.S. Appl. No. 12/830,236 / Advisory Action dated Feb. 8, 2012, 6 pages, Doc 1536.
U.S. Appl. No. 12/830,236 / Notice of Appeal filed Mar. 8, 2012, 6 pages, Doc 1537.
U.S. Appl. No. 12/830,236 / Request for Continued Examination filed Jun. 5, 2012, 24 pages, Doc 1538.

(56) References Cited

OTHER PUBLICATIONS

U.S. Appl. No. 12/830,236 / Non-Final Rejection dated Jul. 31, 2012, 28 pages, Doc 1540.
U.S. Appl. No. 12/830,236 / Amendment / Request for Reconsideration After Non-Final Rejection filed Nov. 1, 2012, 28 pages, Doc 1541.
U.S. Appl. No. 12/830,236 / Final Rejection dated Feb. 27, 2013, 42 pages, Doc 1542.
U.S. Appl. No. 12/830,236 / Response After Final Action dated Jun. 27, 2013, 42 pages, Doc 1543.
U.S. Appl. No. 12/830,236 / Advisory Action and Amendment After Final dated Jul. 12, 2013, 4 pages, Doc 1544.
U.S. Appl. No. 12/830,236 / Notice of Appeal Filed Jul. 19, 2013, 6 pages, Doc 1545.
U.S. Appl. No. 12/830,236 / Appeal Brief filed Sep. 18, 2013, 44 pages, Doc 1546.
U.S. Appl. No. 12/830,236 / Examiner's Answer to Appeal Brief dated Dec. 18, 2013, 35 pages, Doc 1547.
U.S. Appl. No. 12/830,236 / Reply Brief filed Feb. 18, 2014, 18 pages, Doc 1548.
U.S. Appl. No. 12/830,236 / Appeal Docketing Notice filed Mar. 21, 2014, 2 pages, Doc 1550.
U.S. Appl. No. 12/830,236 / Patent Board Decision—Examiner Affirmed dated Mar. 9, 2016, 6 pages, Doc 1551.
U.S. Appl. No. 12/830,236 / Request for Continued Examination filed Apr. 27, 2016, 20 pages, Doc 1552.
U.S. Appl. No. 12/830,236 / Non-Final Rejection dated Jun. 29, 2016, 113 pages, Doc 1553.
U.S. Appl. No. 12/830,236 / Applicant Initiated Review Summary dated Aug. 30, 2016, 6 pages, Doc 1555.
U.S. Appl. No. 12/830,236 / Amendment / Request for Reconsideration After Non-Final Rejection filed Sep. 6, 2016, 15 pages, Doc 1556.
U.S. Appl. No. 12/830,236 / Applicant Initiated Interview Summary dated Sep. 9, 2016, 5 pages, Doc 1557.
U.S. Appl. No. 12/830,236 / Final Rejection dated Dec. 14, 2016, 98 pages, Doc 1558.
U.S. Appl. No. 12/830,236 / Response After Final Action filed Feb. 13, 2017, 17 pages, Doc 1559.
U.S. Appl. No. 12/830,236 / Amendment After Final Action or under 37CFR 1.312 dated Mar. 3, 2017, 3 pages, Doc 1560.
U.S. Appl. No. 12/830,236 / Request for Continued Examination filed Apr. 4, 2017, 23 pages, Doc 1561.
U.S. Appl. No. 12/830,236 / Non-Final Rejection dated Jun. 21, 2017, 90 pages, Doc 1562.
U.S. Appl. No. 12/830,236 / Applicant Initiated Review Summary dated Oct. 5, 2017, 9 pages, Doc 1563.
U.S. Appl. No. 12/830,236 / Amendment / Request for Reconsideration After Non-Final Rejection filed Oct. 23, 2017, 23 pages, Doc 1564.
U.S. Appl. No. 12/830,236 / Non-Final Rejection dated Feb. 6, 2018, 91 pages, Doc 1565.
U.S. Appl. No. 12/830,236 / Amendment / Request for Reconsideration After Non-Final Rejection filed May 4, 2018, 29 pages, Doc 1566.
U.S. Appl. No. 12/830,236 / Final Rejection dated Sep. 5, 2018, 65 pages, Doc 1567.
U.S. Appl. No. 12/830,236 / After Final Consideration Program Request filed Nov. 5, 2018, 27 pages, Doc 1568.
U.S. Appl. No. 12/830,236 / Advisory Action dated Nov. 19, 2018, 7 pages, Doc 1569.
U.S. Appl. No. 12/830,236 / Request for Continued Examination filed Dec. 31, 2018, 30 pages, Doc 1570.
U.S. Appl. No. 12/830,236 / Notice of Allowance and Fees Due dated Apr. 2, 2019, 53 pages, Doc 1571.
U.S. Appl. No. 12/830,236 / Supplemental Notice of Allowability dated May 21, 2019, 24 pages, Doc 1023.
U.S. Appl. No. 12/830,236 / Issue Fee Payment dated Jul. 1, 2019, 3 pages, Doc 1024.
U.S. Appl. No. 12/830,236 / Supplemental Allowability dated Jul. 9, 2019, 8 pages, Doc 1573.
U.S. Appl. No. 12/830,236 / Issue Notification dated Jul. 24, 2019, 1 page, Doc 1025.
U.S. Appl. No. 16/459,930 U.S. Appl. No. 16/459,930, filed Jul. 2, 2019, 99 pages, Doc 1026.
U.S. Appl. No. 16/459,930 / Filing Receipt and Notice to File Missing Parts and Filing Receipt dated Jul. 18, 2019, 7 pages, Doc 1577.
U.S. Appl. No. 16/459,930 / Response to Notice to File Missing Parts and Preliminary Amendment dated Sep. 4, 2019, 19 pages, Doc 1029.
U.S. Appl. No. 16/459,930 / Updated Filing Receipt dated Sep. 6, 2019, 4 pages, Doc 1030.
U.S. Appl. No. 16/459,930 / Notice of Publication dated Dec. 12, 2019, 1 page, Doc 1031.
U.S. Appl. No. 16/459,930 / Non-Final Rejection dated Oct. 6, 2020, 43 pages, Doc 1581.
U.S. Appl. No. 16/459,930 / Response to Non-Final Rejection filed Mar. 8, 2021, 19 pages, Doc 2175.
U.S. Appl. No. 16/459,930 / Non-final Office Action dated Jun. 9, 2021, 17 pages, Doc 2304.
U.S. Appl. No. 11/385,257 / New Application Filed Mar. 20, 2006, 118 pages, Doc 1582.
U.S. Appl. No. 11/385,257 / Pre-Exam Formalities Notice dated May 3, 2006, 2 pages, Doc 1583.
U.S. Appl. No. 11/385,257 / Applicant Response to Pre-Exam Formalities Notice filed Aug. 3, 2006, 46 pages, Doc 1584.
U.S. Appl. No. 11/385,257 / Notice of Publication dated Nov. 30, 2006, 1 page, Doc 1585.
U.S. Appl. No. 11/385,257 / Non-Final Rejection dated Apr. 29, 2008, 44 pages, Doc 1586.
U.S. Appl. No. 11/385,257 / Transmittal Letter May 23, 2008, 2 pages, Doc 1587.
U.S. Appl. No. 11/385,257 / Amendment / Request for Reconsideration After Non-Final Rejection filed Jul. 29, 2008, 29 pages, Doc 1588.
U.S. Appl. No. 11/385,257 / Final Rejection dated Dec. 9, 2008, 47 pages, Doc 1589.
U.S. Appl. No. 11/385,257 / Request for Continued Examination filed May 11, 2009, 36 pages, Doc 1590.
U.S. Appl. No. 11/385,257 / Supplemental Response or Supplemental Amendment filed May 26, 2009, 3 pages, Doc 1591.
U.S. Appl. No. 11/385,257 / Notice to the Applicant Regarding a Non-Compliant or Non-Responsive Amendment dated Jun. 1, 2009, 3 pages, Doc 1592.
U.S. Appl. No. 11/385,257 / Amendment / Request for Reconsideration After Non-Final Rejection filed Jun. 30, 2009, 34 pages, Doc 1593.
U.S. Appl. No. 11/385,257 / Non-Final Rejection dated Sep. 14, 2009, 47 pgs, Doc 1594.
U.S. Appl. No. 11/385,257 / Amendment / Request After Non-Final Rejection filed Jan. 13, 2010, 37 pages, Doc 1595.
U.S. Appl. No. 11/385,257 / Final Rejection dated Apr. 12, 2010, 55 pages, Doc 1596.
U.S. Appl. No. 11/385,257 / Request for Continued Examination filed Aug. 12, 2010, 40 pages, Doc 1597.
U.S. Appl. No. 11/385,257 / Non-Final Rejection dated Sep. 30, 2010, 56 pages, Doc 1598.
U.S. Appl. No. 11/385,257 / Amendment / Request for Reconsideration After Non-Final Rejection filed Mar. 29, 2011, 36 pages, Doc 1599.
U.S. Appl. No. 11/385,257 / Final Rejection dated Jun. 1, 2011, 47 pages, Doc 1600.
U.S. Appl. No. 11/385,257 / Request for Continued Examination dated Nov. 1, 2011, 37 pages, Doc 1601.
U.S. Appl. No. 11/385,257 / Non-Final Rejection dated Jan. 9, 2012, 53 pages, Doc 1602.
U.S. Appl. No. 11/385,257 / Amendment / Request for Reconsideration After Non-Final Rejection filed Apr. 6, 2012, 30 pages, Doc 1603.
U.S. Appl. No. 11/385,257 / Notice of Allowance and Fees Due dated Jun. 22, 2012, 45 pages, Doc 1604.

(56) References Cited

OTHER PUBLICATIONS

U.S. Appl. No. 11/385,257 / Notice of Allowance and Fees Due dated Oct. 4, 2012, 4 pages, Doc 1606.
U.S. Appl. No. 11/385,257 / Amendment After Notice of Allowance filed Dec. 12, 2012, 8 pages, Doc 1608.
U.S. Appl. No. 11/385,257 / Issue Notification dated Dec. 22, 2012, 1 page, Doc 1610.
U.S. Appl. No. 13/625,812 / Application filed Sep. 24, 2012, 123 pages, Doc 1612.
U.S. Appl. No. 13/625,812 / Notice to File Missing Parts and Filing Receipt dated Oct. 15, 2012, 6 pages, Doc 1613.
U.S. Appl. No. 13/625,812 / Preliminary Amendment dated Mar. 8, 2013, 50 pages, Doc 1614.
U.S. Appl. No. 13/625,812 / Notice of Incomplete Reply dated Mar. 15, 2013, 3 pages, Doc 1615.
U.S. Appl. No. 13/625,812 / Applicant Response to Pre-Exam Formalities Notice filed Apr. 2, 2013, 5 pages, Doc 1616.
U.S. Appl. No. 13/625,812 / Notice of Incomplete Reply dated Apr. 10, 2013, 3 pages, Doc 1617.
U.S. Appl. No. 13/625,812 / Filing Receipt and Miscellaneous Communication to Applicant dated Apr. 22, 2013, 5 pages, Doc 1619.
U.S. Appl. No. 13/625,812 / General Transmittal of Replacement Application Data Sheet filed May 10, 2013, 8 pages, Doc 1620.
U.S. Appl. No. 13/625,812 / Non-Final Rejection dated Jul. 26, 2013, 64 pages, Doc 1621.
U.S. Appl. No. 13/625,812 / Notice of Publication dated Aug. 1, 2013, 1 page, Doc 1622.
U.S. Appl. No. 13/625,812 / Amendment / Request for Reconsideration After Non-Final Rejection filed Oct. 9, 2013, 18 pages, Doc 1623.
U.S. Appl. No. 13/625,812 / Final Rejection dated Dec. 3, 2013, 35 pages, Doc 1624.
U.S. Appl. No. 13/625,812 / Response After Final Action filed Apr. 1, 2014, 25 pages, Doc 1625.
U.S. Appl. No. 13/625,812 / Advisory Action dated Apr. 9, 2014, 3 pages, Doc 1626.
U.S. Appl. No. 13/625,812 / Notice of Appeal filed May 5, 2014, 6 pages, Doc 1627.
U.S. Appl. No. 13/625,812 / Request for Continued Examination filed Aug. 4, 2014, 25 pages, Doc 1628.
U.S. Appl. No. 13/625,812 / Request for Corrected Filing Receipt filed Aug. 21, 2014, 9 pages, Doc 1629.
U.S. Appl. No. 13/625,812 / Filing Receipt dated Aug. 27, 2014, 3 pages, Doc 1630.
U.S. Appl. No. 13/625,812 / Notice of Allowance and Fees Due dated Dec. 9, 2014, 36 pages, Doc 1631.
U.S. Appl. No. 13/625,812 / Filing Receipt dated Feb. 2, 2015, 3 pages, Doc 1632.
U.S. Appl. No. 13/625,812 / Filing Receipt dated Feb. 6, 2015, 3 pages, Doc 1634.
U.S. Appl. No. 13/625,812 / Terminal Disclaimer filed Mar. 2, 2015, 5 pages, Doc 1635.
U.S. Appl. No. 13/625,812 / Post-Allowance Communication—Incoming filed Mar. 6, 2015, 8 pages, Doc 1636.
U.S. Appl. No. 13/625,812 / Issue Fee Payment and Amendment After Notice of Allowance filed Mar. 9, 2015, 8 pages, Doc 1637.
U.S. Appl. No. 13/625,812 / Terminal Disclaimer Review Decision dated Mar. 12, 2015, 1 page, Doc 1639.
U.S. Appl. No. 13/625,812 / Issue Notification dated Apr. 8, 2015, 1 page, Doc 1641.
U.S. Appl. No. 13/625,812 / Terminal Disclaimer filed Apr. 14, 2015, 14 pages, Doc 1642.
U.S. Appl. No. 13/625,812 / Terminal Disclaimer Review Decision dated Apr. 17, 2015, 1 page, Doc 1643.
U.S. Appl. No. 14/641,735 / Application, Declaration and Power of Attorney filed Mar. 9, 2015, 128 pages, Doc 1645.
U.S. Appl. No. 14/641,735 / Notice to File Missing Parts dated Mar. 20, 2015, 6 pages, Doc 1646.
U.S. Appl. No. 14/641,735 / Preliminary Amendment filed Jun. 22, 2015, 41 pages, Doc 1647.
U.S. Appl. No. 14/641,735 / Notice of Incomplete Reply dated Jun. 26, 2015, 3 pages, Doc 1648.
U.S. Appl. No. 14/641,735 / Applicant Response to Pre-Exam Formalities Notice filed Jul. 8, 2015, 36 pages, Doc 1649.
U.S. Appl. No. 14/641,735 / Filing Receipt dated Jul. 22, 2015, 4 pages, Doc 1650.
U.S. Appl. No. 14/641,735 / Terminal Disclaimer filed Aug. 27, 25, 7 pages, Doc 1651.
U.S. Appl. No. 14/641,735 / Notice of Publication dated Oct. 29, 2015, 1 page, Doc 1652.
1/14/201614/614,735 / Preliminary Amendment filed Jan. 14, 2016, 11 pages, Doc 1653.
U.S. Appl. No. 14/641,735 / Non-Final Rejection dated Jul. 14, 2017, 103 pages, Doc 1654.
U.S. Appl. No. 14/641,735 / Letter Restarting Period for Response and Examiner's Search Strategy and Results dated Aug. 24, 2017, 34 pages, Doc 1655.
U.S. Appl. No. 14/641,735 / Amendment / Request for Reconsideration After Non-Final Rejection filed Nov. 24, 2017, 30 pages, Doc 1656.
U.S. Appl. No. 14/641,735 / Final Rejection dated Mar. 15, 2018, 30 pages, Doc 1657.
U.S. Appl. No. 14/641,735 / Response After Final Action filed May 15, 2018, 31 pages, Doc 1658.
U.S. Appl. No. 14/641,735 / Advisory Action dated Jun. 8, 2018, 5 pages, Doc 1659.
U.S. Appl. No. 14/641,735 / Applicant Initiated Review Summary dated Jul. 10, 2018, 5 pages, Doc 1661.
U.S. Appl. No. 14/641,735 / Request for Continued Examination filed Jul. 16, 2018, 39 pages, Doc 1662.
U.S. Appl. No. 14/641,735 / Preliminary Amendment filed Oct. 26, 2018, 13 pages, Doc 1663.
U.S. Appl. No. 14/641,735 / Non-Final Rejection dated Nov. 2, 2018, 46 pages, Doc 1664.
U.S. Appl. No. 14/641,735 / Amendment / Request for Reconsideration After Non-Final Rejection filed Feb. 4, 2019, 30 pages, Doc 1665.
U.S. Appl. No. 14/641,735 / Notice of Allowance and Fees Due dated Apr. 15, 2019, 37 pages, Doc 1666.
U.S. Appl. No. 14/641,735 / Issue Fee Payment and Response under 37 CFR § 1.312 dated Jul. 12, 2019, 8 pages, Doc 1032.
U.S. Appl. No. 14/641,735 / Notice of Allowance and Fees Due dated Jul. 26, 2019, 7 pages, Doc 1667.
U.S. Appl. No. 14/641,735 / Supplemental Notice of Allowability dated Jul. 26, 2019, 7 pages, Doc 1033.
U.S. Appl. No. 14/641,735 / Issue Notification dated Aug. 7, 2019, 1 page, Doc 1034.
U.S. Appl. No. 16/513,021 / U.S. Appl. No. 16/513,021, filed Jul. 16, 2019, 130 pages, Doc 1035.
U.S. Appl. No. 16/513,021 / Filing Receipt and Notice to File Missing Parts dated Jul. 30, 2019, 7 pages, Doc 1671.
U.S. Appl. No. 16/513,021 / Response to Notice to File Missing Parts and Preliminary Amendment dated Sep. 11, 2019, 45 pages, Doc 1038.
U.S. Appl. No. 16/513,021 / Updated Filing Receipt dated Sep. 12, 2019, 4 pages, Doc 1039.
U.S. Appl. No. 16/513,021 / Notice of Publication dated Dec. 19, 2019, 1 page, Doc 1040.
U.S. Appl. No. 16/513,021 / Non-final Office Action dated May 5, 2021, 36 pages, Doc 2290.
U.S. Appl. No. 11/319,758 / Transmittal of New Application filed Dec. 27, 2005, 79 pages, Doc 1675.
U.S. Appl. No. 11/319,758 / Pre-Exam Formalities Notice dated Feb. 1, 2006, 2 pages, Doc 1676.
U.S. Appl. No. 11/319,758 / Applicant Response to Pre-Exam Formalities Notice filed Jul. 3, 2006, 15 pages, Doc 1677.
U.S. Appl. No. 11/319,758 / Non-Final Rejection dated Nov. 12, 2008, 46 pages, Doc 1678.
U.S. Appl. No. 11/319,758 / Amendment / Request for Reconsideration After Non-Final Rejection dated May 12, 2009, 40 pages, Doc 1679.

(56) References Cited

OTHER PUBLICATIONS

U.S. Appl. No. 11/319,758 / Final Rejection dated Aug. 3, 2009, 39 pages, Doc 1680.
U.S. Appl. No. 11/319,758 / Non-Final Rejection dated Mar. 30, 2010, 58 pages, Doc 1681.
U.S. Appl. No. 11/319,758 / Final Rejection dated Oct. 28, 2010, 58 pages, Doc 1682.
U.S. Appl. No. 11/319,758 / Request for Continued Examination filed Mar. 28, 2011, 37 pages, Doc 1683.
U.S. Appl. No. 11/319,758 / Non-Final Rejection dated Jun. 3, 2011, 57 pages, Doc 1684.
U.S. Appl. No. 11/319,758 / Amendment / Request for Reconsideration After Non-Final Rejection filed Nov. 3, 2011, 35 pages, Doc 1685.
U.S. Appl. No. 11/319,758 / Final Rejection dated Jan. 17, 2012, 41 pages, Doc 1686.
U.S. Appl. No. 11/319,758 / Response After Final Action dated May 17, 2012, 35 pages, Doc 1687.
U.S. Appl. No. 11/319,758 / Advisory Action dated Jun. 20, 2012, 3 pages, Doc 1690.
U.S. Appl. No. 11/319,758 / Response After Final Action filed Jun. 28, 2012, 30 pages, Doc 1691.
U.S. Appl. No. 11/319,758 / Notice of Allowance and Fees Due dated Jul. 17, 2012, 48 pages, Doc 1692.
U.S. Appl. No. 11/319,758 / Amendment After Notice of Allowance and Issue Fee Payment filed Oct. 12, 2012, 12 pages, Doc 1693.
U.S. Appl. No. 11/319,758 / Issue Notification dated Oct. 31, 2012, 4 pages, Doc 1695.
U.S. Appl. No. 13/632,581 / Preliminary Amendment and Application filed Oct. 1, 2012, 90 pages, Doc 1697.
U.S. Appl. No. 13/632,581 / Notice to File Missing Parts and Filing Receipt dated Oct. 2, 2012, 6 pages, Doc 1698.
U.S. Appl. No. 13/632,581 / Applicant Response to Pre-Exam Formalities Notice filed Feb. 22, 2013, 26 pages, Doc 1699.
U.S. Appl. No. 13/632,581 / Filing Receipt dated Mar. 5, 2013, 4 pages, Doc 1700.
U.S. Appl. No. 13/632,581 / Notice of Publication dated Jun. 13, 2013, 1 page, Doc 1701.
U.S. Appl. No. 13/632,581 / Non-Final Rejection dated Jul. 3, 2013, 43 pages, Doc 1702.
U.S. Appl. No. 13/632,581 / Amendment / Request for Reconsideration After Non-Final Rejection filed Sep. 11, 2013, 48 pages, Doc 1703.
U.S. Appl. No. 13/632,581 / Final Rejection dated Dec. 18, 2013, 47 pages, Doc 1704.
U.S. Appl. No. 13/632,581 / Response After Final Action filed Mar. 18, 2014, 40 pages, Doc 1705.
U.S. Appl. No. 13/632,581 / Advisory Action dated Apr. 3, 2014, 15 pages, Doc 1706.
U.S. Appl. No. 13/632,581 / Notice of Appeal filed Apr. 17, 2014, 6 pages, Doc 1707.
U.S. Appl. No. 13/632,581 / Request for Continued Examination filed Jul. 16, 2014, 28 pages, Doc 1708.
U.S. Appl. No. 13/632,581 / Notice of Informal or Non-Responsive CPA Amendment dated Oct. 20, 2014, 5 pages, Doc 1709.
U.S. Appl. No. 13/632,581 / Amendment / Request for Reconsideration After Non-Final Rejection filed Nov. 4, 2014, 19 pages, Doc 1710.
U.S. Appl. No. 13/632,581 / Non-Final Rejection dated Jan. 27, 2015, 81 pages, Doc 1711.
U.S. Appl. No. 13/632,581 / Amendment / Request for Reconsideration After Non-Final Rejection filed Apr. 20, 2015, 27 pages, Doc 1712.
U.S. Appl. No. 13/632,581 / Final Rejection dated Jul. 20, 2015, 47 pages, Doc 1713.
U.S. Appl. No. 13/632,581 / After Final Consideration Program Request filed Sep. 21, 2015, 31 pages, Doc 1714.
U.S. Appl. No. 13/632,581 / Advisory Action and After Final Consideration Program Decision dated Oct. 2, 2015, 18 pages, Doc 1715.
U.S. Appl. No. 13/632,581 / Request for Continued Examination filed Nov. 30, 2015, 60 pages, Doc 1716.
U.S. Appl. No. 13/632,581 / Notice of Allowance and Fees Due dated Dec. 17, 2015, 89 pages, Doc 1717.
U.S. Appl. No. 13/632,581 / Filing Receipt dated Jan. 22, 2016, 4 pages, Doc 1719.
U.S. Appl. No. 13/632,581 / Terminal Disclaimer filed Mar. 7, 2016, 8 pages, Doc 1723.
U.S. Appl. No. 13/632,581 / Issue Fee Payment and Amendment After Notice of Allowance filed Mar. 6, 2016, 24 pages, Doc 1724.
U.S. Appl. No. 13/632,581 / Response to Amendment Under Rule 312 dated Mar. 22, 2016, 18 pages, Doc 1725.
U.S. Appl. No. 13/632,581 / Issue Notification dated Apr. 13, 2016, 1 page, Doc 1726.
U.S. Appl. No. 15/081,612 / Application, Declaration, and Power of Attorney filed Mar. 25, 2016, 91 pages, Doc 1727.
U.S. Appl. No. 15/081,612 / Notice to File Missing Parts dated Apr. 11, 2016, 8 pages, Doc 1728.
U.S. Appl. No. 15/081,612 / Preliminary Amendment filed Jun. 13, 2016, 38 pages, Doc 1729.
U.S. Appl. No. 15/081,612 / Preliminary Amendment filed Jun. 14, 2016, 6 pages, Doc 1730.
U.S. Appl. No. 15/081,612 / Filing Receipt dated Jun. 21, 2016, 4 pages, Doc 1731.
U.S. Appl. No. 15/081,612 / Non-Final Rejection dated Jul. 27, 2016, 91 pages, Doc 1732.
U.S. Appl. No. 15/081,612 / Terminal Disclaimer dated Sep. 23, 2016, 7 pages, Doc 1733.
U.S. Appl. No. 15/081,612 / Notice of Publication dated Sep. 29, 2016, 1 page, Doc 1734.
U.S. Appl. No. 15/081,612 / Notice of Allowance and Fees Due dated Oct. 17, 2016, 38 pages, Doc 1735.
U.S. Appl. No. 15/081,612 / Notice of Allowance and Fees Due dated Jan. 4, 2017, 4 pages, Doc 1736.
U.S. Appl. No. 15/081,612 / Request for Continued Examination, Amendment After Notice of Allowance and Issue Fee Payment filed Jan. 30, 2017, 11 pages, Doc 1737.
U.S. Appl. No. 15/081,612 / Notice of Allowance and Fees Due dated Jan. 30, 2017, 3 pages, Doc 1738.
U.S. Appl. No. 15/081,612 / Notice of Allowance and Fees Due dated Feb. 13, 2017, 51 pages, Doc 1739.
U.S. Appl. No. 15/081,612 / Amendment After Notice of Allowance and Issue Fee Payment Filed Mar. 20, 2017, 8 pages, Doc 1740.
U.S. Appl. No. 15/081,612 / Issue Notification dated Apr. 20, 2017, 1 page, Doc 1742.
U.S. Appl. No. 15/464,205 / Application, Power of Attorney and Declarations filed 3/202/017, 122 pages, Doc 1743.
U.S. Appl. No. 15/464,205 / Notice to File Missing Parts dated Mar. 28, 2017, 10 pages, Doc 1744.
U.S. Appl. No. 15/464,205 / Applicant Response to Pre-Exam Formalities Notice dated May 31, 2017, 99 pages, Doc 1745.
U.S. Appl. No. 15/464,205 / Filing Receipt dated Jun. 2, 2017, 5 pages, Doc 1746.
U.S. Appl. No. 15/464,205 / Notice of Publication dated Sep. 7, 2017, 1 page, Doc 1747.
U.S. Appl. No. 15/464,205 / Preliminary Amendment filed Feb. 22, 2019, 14 pages, Doc 1748.
U.S. Appl. No. 15/464,205 / Non-final Office Action dated Jul. 25, 2019, 64 pages, Doc 1041.
U.S. Appl. No. 15/464,205 / Response to Non-Final Rejection filed Oct. 22, 2019, 21 pages, Doc 1750.
U.S. Appl. No. 15/464,205 / Terminal Disclaimer filed Oct. 22, 2019, 5 pages, Doc 1043.
U.S. Appl. No. 15/464,205 / Final Office Action dated Nov. 14, 2019, 11 pages, Doc 1044.
U.S. Appl. No. 15/464,205 / Response to Final Office Action dated Feb. 12, 2020, 11 pages, Doc 1062.
U.S. Appl. No. 15/464,205 / Advisory Action dated Feb. 25, 2020, 5 pages, Doc 1063.
U.S. Appl. No. 15/464,205 / Request for Continued Examination and Amendment filed Mar. 5, 2020, 20 pages, Doc 1064.
U.S. Appl. No. 15/464,205 / Non-Final Rejection dated Mar. 27, 2020, 52 pages, Doc 1755.

(56) References Cited

OTHER PUBLICATIONS

U.S. Appl. No. 15/464,205 / Response to Non-Final Rejection, 19 pages, Doc 1756.
U.S. Appl. No. 15/464,205 / Final Rejection dated Sep. 3, 2020, 100 pages, Doc 1757.
U.S. Appl. No. 15/464,205 / Interview Summary dated Oct. 26, 2020, 8 pages, Doc 1758.
U.S. Appl. No. 15/464,205 / Response to Final Rejection filed Nov. 3, 2020, 21 pages, Doc 1759.
U.S. Appl. No. 15/464,205 / Advisory Action dated Nov. 16, 2020, 10 pages, Doc 1760.
U.S. Appl. No. 15/464,205 / Request for Continued Examination filed Nov. 20, 2020, 24 pages, Doc 1761.
U.S. Appl. No. 15/464,205 / Notice of Allowance/Allowability filed May 26, 2020, 20 pages, Doc 2291.
U.S. Appl. No. 11/006,842 / Transmittal of New Application filed Dec. 7, 2004, 86 pages, Doc 1762.
U.S. Appl. No. 11/006,842 / Pre-Exam Formalities Notice dated Jan. 10, 2005, 2 pages, Doc 1763.
U.S. Appl. No. 11/006,842 / Applicant Response to Pre-Exam Formalities Notice filed Apr. 1, 2005, 9 pages, Doc 1764.
U.S. Appl. No. 11/006,842 / Preliminary Amendment filed May 2, 2005, 94 pages, Doc 1765.
U.S. Appl. No. 11/006,842 / Requirement for Restriction / Election dated Jan. 23, 2008, 5 pages, Doc 1766.
U.S. Appl. No. 11/006,842 / Response to Election / Restriction filed Feb. 25, 2008, 28 pages, Doc 1767.
U.S. Appl. No. 11/006,842 / Requirement for Restriction / Election dated May 13, 2008, 5 pages, Doc 1768.
U.S. Appl. No. 11/006,842 / Miscellaneous Communication to Applicant dated May 15, 2008, 4 pages, Doc 1769.
U.S. Appl. No. 11/006,842 / Amendment / Request for Reconsideration After Non-Final Rejection filed Aug. 13, 2008, 29 pages, Doc 1770.
U.S. Appl. No. 11/006,842 / Non-Final Rejection dated Nov. 3, 2008, 28 pages, Doc 1771.
U.S. Appl. No. 11/006,842 / Amendment / Request for Reconsideration After Non-Final Rejection filed May 4, 2009, 40 pages, Doc 1772.
U.S. Appl. No. 11/006,842 / Supplemental Response or Supplemental Amendment filed Jul. 17, 2009, 25 pages, Doc 1773.
U.S. Appl. No. 11/006,842 / Notice of Allowance and Fees Due dated Jul. 27, 2009, 37 pages, Doc 1774.
U.S. Appl. No. 11/006,842 / Amendment After Notice of Allowance and Issue Fee Payment filed Oct. 27, 2009, 4 pages, Doc 1776.
U.S. Appl. No. 11/006,842 / Miscellaneous Communication to Applicant and Bibliographic Data Sheet dated Nov. 3, 2009, 2 pages, Doc 1777.
U.S. Appl. No. 11/006,842 / Issue Notification dated Nov. 18, 2009, 1 page, Doc 1778.
U.S. Appl. No. 11/006,842 / Request for Certificate of Correction filed Jun. 1, 2015, 5 pages, Doc 1779.
U.S. Appl. No. 11/006,842 / Certificate of Correction dated Sep. 15, 2015, 1 page, Doc 1780.
U.S. Appl. No. 12/613,450 / Application, Declaration and Power of Attorney filed Nov. 5, 2009, 63 pages, Doc 1781.
U.S. Appl. No. 12/613,450 / Notice to File Missing Parts dated Nov. 18, 2009, 6 pages, Doc 1782.
U.S. Appl. No. 12/613,450 / Applicant Response to Pre-Exam Formalities Notice and Preliminary Amendment filed Jan. 19, 2010, 19 pages, Doc 1783.
U.S. Appl. No. 12/613,450 / Filing Receipt dated Jan. 27, 2010, 3 pages, Doc 1784.
U.S. Appl. No. 12/613,450 / Notice of Publication dated May 6, 2010, 1 page, Doc 1785.
U.S. Appl. No. 12/613,450 / Requirement for Restriction / Election dated Jun. 10, 2011, 5 pages, Doc 1786.
U.S. Appl. No. 12/613,450 / Response to Election / Restriction filed Jul. 6, 2011, 20 pages, Doc 1787.
U.S. Appl. No. 12/613,450 / Non-Final Rejection dated Aug. 25, 2011, 20 pages, Doc 1788.
U.S. Appl. No. 12/613,450 / Amendment / Request for Reconsideration After Non-Final Rejection filed Dec. 27, 2011, 33 pages, Doc 1789.
U.S. Appl. No. 12/613,450 / Final Rejection dated Feb. 14, 2012, 18 pages, Doc 1790.
U.S. Appl. No. 12/613,450 / Response After Final Action filed Jun. 8, 2012, 24 pages, Doc 1791.
U.S. Appl. No. 12/613,450 / Advisory Action and Amendment After Final or Under 37CFR 1.312 dated Jun. 20, 2012, 4 pages, Doc 1792.
U.S. Appl. No. 12/613,450 / Request for Continued Examination filed Jul. 12, 2012, 26 pages, Doc 1793.
U.S. Appl. No. 12/613,450 / Notice of Allowance and Fees Due filed Oct. 7, 2013, 70 pages, Doc 1794.
U.S. Appl. No. 12/613,450 / Terminal Disclaimer filed Jan. 2, 2014, 7 pages, Doc 1798.
U.S. Appl. No. 12/613,450 / Miscellaneous Communication to Applicant dated Jan. 14, 2014, 6 pages, Doc 1799.
U.S. Appl. No. 12/613,450 / Issue Notification dated Jan. 22, 2014, 1 page, Doc 1800.
U.S. Appl. No. 14/149,749 / Application filed Jan. 7, 2014, 61 pages, Doc 1801.
U.S. Appl. No. 14/149,749 / Notice to File Missing Parts dated Jan. 23, 2014, 7 pages, Doc 1802.
U.S. Appl. No. 14/149,749 / Applicant Response to Pre-Exam Formalities Notice filed May 23, 2014, 18 pages, Doc 1803.
U.S. Appl. No. 14/149,749 / Notice of Incomplete Reply dated May 29, 2014, 3 pages, Doc 1804.
U.S. Appl. No. 14/149,749 / Applicant Response to Pre-Exam Formalities Notice filed Aug. 25, 2014, 108 pages, Doc 1805.
U.S. Appl. No. 14/149,749 / Filing Receipt dated Sep. 4, 2014, 4 pages, Doc 1806.
U.S. Appl. No. 14/149,749 / Notice of Publication dated Dec. 11, 2014, 1 page, Doc 1809.
U.S. Appl. No. 14/149,749 / Terminal Disclaimer filed Feb. 23, 2015, 5 pages, Doc 1810.
U.S. Appl. No. 14/149,749 / Terminal Disclaimer—Electronic-Approved dated Feb. 23, 2015, 1 page, Doc 1811.
U.S. Appl. No. 14/149,749 / Examiner Initiated Interview Summary dated Feb. 24, 2015, 2 pages, Doc 1812.
U.S. Appl. No. 14/149,749 / Notice of Allowance and Fees Due dated Apr. 17, 2015, 113 pages, Doc 1813.
U.S. Appl. No. 14/149,749 / e-Terminal Disclaimer filed and approved, and Issue Fee Payment filed May 27, 2015, 22 pages, Doc 1815.
U.S. Appl. No. 14/149,749 / Response to Amendment Under Rule 312 dated May 29, 2015, 1 page, Doc 1816.
U.S. Appl. No. 14/149,749 / Response to Amendment Under Rule 312 dated Jun. 1, 2015, 6 pages, Doc 1817.
U.S. Appl. No. 14/149,749 / Issue Notification dated Jun. 17, 2015, 1 page, Doc 1819.
U.S. Appl. No. 14/149,749 / Fee Worksheet dated Aug. 12, 2015, 1 page, Doc 1820.
U.S. Appl. No. 14/726,192 / Application, Declaration and Power of Attorney filed May 29, 2015, 65 pages, Doc 1821.
U.S. Appl. No. 14/726,192 / Notice to File Missing Parts dated Jun. 9, 2015, 6 pages, Doc 1822.
U.S. Appl. No. 14/726,192 / Preliminary Amendment filed Aug. 12, 2015, 119 pages, Doc 1823.
U.S. Appl. No. 14/726,192 / Filing Receipt dated Aug. 20, 2015, 4 pages, Doc 1824.
U.S. Appl. No. 14/726,192 / Terminal Disclaimer filed Nov. 20, 2015, 6 pages, Doc 1825.
U.S. Appl. No. 14/726,192 / Terminal Disclaimer—Electronic-Approved dated Nov. 20, 2015, 1 page, Doc 1826.
U.S. Appl. No. 14/726,192 / Notice of Publication dated Nov. 27, 2015, 1 page, Doc 1827.
U.S. Appl. No. 14/726,192 / Notice of Allowance and Fees Due dated May 2, 2016, 139 pages, Doc 1828.
U.S. Appl. No. 14/726,192 / Issue Fee Payment and Amendment After Notice of Allowance filed Jul. 18, 2016, 17 pages, Doc 1830.

(56) References Cited

OTHER PUBLICATIONS

U.S. Appl. No. 14/726,192 / Response to Amendment Under Rule 312 dated Jul. 21, 2016, 1 page, Doc 1831.
U.S. Appl. No. 14/726,192 / Response to Amendment Under Rule 312 and Amendment After Final filed Jul. 22, 2016, 3 pages, Doc 1832.
U.S. Appl. No. 14/726,192 / Issue Notification dated Aug. 3, 2016, 1 page, Doc 1834.
U.S. Appl. No. 15/240,964 / Preliminary Amendment, Declaration and Power of Attorney filed Aug. 31, 2016, 80 pages, Doc 1835.
U.S. Appl. No. 15/240,964 / Filing Receipt and Response Re: Informal Power of Attorney dated Aug. 31, 2016, 5 pages, Doc 1836.
U.S. Appl. No. 15/240,964 / Notice of Publication dated Dec. 8, 2016, 1 page, Doc 1839.
U.S. Appl. No. 15/240,964 / Non-Final Rejection dated Mar. 14, 2017, 58 pages, Doc 1840.
U.S. Appl. No. 15/240,964 / Amendment / Request for Reconsideration After Non-Final Rejection filed Jun. 14, 2017, 30 pages, Doc 1841.
U.S. Appl. No. 15/240,964 / Final Rejection dated Aug. 9, 2017, 185 pages, Doc 1842.
U.S. Appl. No. 15/240,964 / Response After Final Action filed Oct. 10, 2017, 33 pages, Doc 1843.
U.S. Appl. No. 15/240,964 / Advisory Action dated Oct. 30, 2017, 3 pages, Doc 1844.
U.S. Appl. No. 15/240,964 / Request for Continued Examination filed Nov. 9, 2017, 36 pages, Doc 1845.
U.S. Appl. No. 15/240,964 / Non-Final Rejection dated Jul. 30, 2018, 267 pages, Doc 1846.
U.S. Appl. No. 15/240,964 / Response to Non-Final Rejection filed Oct. 30, 2018, 45 pages, Doc 1847.
U.S. Appl. No. 15/240,964 / e-Terminal Disclaimer Filed and Approved dated Feb. 8, 2019, 8 pages, Doc 1848.
U.S. Appl. No. 15/240,964 / Notice of Allowance dated Feb. 21, 2019, 276 pages, Doc 1849.
U.S. Appl. No. 15/240,964 / Issue Fee Payment and Response Under 37 CFR § 1.312 filed May 16, 2019, 16 pages, Doc 1045.
U.S. Appl. No. 15/240,964 / Notice to File Corrected Application Papers dated May 16, 2019, 3 pages, Doc 1046.
U.S. Appl. No. 15/240,964 / Response to Notice to File Corrected Application Papers filed Jul. 22, 2019, 11 pages, Doc 1853.
U.S. Appl. No. 15/240,964 / Issue Notification dated Aug. 21, 2019, 1 page, Doc 1048.
U.S. Appl. No. 16/427,054 U.S. Appl. No. 16/427,054, filed May 30, 2019, 68 pages, Doc 1049.
U.S. Appl. No. 16/427,054 / Filing Receipt and Notice to File Missing Parts dated Jun. 6, 2019, 7 pages, Doc 1857.
U.S. Appl. No. 16/427,054 / Response to Notice to File Missing Parts and Preliminary Amendment filed Aug. 8, 2019, 19 pages, Doc 1052.
U.S. Appl. No. 16/427,054 / Updated Filing Receipt dated Aug. 12, 2019, 4 pages, Doc 1053.
U.S. Appl. No. 16/427,054 / Notice of Publication dated Nov. 21, 2019, 1 page, Doc 1054.
U.S. Appl. No. 16/427,054 / Non-Final Rejection dated Nov. 9, 2020, 367 pages, Doc 1861.
U.S. Appl. No. 16/427,054 / Response to Non-Final Rejection dated Feb. 8, 2021, 22 pages, Doc 2163.
U.S. Appl. No. 16/427,054 / Terminal Disclaimer dated Feb. 8, 2021, 5 pages, Doc 2164.
U.S. Appl. No. 16/427,054 / Final Office Action dated Mar. 25, 2021, 22 pages, Doc 2176.
U.S. Appl. No. 11/320,538 / Transmittal of New Application filed Dec. 27, 2005, 76 pages, Doc 1862.
U.S. Appl. No. 11/320,538 / Pre-Exam Formalities Notice dated Feb. 2, 2006, 2 pages, Doc 1863.
U.S. Appl. No. 11/320,538 / Applicant Response to Pre-Exam Formalities Notice filed Aug. 4, 2006, 36 pages, Doc 1864.

U.S. Appl. No. 11/320,538 / Non-Final Rejection dated Apr. 1, 2009, 27 pages, Doc 1865.
U.S. Appl. No. 11/320,538 / Amendment / Request for Reconsideration After Non-Final Rejection dated Jul. 1, 2009, 26 pages, Doc 1866.
U.S. Appl. No. 11/320,538 / Final Rejection dated Nov. 2, 2009, 29 pages, Doc 1867.
U.S. Appl. No. 11/320,538 / Amendment Submitted / Entered with Filing of CPA / RCE filed Jan. 4, 2010, 24 pages, Doc 1868.
U.S. Appl. No. 11/320,538 / Advisory Action dated Jan. 19, 2010, 4 pages, Doc 1869.
U.S. Appl. No. 11/320,538 / Request for Continued Examination filed Apr. 2, 2010, 29 pages, Doc 1870.
U.S. Appl. No. 11/320,538 / Non-Final Rejection dated Jun. 9, 2010, 24 pages, Doc 1871.
U.S. Appl. No. 11/320,538 / Final Rejection dated Dec. 22, 2010, 28 pages, Doc 1872.
U.S. Appl. No. 11/320,538 / Notice of Appeal Filed and Pre-Brief Conference Request filed May 23, 2011, 10 pages, Doc 1873.
U.S. Appl. No. 11/320,538 / Pre-Brief Appeal Conference Decision dated Jun. 30, 2011, 2 pages, Doc 1874.
U.S. Appl. No. 11/320,538 / Request for Continued Examination filed Dec. 23, 2011, 26 pages, Doc 1875.
U.S. Appl. No. 11/320,538 / Non-Final Rejection dated Dec. 19, 2012, 50 pages, Doc 1876.
U.S. Appl. No. 11/320,538 / Amendment / Request for Reconsideration After Non-Final Rejection filed Apr. 17, 2013, 25 pages, Doc 1877.
U.S. Appl. No. 11/320,538 / Notice of Allowance and Fees Due dated Aug. 1, 2013, 49 pages, Doc 1878.
U.S. Appl. No. 11/320,538 / Issue Fee Payment filed Nov. 1, 2013, 9 pages, Doc 1879.
U.S. Appl. No. 11/320,538 / Notice of Allowance and Fees Due dated Nov. 19, 2013, 46 pages, Doc 1880.
U.S. Appl. No. 11/320,538 / Issue Notification dated Dec. 4, 2013, 1 page, Doc 1882.
U.S. Appl. No. 14/086,741 / Application filed Nov. 21, 2013, 79 pages, Doc 1883.
U.S. Appl. No. 14/086,741 / Notice to File Missing Parts and Filing Receipt dated Dec. 12, 2013, 7 pages, Doc 1884.
U.S. Appl. No. 14/086,741 / Preliminary Amendment and Applicant Response to Pre-Exam Formalities Notice filed Jun. 12, 2014, 89 pages, Doc 1885.
U.S. Appl. No. 14/086,741 / Filing Receipt dated Jun. 17, 2014, 4 pages, Doc 1886.
U.S. Appl. No. 14/086,741 / Notice of Publication dated Sep. 25, 2014, 1 page, Doc 1887.
U.S. Appl. No. 14/086,741 / Terminal Disclaimer and Power of Attorney filed Sep. 29, 2014, 7 pages, Doc 1888.
U.S. Appl. No. 14/086,741 / Terminal Disclaimer Review Decision dated Sep. 30, 2014, 1 page, Doc 1889.
U.S. Appl. No. 14/086,741 / Notice of Allowance and Fees Due and Communication Re: Power of Attorney dated Oct. 3, 2014, 46 pages, Doc 1890.
U.S. Appl. No. 14/086,741 / Miscellaneous Communication to Applicant and List of References dated Nov. 26, 2014, 3 pages, Doc 1891.
U.S. Appl. No. 14/086,741 / Amendment after Notice of Allowance and Issue Fee Payment filed Jan. 5, 2015, 19 pages, Doc 1892.
U.S. Appl. No. 14/086,741 / Petition Auto-Grant Letter from EFS dated Jan. 7, 2015, 2 pages, Doc 1894.
U.S. Appl. No. 14/086,741 / Response to Amendment under Rule 312 filed Jan. 22, 2015, 2 pages, Doc 1895.
U.S. Appl. No. 14/086,741 / Notice of Allowance and Fees Due dated Mar. 16, 2015, 48 pages, Doc 1896.
U.S. Appl. No. 14/086,741 / Issue Notification dated Apr. 1, 2015, 1 page, Doc 1898.
U.S. Appl. No. 14/596,154 / Application and Declaration filed Jan. 13, 2015, 82 pages, Doc 1899.
U.S. Appl. No. 14/596,154 / Notice to File Missing Parts and Filing Receipt dated Jan. 27, 2015, 7 pages, Doc 1901.

(56) References Cited

OTHER PUBLICATIONS

U.S. Appl. No. 14/596,154 / Preliminary Amendment and Applicant Response to Pre-Exam Formalities Notice filed Mar. 27, 2015, 88 pages, Doc 1902.
U.S. Appl. No. 14/596,154 / Filing Receipt dated Apr. 2, 2015, 3 pages, Doc 1903.
U.S. Appl. No. 14/596,154 / e-Terminal Disclaimer filed and Approved dated Nov. 20, 2015, 7 pages, Doc 1905.
U.S. Appl. No. 14/596,154 / Non-Final Rejection dated Sep. 21, 2017, 121 pages, Doc 1906.
U.S. Appl. No. 14/596,154 / Amendment / Request for Reconsideration After Non-Final Rejection filed Dec. 21, 2017, 48 pages, Doc 1907.
U.S. Appl. No. 14/596,154 / Notice of Allowance and Fees Due dated May 2, 2018, 56 pages, Doc 1908.
U.S. Appl. No. 14/596,154 / Notice of Allowance and Fees Due dated May 21, 2018, 11 pages, Doc 1909.
U.S. Appl. No. 14/596,154 / Issue Fee Payment filed Jul. 27, 2018, 8 pages, Doc 1910.
U.S. Appl. No. 14/596,154 / List of References dated Aug. 8, 2018, 2 pages, Doc 1912.
U.S. Appl. No. 14/596,154 / Issue Notification dated Aug. 21, 2018, 1 page, Doc 1913.
U.S. Appl. No. 16/710,731 / Reissue Application filed Dec. 11, 2019, 91 pages, Doc 1914.
U.S. Appl. No. 16/710,731 / Filing Receipt dated Dec. 12, 2019, 5 pages, Doc 1915.
U.S. Appl. No. 16/710,731 / Request for Corrected Filing Receipt filed Feb. 19, 2020, 16 pages, Doc 1916.
U.S. Appl. No. 16/710,731 / Corrected Filing Receipt dated Feb. 24, 2020, 4 pages, Doc 1066.
U.S. Appl. No. 16/710,731 / Non-Final Rejection dated Nov. 24, 2020, 15 pages, Doc 1918.
U.S. Appl. No. 16/710,731 / Response to Non-Final Rejection dated Nov. 24, 2020, 21 pages, Doc 2177.
U.S. Appl. No. 16/710,731 / Response to Non-Final Rejection filed Mar. 23, 2021, 21 pages, Doc 2307.
U.S. Appl. No. 16/710,731 / Non-Final Rejection dated Apr. 21, 2021, 11 pages, Doc 2292.
U.S. Appl. No. 16/048,113 / Application filed Jul. 27, 2018, 86 pages, Doc 1919.
U.S. Appl. No. 16/048,113 / Filing Receipt and Notice to File Missing Parts dated Aug. 24, 2018, 6 pages, Doc 1920.
U.S. Appl. No. 16/048,113 / Notice of Publication dated Jan. 31, 2019, 1 page, Doc 1923.
U.S. Appl. No. 16/048,113 / Non-Final Rejection dated Oct. 2, 2020, 130 pages, Doc 1924.
U.S. Appl. No. 16/048,113 / Response to Non-Final Rejection dated Feb. 2, 2021, 22 pages, Doc 2165.
U.S. Appl. No. 16/048,113 / Terminal Disclaimer dated Oct. 2, 2020, 5 pages, Doc 2166.
U.S. Appl. No. 16/048,113 / Notice of Allowance/Allowability dated Apr. 6, 2021, 75 pages, Doc 2293.
U.S. Appl. No. 16/048,113 / Issue Fee Payment and 312 Response filed Jul. 6, 2021, 12 pages, Doc 2307.
U.S. Appl. No. 11/361,500 / Transmittal of New Application dated Feb. 23, 2006, 77 pages, Doc 1925.
U.S. Appl. No. 11/361,500 / Pre-Exam Formalities Notice dated Mar. 23, 2006, 2 pages, Doc 1926.
U.S. Appl. No. 11/361,500 / Applicant Response to Pre-Exam Formalities Notice filed Jul. 19, 2006, 27 pages, Doc 1927.
U.S. Appl. No. 11/361,500 / Notice of Publication dated Nov. 16, 2006, 1 page, Doc 1928.
U.S. Appl. No. 11/361,500 / Non-Final Rejection dated May 27, 2009, 27 pages, Doc 1929.
U.S. Appl. No. 11/361,500 / Amendment / Request for Reconsideration After Non-Final Rejection filed Aug. 27, 2009, 37 pages, Doc 1930.
U.S. Appl. No. 11/361,500 / Notice of Allowance and Fees Due dated Dec. 11, 2009, 134 pages, Doc 1931.
U.S. Appl. No. 11/361,500 / Issue Fee Payment and Amendment After Notice of Allowance filed Jan. 6, 2010, 26 pages, Doc 1932.
U.S. Appl. No. 11/361,500 / Response to Amendment Under Rule 312 dated Jan. 25, 2010, 7 pages, Doc 1933.
U.S. Appl. No. 11/361,500 / Issue Notification dated Feb. 24, 2010, 1 page, Doc 1934.
U.S. Appl. No. 11/361,500 / Filing Receipt and Notice to File Missing Parts dated Feb. 25, 2010, 5 pages, Doc 1936.
U.S. Appl. No. 11/361,500 / Applicant Response to Pre-Exam Formalities Notice filed Apr. 26, 2010, 13 pages, Doc 1937.
U.S. Appl. No. 11/361,500 / Filing Receipt dated May 4, 2010, 3 pages, Doc 1938.
U.S. Appl. No. 11/361,500 / Notice of Publication dated Aug. 12, 2010, 1 page, Doc 1939.
U.S. Appl. No. 11/361,500 / Non-Final Rejection dated Aug. 30, 2012, 31 pages, Doc 1940.
U.S. Appl. No. 11/361,500 / Amendment / Request for Reconsideration After Non-Final Rejection filed Nov. 20, 2012, 15 pages, Doc 1941.
U.S. Appl. No. 11/361,500 / Terminal Disclaimer filed Jan. 2, 2013, 5 pages, Doc 1942.
U.S. Appl. No. 11/361,500 / Terminal Disclaimer Review Decision dated Jan. 4, 2013, 1 page, Doc 1943.
U.S. Appl. No. 11/361,500 / Notice of Allowance and Fees Due dated Jan. 10, 2013, 144 pages, Doc 1944.
U.S. Appl. No. 11/361,500 / Issue Fee Payment dated Apr. 10, 2013, 8 pages, Doc 1945.
U.S. Appl. No. 11/361,500 / Issue Notification dated Apr. 24, 2013, 1 page, Doc 1948.
U.S. Appl. No. 12/702,243 / Application and Preliminary Amendment filed Feb. 8, 2010, 84 pages, Doc 1952.
U.S. Appl. No. 12/702,243 / Notice to File Missing Parts and Filing Receipt dated Feb. 25, 2010, 5 pages, Doc 1953.
U.S. Appl. No. 12/702,243 / Applicant Response to Pre-Exam Formalities Notice dated Apr. 26, 2010, 13 pages, Doc 1954.
U.S. Appl. No. 12/702,243 / Filing Receipt dated May 4, 2010, 3 pages, Doc 1955.
U.S. Appl. No. 12/702,243 / Notice of Publication dated Aug. 12, 2010, 1 page, Doc 1956.
U.S. Appl. No. 12/702,243 / Non-Final Rejection dated Aug. 30, 2012, 31 pages, Doc 1957.
U.S. Appl. No. 12/702,243 / Amendment / Request for Reconsideration After Non-Final Rejection filed Nov. 20, 2012, 15 pages, Doc 1958.
U.S. Appl. No. 12/702,243 / Terminal Disclaimer filed Jan. 2, 2013, 5 pages, Doc 1959.
U.S. Appl. No. 12/702,243 / Terminal Disclaimer Review Decision dated Jan. 4, 2013, 1 page, Doc 1960.
U.S. Appl. No. 12/702,243 / Notice of Allowance and Fees Due dated Jan. 10, 2013, 120 pages, Doc 1961.
U.S. Appl. No. 12/702,243 / Issue Fee Payment and Post-Allowance Communication filed Apr. 10, 2013, 8 pages, Doc 1962.
U.S. Appl. No. 12/702,243 / List of References dated Apr. 13, 2013, 4 pages, Doc 1964.
U.S. Appl. No. 12/702,243 / Issue Notification dated Apr. 24, 2013, 1 page, Doc 1965.
U.S. Appl. No. 13/860,482 / Application and Preliminary Amendment filed Apr. 10, 2013, 99 pages, Doc 1969.
U.S. Appl. No. 13/860,482 / Notice to File Missing Parts and Filing Receipt dated May 21, 2013, 6 pages, Doc 1970.
U.S. Appl. No. 13/860,482 / Applicant Response to Pre-Exam Formalities Notice filed Oct. 22, 2013, 7 pages, Doc 1971.
U.S. Appl. No. 13/860,482 / Filing Receipt and Fee Worksheet dated Oct. 28, 2013, 4 pages, Doc 1972.
U.S. Appl. No. 13/860,482 / Notice of Publication dated Feb. 6, 2014, 1 page, Doc 1973.
U.S. Appl. No. 13/860,482 / Non-Final Rejection dated Jun. 9, 2014, 14 pages, Doc 1974.
U.S. Appl. No. 13/860,482 / Amendment / Request for Reconsideration After Non-Final Rejection and Terminal Disclaimer filed Sep. 8, 2014, 24 pages, Doc 1975.
U.S. Appl. No. 13/860,482 / Terminal Disclaimer Review Decision dated Sep. 9, 2014, 1 page, Doc 1976.

(56) References Cited

OTHER PUBLICATIONS

U.S. Appl. No. 13/860,482 / Terminal Disclaimer Filed Oct. 8, 2014, 4 pages, Doc 1978.
U.S. Appl. No. 13/860,482 / Terminal Disclaimer Review Decision dated Oct. 9, 2014, 1 page, Doc 1979.
U.S. Appl. No. 13/860,482 / Notice of Allowance and Fees Due dated Nov. 5, 2014, 95 pages, Doc 1981.
U.S. Appl. No. 13/860,482 / Issue Fee Payment and Amendment Made After Notice of Allowance filed Feb. 4, 2015, 8 pages, Doc 1982.
U.S. Appl. No. 13/860,482 / Issue Information Including Classification, Examiner, Name, Claim, Renumbering, etc. dated Feb. 6, 2015, 1 page, Doc 1983.
U.S. Appl. No. 13/860,482 / Issue Notification dated Mar. 4, 2015, 1 page, Doc 1985.
U.S. Appl. No. 14/614,292 / Application and Declaration filed Feb. 4, 2015, 82 pages, Doc 1986.
U.S. Appl. No. 14/614,292 / Notice to File Missing Parts and Filing Receipt dated Feb. 20, 2015, 6 pages, Doc 1987.
U.S. Appl. No. 14/614,292 / Applicant Response to Pre-Exam Formalities Notice dated Apr. 17, 2015, 34 pages, Doc 1988.
U.S. Appl. No. 14/614,292 / Filing Receipt and Fee Worksheet dated Apr. 24, 2015, 4 pages, Doc 1989.
U.S. Appl. No. 14/614,292 / Notice of Publication dated Aug. 6, 2015, 1 page, Doc 1990.
U.S. Appl. No. 14/614,292 / e-Terminal Disclaimer Filed and Approved dated Nov. 20, 2015, 7 pages, Doc 1991.
U.S. Appl. No. 14/614,292 / Non-Final Rejection dated May 19, 2016, 84 pages, Doc 1992.
U.S. Appl. No. 14/614,292 / Amendment / Request for Reconsideration After Non-Final Rejection filed Aug. 18, 2016, 23 pages, Doc 1993.
U.S. Appl. No. 14/614,292 / Notice of Allowance and Fees Due dated Sep. 21, 2016, 153 pages, Doc 1994.
U.S. Appl. No. 14/614,292 / Issue Fee Payment and Amendment After Notice of Allowance filed Dec. 21, 2016, 8 pages, Doc 1995.
U.S. Appl. No. 14/614,292 / Issue Notification dated Jan. 18, 2017, 1 page, Doc 1997.
U.S. Appl. No. 15/411,823 / Application, Power of Attorney, Declaration and Preliminary Amendment filed Jan. 20, 2017, 116 pages, Doc 1998.
U.S. Appl. No. 15/411,823 / Filing Receipt and Fee Worksheet dated Jan. 31, 2017, 4 pages, Doc 1999.
U.S. Appl. No. 15/411,823 / Notice of Publication dated May 11, 2017, 1 page, Doc 2000.
U.S. Appl. No. 15/411,823 / Non-Final Rejection dated Jan. 25, 2018, 85 pages, Doc 2001.
U.S. Appl. No. 15/411,823 / e-Terminal Disclaimer Filed and Approved dated Apr. 24, 2018, 28 pages, Doc 2002.
U.S. Appl. No. 15/411,823 / Notice of Allowance and Fees Due filed Jul. 13, 2018, 101 pages, Doc 2003.
U.S. Appl. No. 15/411,823 / Issue Fee Payment filed and Miscellaneous Incoming Letter dated Oct. 15, 2018, 8 pages, Doc 2004.
U.S. Appl. No. 15/411,823 / Issue Notification dated Nov. 7, 2018, 1 page, Doc 2008.
U.S. Appl. No. 16/164,430 / Application filed Oct. 18, 2018, 84 pages, Doc 2009.
U.S. Appl. No. 16/164,430 / Notice to File Missing Parts and Filing Receipt dated Nov. 6, 2018, 7 pages, Doc 2010.
U.S. Appl. No. 16/164,430 / Response to Notice of Missing Parts filed Jan. 18, 2019, 37 pages, Doc 2011.
U.S. Appl. No. 16/164,430 / Updatd Filing Receipt dated Jan. 23, 2019, 5 pages, Doc 2012.
U.S. Appl. No. 16/164,430 / Notice of Publication dated May 2, 2019, 1 page, Doc 2013.
U.S. Appl. No. 16/164,430 / Non-Final Rejection dated Oct. 18, 2019, 122 pages, Doc 2014.
U.S. Appl. No. 16/164,430 / Non-final Office Action dated Oct. 18, 2019, 107 pages, Doc 1058.
U.S. Appl. No. 16/164,430 / Response to Non-Final Rejection filed Jan. 21, 2020, 15 pages, Doc 2015.
U.S. Appl. No. 16/164,430 / Notice of Allowance dated Mar. 6, 2020, 86 pages, Doc 2016.
U.S. Appl. No. 16/164,430 / Issue Fee Payment filed Jun. 8, 2020, 4 pages, Doc 2017.
U.S. Appl. No. 16/164,430 / Supplemental Notice of Allowability dated Jun. 16, 2020, 12 pages, Doc 2018.
U.S. Appl. No. 16/164,430 / Issue Notification dated Jun. 17, 2020, 1 page, Doc 2154.
U.S. Appl. No. 16/164,430 / Request for Certificate of Correction filed Sep. 3, 2020, 6 pages, Doc 2021.
U.S. Appl. No. 16/164,430 / Certificate of Correction dated Oct. 6, 2020, 1 page, Doc 2023.
U.S. Appl. No. 16/898,134 / Application filed Jun. 10, 2020, 84 pages, Doc 2024.
U.S. Appl. No. 16/898,134 / Filing Receipt and Notice to File Missing Parts dated Jun. 19, 2020, 8 pages, Doc 2025.
U.S. Appl. No. 16/898,134 / Preliminary Amendment and Response to Mising Parts filed Aug. 18, 2020, 39 pages, Doc 2026.
U.S. Appl. No. 16/898,134 / Updated Filing Receipt dated Aug. 21, 2020, 6 pages, Doc 2027.
U.S. Appl. No. 16/898,134 / Notice of Publication dated Nov. 27, 2020, 2 pages, Doc 2028.
U.S. Appl. No. 16/898,134 / Non-final Office Action dated Jun. 30, 2021, 57 pages, Doc 2308.
U.S. Appl. No. 11/412,417 / New Application filed Apr. 26, 2006, 96 pages, Doc 2029.
U.S. Appl. No. 11/412,417 / Pre-Exam Formalities Notice dated May 19, 2006, 2 pages, Doc 2030.
U.S. Appl. No. 11/412,417 / Applicant Response to Pre-Exam Formalities Notice filed Jul. 19, 2006, 14 pages, Doc 2031.
U.S. Appl. No. 11/412,417 / Non-Final Rejection dated Apr. 1, 2008, 53 pages, Doc 2032.
U.S. Appl. No. 11/412,417 / Amendment / Request for Reconsideration After Non-Final Rejection filed Aug. 1, 2008, 34 pages, Doc 2033.
U.S. Appl. No. 11/412,417 / Final Rejection dated Nov. 13, 2008, 40 pages, Doc 2034.
U.S. Appl. No. 11/412,417 / Request for Continued Examination and Amendment Submitted with Filing of Request for Continued Examination filed May 12, 2009, 36 pages, Doc 2035.
U.S. Appl. No. 11/412,417 / Non-Final Rejection dated Jun. 30, 2009, 141 pages, Doc 2036.
U.S. Appl. No. 11/412,417 / Amendment / Request for Reconsideration After Non-Final Rejection filed Oct. 30, 2009, 36 pages, Doc 2037.
U.S. Appl. No. 11/412,417 / Final Rejection dated Jan. 4, 2010, 43 pages, Doc 2038.
U.S. Appl. No. 11/412,417 / Request for Continued Examination filed May 4, 2010, 32 pages, Doc 2039.
U.S. Appl. No. 11/412,417 / Supplemental Remarks or Supplemental Amendment filed Jun. 22, 2010, 25 pages, Doc 2040.
U.S. Appl. No. 11/412,417 / Notice of Allowance and Fees Due dated Jul. 6, 2010, 23 pages, Doc 2041.
U.S. Appl. No. 11/412,417 / Request for Continued Examination filed Oct. 5, 2010, 4 pages, Doc 2043.
U.S. Appl. No. 11/412,417 / Notice of Allowance and Fees Due dated Oct. 26, 2010, 17 pages, Doc 2044.
U.S. Appl. No. 11/412,417 / Issue Fee Payment and Miscellaneous Incoming Letter filed Jan. 26, 2011, 3 pages, Doc 2045.
U.S. Appl. No. 11/412,417 / Issue Notification dated Feb. 9, 2011, 1 page, Doc 2047.
U.S. Appl. No. 13/030,084 / Application and Declaration filed Feb. 17, 2011, 105 pages, Doc 2048.
U.S. Appl. No. 13/030,084 / Notice to File Missing Parts dated Mar. 3, 2011, 6 pages, Doc 2049.
U.S. Appl. No. 13/030,084 / Applicant Response to Pre-Exam Formalities Notice filed Aug. 3, 2011, 29 pages, Doc 2050.
U.S. Appl. No. 13/030,084 / Filing Receipt dated Aug. 11, 2011, 4 pages, Doc 2051.
U.S. Appl. No. 13/030,084 / Non-Final Rejection dated Oct. 26, 2011, 39 pages, Doc 2052.

(56) References Cited

OTHER PUBLICATIONS

U.S. Appl. No. 13/030,084 / Notice of Publication dated Nov. 17, 2011, 1 page, Doc 2053.
U.S. Appl. No. 13/030,084 / Informal or Non-Responsive Amendment filed Jan. 26, 2012, 35 pages, Doc 2054.
U.S. Appl. No. 13/030,084 / Notice to Applicant Regarding a Non-Compliant or Non-Responsive Amendment Jan. 31, 2012, 4 pages, Doc 2055.
U.S. Appl. No. 13/030,084 / Amendment / Request for Reconsideration After Non-Final Rejection filed Feb. 9, 2012, 36 pages, Doc 2056.
U.S. Appl. No. 13/030,084 / Final Rejection dated Mar. 28, 2012, 62 pages, Doc 2057.
U.S. Appl. No. 13/030,084 / Response After Final Action filed Jun. 14, 2012, 90 pages, Doc 2058.
U.S. Appl. No. 13/030,084 / Advisory Action dated Jun. 26, 2012, 4 pages, Doc 2059.
U.S. Appl. No. 13/030,084 / Request for Continued Examination filed Jul. 23, 2012, 91 pages, Doc 2060.
U.S. Appl. No. 13/030,084 / Notice to Applicant Regarding a Non-Compliant or Non-Responsive Amendment dated Jul. 25, 2012, 2 pages, Doc 2061.
U.S. Appl. No. 13/030,084 / Amendment / Request for Reconsideration After Non-Final Rejection filed Jan. 2, 2013, 40 pages, Doc 2062.
U.S. Appl. No. 13/030,084 / Non-Final Rejection dated Apr. 30, 2013, 45 pages, Doc 2064.
U.S. Appl. No. 13/030,084 / Amendment / Request for Reconsideration After Non-Final Rejection dated Jul. 30, 2013, 30 pages, Doc 2065.
U.S. Appl. No. 13/030,084 / Non-Final Rejection dated Oct. 10, 2013, 50 pages, Doc 2066.
U.S. Appl. No. 13/030,084 / Amendment / Request for Reconsideration After Non-Final Rejection filed Jan. 2, 2014, 27 pages, Doc 2067.
U.S. Appl. No. 13/030,084 / Final Rejection dated Mar. 19, 2014, 48 pages, Doc 2068.
U.S. Appl. No. 13/030,084 / Amendment Submitted / Entered with Filing of CPA / Request for Continued Examination filed May 19, 2014, 41 pages, Doc 2069.
U.S. Appl. No. 13/030,084 / Advisory Action dated Jun. 6, 2014, 6 pages, Doc 2070.
U.S. Appl. No. 13/030,084 / Applicant Initiated Interview Summary dated Jul. 1, 2014, 3 pages, Doc 2071.
U.S. Appl. No. 13/030,084 / Request for Continued Examination filed Aug. 15, 2014, 31 pages, Doc 2072.
U.S. Appl. No. 13/030,084 / Non-Final Rejection dated Mar. 24, 2015, 45 pages, Doc 2073.
U.S. Appl. No. 13/030,084 / Amendment / Request for Reconsideration After Non-Final Rejection filed Jun. 24, 2015, 31 pages, Doc 2074.
U.S. Appl. No. 13/030,084 / e-Terminal Disclaimer filed and approved and Communication Re: Power of Attorney dated Sep. 10, 2015, 9 pages, Doc 2077.
U.S. Appl. No. 13/030,084 / Notice of Allowance and Fees Due dated Sep. 17, 2015, 46 pages, Doc 2078.
U.S. Appl. No. 13/030,084 / Post-Allowance Communication—Incoming dated Nov. 13, 2015, 4 pages, Doc 2082.
U.S. Appl. No. 13/030,084 / Miscellaneous Communication Applicant dated Nov. 30, 2015, 49 pages, Doc 2083.
U.S. Appl. No. 13/030,084 / Issue Fee Payment filed Dec. 10, 2015, 8 pages, Doc 2084.
U.S. Appl. No. 13/030,084 / Issue Notification dated Jan. 16, 2016, 1 page, Doc 2086.
U.S. Appl. No. 14/968,429 / Application filed Dec. 14, 2015, 119 pages, Doc 2087.
U.S. Appl. No. 14/968,429 / Filing Receipt and Notice to File Corrected Application Papers dated Jan. 4, 2016, 6 pages, Doc 2088.
U.S. Appl. No. 14/968,429 / Applicant Response to Pre-Exam Formalities Notice filed Jan. 14, 2016, 38 pages, Doc 2089.
U.S. Appl. No. 14/968,429 / Filing Receipt and Miscellaneous Communication to Applicant dated Jan. 21, 2016, 5 pages, Doc 2090.
U.S. Appl. No. 14/968,429 / Notice of Publication dated Apr. 28, 2016, 1 page, Doc 2093.
U.S. Appl. No. 14/968,429 / Non-Final Rejection dated May 15, 2017, 56 pages, Doc 2094.
U.S. Appl. No. 14/968,429 / Amendment / Request for Reconsideration After Non-Final Rejection, 22 pages, Doc 2095.
U.S. Appl. No. 14/968,429 / Final Rejection dated Oct. 24, 2017, 11 pages, Doc 2096.
U.S. Appl. No. 14/968,429 / Response After Final Action and After Final Consideration Program Request filed Dec. 26, 2017, 31 pages, Doc 2097.
U.S. Appl. No. 14/968,429 / Advisory Action and After Final Consideration Program Decision dated Jan. 11, 2018, 7 pages, Doc 2098.
U.S. Appl. No. 14/968,429 / e-Terminal Disclaimer filed and Approved and Response After Final Action filed Feb. 7, 2018, 25 pages, Doc 2099.
U.S. Appl. No. 14/968,429 / Amendment After Final filed Feb. 26, 2018, 16 pages, Doc 2100.
U.S. Appl. No. 14/968,429 / Notice of Allowance and Fees Due dated Mar. 19, 2018, 47 pages, Doc 2101.
U.S. Appl. No. 14/968,429 / Amendment After Notice of Allowance and Issue Fee Payment filed May 29, 2018, 17 pages, Doc 2102.
U.S. Appl. No. 14/968,429 / Amendment After Notice of Allowance filed May 31, 2018, 14 pages, Doc 2103.
U.S. Appl. No. 14/968,429 / Amendment After Notice of Allowance filed Jun. 13, 2018, 14 pages, Doc 2104.
U.S. Appl. No. 14/968,429 / Response to Amendment Under Rule 312 dated Jul. 10, 2018, 5 pages, Doc 2105.
U.S. Appl. No. 14/968,429 / Response to Amendment Under Rule 312 dated Jul. 23, 2018, 3 pages, Doc 2106.
U.S. Appl. No. 14/968,429 / Issue Notification dated Aug. 1, 2018, 1 page, Doc 2107.
U.S. Appl. No. 14/968,429 / Request for Certificate of Correction filed Oct. 12, 2018, 6 pages, Doc 2108.
U.S. Appl. No. 14/968,429 / Certificate of Correction dated Nov. 20, 2018, 1 page, Doc 2109.
U.S. Appl. No. 16/048,061 / Application filed Jul. 27, 2018, 109 pages, Doc 2110.
U.S. Appl. No. 16/048,061 / Notice to File Missing Parts and Filing Receipt dated Aug. 13, 2018, 7 pages, Doc 2111.
U.S. Appl. No. 16/048,061 / Applicant Response to Pre-Exam Formalities Notice filed Oct. 12, 2018, 45 pages, Doc 2112.
U.S. Appl. No. 16/048,061 / Filing Receipt Oct. 16, 2018, 5 pages, Doc 2113.
U.S. Appl. No. 16/048,061 / Request for Corrected Filing Receipt filed Oct. 31, 2018, 8 pages, Doc 2114.
U.S. Appl. No. 16/048,061 / Filing Receipt Nov. 5, 2018, 4 pages, Doc 2115.
U.S. Appl. No. 16/048,061 / Notice of Publication dated Jan. 24, 2019, 1 page, Doc 2116.
U.S. Appl. No. 16/048,061 / Non-Final Rejection dated Sep. 25, 2020, 68 pages, Doc 2117.
U.S. Appl. No. 16/048,061 / Response to Non-Final Rejection filed Jan. 25, 2021, 17 pages, Doc 2167.
U.S. Appl. No. 16/048,061 / Terminal Disclaimer filed Jan. 25, 2021, 6 pages, Doc 2168.
U.S. Appl. No. 16/048,061 / Notice of Allowance/Allowability dated Apr. 9, 2021, 33 pages, Doc 2294.
U.S. Appl. No. 16/048,061 / Issue Fee Payment and 312 Response filed Jul. 9, 2021, 19 pages, Doc 2312.
U.S. Appl. No. 16/048,061 / eTerminal Disclaimer filed Jul. 9, 2021, 3 pages, Doc 2313.
U.S. Appl. No. 16/164,535 / Application filed Oct. 18, 2018, 122 pages, Doc 2118.
U.S. Appl. No. 16/164,535 / Notice to File Corrected Application Papers and Filing Receipt Nov. 7, 2018, 7 pages, Doc 2119.
U.S. Appl. No. 16/164,535 / Applicant Response to Pre-Exam Formalities Notice filed Jan. 7, 2019, 27 pages, Doc 2120.

(56) References Cited

OTHER PUBLICATIONS

U.S. Appl. No. 16/164,535 / Updated Filing Receipt Jan. 11, 2019, 5 pages, Doc 2121.
U.S. Appl. No. 16/164,535 / Notice of Publication dated Apr. 25, 2019, 1 page, Doc 2122.
U.S. Appl. No. 16/164,535 / Non-Final Rejection dated Nov. 24, 2020, 76 pages, Doc 2123.
U.S. Appl. No. 16/164,535 / Response to Non-Final Rejection filed Feb. 19, 2021, 17 pages, Doc 2169.
U.S. Appl. No. 16/164,535 / Terminal Disclaimer filed Feb. 19, 2021, 6 pages, Doc 2170.
U.S. Appl. No. 16/164,535 / Notice of Allowance/Allowability dated Feb. 19, 2021, 6 pages, Doc 2295.
U.S. Appl. No. 16/164,535 / Request for Continued Examination and Amendment filed Jun. 17, 2021, 58 pages, Doc 2309.
U.S. Appl. No. 16/164,535 / Notice of Allowance / Allowability and Examiner-Initialed SB08 Listing dated Jul. 8, 2021, 20 pages, Doc 2311.
U.S. Appl. No. 11/480,094 / Application filed Jun. 29, 2006, 125 pages, Doc 2124.
U.S. Appl. No. 11/480,094 / Pre-Exam Formalities Notice dated Aug. 2, 2006, 2 pages, Doc 2125.
U.S. Appl. No. 11/480,094 / Applicant Response to Pre-Exam Formalities Notice filed Nov. 2, 2006, 32 pages, Doc 2126.
U.S. Appl. No. 11/480,094 / Filing Receipt Dec. 7, 2006, 3 pages, Doc 2127.
U.S. Appl. No. 11/480,094 / Non-Final Rejection dated Nov. 7, 2008, 28 pages, Doc 2128.
U.S. Appl. No. 11/480,094 / Amendment / Request for Reconsideration After Non-Final Rejection filed May 7, 2009, 37 pages, Doc 2129.
U.S. Appl. No. 11/480,094 / Final Rejection dated Jul. 28, 2009, 16 pages, Doc 2130.
U.S. Appl. No. 11/480,094 / Request for Continued Examination filed Dec. 28, 2009, 39 pages, Doc 2131.
U.S. Appl. No. 11/480,094 / Non-Final Rejection dated Dec. 15, 2010, 33 pages, Doc 2132.
U.S. Appl. No. 11/480,094 / Amendment / Request for Reconsideration After Non-Final Rejection filed May 16, 2011, 34 pages, Doc 2133.
U.S. Appl. No. 11/480,094 / Final Rejection dated Aug. 1, 2011, 26 pages, Doc 2134.
U.S. Appl. No. 11/480,094 / Response After Final Action filed Nov. 1, 2011, 35 pages, Doc 2135.
U.S. Appl. No. 11/480,094 / Advisory Action dated Nov. 14, 2011, 3 pages, Doc 2136.
U.S. Appl. No. 11/480,094 / Notice of Appeal Filed Nov. 28, 2011, 5 pages, Doc 2137 pages.
U.S. Appl. No. 11/480,094 / Abandonment dated Jul. 31, 2012, 2 pages, Doc 2138.
"Core Technology Benchmarks A White Paper" (Jul. 2002), downloaded from the internet Mar. 2, 2004, 11 pages, Doc 2178.
"Origin Data, Inc. White Paper" (1999) pp. 1-13, 14 pages, Doc 2179.
ACM Portal Search—"The Art of Computer Programming", Fundamental Algorithms, 1 (1973), ACM Portal Search Results conducted by Examiner on Jul. 18, 2009, 6 pages, Doc 2180.
ACM Portal Search—"The Associative Model of Data White Paper", Lazy Software (2000), ACM Portal Search Results conducted by Examiner on Jul. 18, 2009, 1 page, Doc 2181.
Alderson, "Toward An Optimization Driven Framework for Designing and Generating Realistic Internet Topologies", Journal of the Association for Computing Machinery SIGCOMM Computer Communications Review 41, 33(1) (2003) pp. 41-46, 6 pages, Doc 2182.
Apostol, "A Centennial History of the Prime No. Theorem", Engineering and Science, 4, (1996), 10 pages, Doc 2183.
Benedikt, "Definable Relations and First-Order Query Languages over Strings", Journal of the Journal of the Association for Computing Machinery, 50 (2003) pp. 694-751, 58 pages, Doc 2186.
Boppana, "Full Fault Dictionary Storage Based on Labeled Tree Encoding", 14th VLSI Test Symposium (1996) pp. 174-179, 6 pages, Doc 2185.
Borodin, "A Tradeoff Between Search and Update Time for the Implicit Dictionary Problem", Theoretical Computer Science, 1(4) (1990), pp. 425-447, 12 pages, Doc 2184.
Cano, "Lazy Evaluation in Penniless Propagation Over Join Trees", Networks, 39(4) (2002), pp. 175-185, 11 pages, Doc 2187.
Caviness, "Simplification of Radical Expressions", Journal of the Association for Computing Machinery (1976), pp. 329-338, 10 pages, Doc 2188.
Coenen, "T-Trees, Vertical Partitioning and Distributed Association Rule Mining", IEEE (2003), 4 pages, Doc 2191.
Cole—"Tree Pattern Matching and Subset Matching in Deterministic O(n log 3 n)-time", Proceedings of the Tenth Annual Association for Computing Machinery-SIAM Symposium on Discrete Algorithms, (1999) pp. 1-10, 10 pages, Doc 2189.
Cooper, "Oh! Pascal!", Arrays for Random Access (1982) pp. 295-327, 18 pages, Doc 2190.
Dubiner13 "Faster Tree Pattern Matching", Journal of the Association for Computing Machinery, 41(2) (1994) pp. 205-213, 9 pages, Doc 2192.
Durango Bill's—"Enumeration of Trees", http://web.archive.org/web/20021028184112/http://www.durangobill.com/Trees.html (1998), 3 pages, Doc 2193.
Er, "Enumerating Ordered Trees Lexicographically", Computation Journal, 28 (1985) pp. 538-542, 5 pages, Doc 2194.
Ferragina, "The String B-Tree: A New Data Structure for String Search in External Memory and Its Applications", Journal of the Association for Computing Machinery, 46(2) (1999) pp. 236-280, 45 pages, Doc 2196.
Google search (Kleene prime number enumeration operation natural numerals sequences "Kleene prime") conducted by Examiner on Jul. 18, 2009, 2 pages, Doc 2195.
Google search (Kleene prime numer enumeration operation natural numerals sequences "enumeration operation") conducted by Examiner on Jul. 18, 2009, 2 pages, Doc 2197.
Google search (Kleene prime enumeration operation) conducted by Examiner on Jul. 18, 2009, 2 pages, Doc 2198.
Hirschberg, "Algorithm for Computing Maximal Common Subsequences", Journal of the Association for Computing Machinery, 18(6) (1975) pp. 341-343, 3 pages, Doc 2199.
Hoffmann, "Pattern Matching in Trees" 29(1) (1982) pp. 68-95 28 pages, Doc 2200.
Iacob, "Xpath Extension for Querying Concurrent XML Markup," Technical Report #TR-394-04, Department of Computer Science, University of Kentucky (2004), 15 pages, Doc 2201.
IEEE Explore Digital Library Search Result Conducted by Examiner on Jul. 18, 2009, 1 page, Doc 2202.
Jaiswal, "Local Pattern Transformation Based Feature Extraction Techniques for Classification of Epileptic EEG Signals, Biomedical Signal Processing and Control" (2017) pp. 81-92, 12 pages, Doc 2205.
Johnston, "Advances in Dataflow Programming Languages", Journal of the Association for Computing Machinery Computing Surveys, 36 (2004) pp. 1-34, 34 pages, Doc 2203.
Katajainen, "Tree Compression and Optimization with Applications", International Journal of Foundations of Computer Science, 1(4) 1990, pp. 425-447, 24 pages, Doc 2204.
Kharbutli, "Using Prime Numbers for Cache Indexing to Eliminate Conflict Misses" North Carolina State University Dept. of Electronical and Computer Engineering (2004) 24 pages, Doc 2206.
Kilpelainen, "Tree Matching Problems with Applications to Structured Text Databases," University of Helsinki Ph. D. Dissertation, Report A-1992-6 (1992) pp. 1-109, 113 pages, Doc 2207.
Knott—"A Balanced Tree Storage and Retrieval Algorithm" ACM pp. 175-196, 1971, Doc 2296.
Knuth—"The Art of Computer Programming", Fundamental Algorithms, 1 (1973), pp. 162-163, 3 pages, Doc 2208.
Leinonen, "Automation of Document Structure Transformations", University of Kuopio (2004) 68 pages, Doc 2209.

(56) References Cited

OTHER PUBLICATIONS

Lerman, "Learning the Common Structure of Data," American Association for Artificial Intelligence, AAAI-00 Proceedings (2000) 6 pages, Doc 2210.
Letourneau, "The Elementary Theory of Object Oriented Arithmetic" (1990) pp. 1-9, 9 pages, Doc 2211.
Li—"An Immediate Approach to Balancing Nodes in Binary Search Trees" ACM, pp. 238-245, 2006.
Malhotra "A Methodology for Formal Expression of Hierarchy in Model Solution", IEEE (1983) pp. 258-267, 10 pages, Doc 2244.
Minn, "Linear Transformation of Multi-Level Signal Set in Multi-Code CDMA", IEEE (2001) pp. 1239-1243, 5 pages, Doc 2214.
Murray, "Code Transformation and Instruction Set Extension", Journal of the Association for Computing Machinery (2009) pp. 1-31, 32 pages, Doc 2215.
Navarro, "A Guided Tour to Approximate String Matching", Journal of the Association for Computing Machinery Computing Surveys, 33 (2001) pp. 31-88, 58 pages, Doc 2213.
Neven, "Expressive and Efficient Pattern Languages for Tree-Structured Data," Proceedings of the 19th Association for Computing Machinery SIGACT-SIGMOD-SIGART Symposium on Principles of Database Systems (2000), 12 pages, Doc 2216.
Paik, "Mining Association Rules in Tree Structured XML Data" ACM, pp. 807-811, 2009, 5 pages, Doc 2243.
Prasad, "Efficient Bit-Parallel Multi-Patterns String Matching Algorithms for Limited Expression", Journal of the Association for Computing Machinery (2010) pp. 1-6, 6 pages, Doc 2217.
Ramesh—"Nonlinear Pattern Matching in Trees", Journal of the Association for Computer Machinery, 39 (1992) pp. 295-316, 22 pages, Doc 2218.
Reiss, "Semantics-Based Code Search", IEEE ICSE (2009) pp. 243-253, 11 pages, Doc 2219.
Rizum, "Code Transformation by Direct Transformation of ASTs", Journal of the Association for Computing Machinery (2015) pp. 1-7, 7 pages, Doc 2220.
Schmidt, "Comparison of Tree and Graph Encodings as Function of Problem Complexity", Journal of the Association for Computing Machinery (2007) pp. 1674-1679, 6 pages, Doc 2221.
Sechrest, "Blending Hierarchical and Attribute-Based File Naming", Distributed Computing System of the 12th International Conference (1992), pp. 572-580, 9 pages, Doc 2222.
Shanmugasundaram, "Querying SML Views of Relational Data" 27th VLDB Conference (2001), 9 pages, Doc 2223.
Siegel, "All Searches Are Divided into Three Parts String Searches Using Ternary Trees", Journal of the Association for Computing Machinery (1988) pp. 57-68, 12 pages, Doc 2224.
Sinha, "Efficient Trie Based Sorting of Large Sets of Strings", Journal of the Association for Computing Machinery (2003) pp. 1-8, 8 pages, Doc 2225.
Krishna, "A VLSI Architecture for Object Recognition Using Tree Matching", IEEE International Conference on Application-Specific Systems, Architecture and Processors (2000), 78 pages, Doc 2226.
Smorynski, "Logical No. Theory 1: An Introduction", Springer-Verlag (1991) pp. 14-23, 305, 16 pages, Doc 2227.
Somani, "Phased-Mission System Analysis Using Boolean Algebraic Methods" 22(1) (1994), 10 pages, Doc 2228.
Spinellis, "Declarative Peephole Optimization Using String Pattern Matching", Journal of the Association for Computing Machinery (1999) pp. 47-51, 5 pages, Doc 2229.
Sproat, "Compilation of Weighted Finite-State Transducers from Decision Trees", Journal of the Association for Computing Machinery (1996) pp. 215-222, 8 pages, Doc 2230.
Stanat, "Discrete Mathematics in Computer Science," (1977) pp. 131-145, 17 pages, Doc 2231.
Stefanov "Algorithmic Transformation Techniques for Efficient Exploration of Alternative Application Instances" Journal for the Association for Computing Machinery (ACM) (2002) pp. 7-12, 6 pages, Doc 2234.
Talukdar, "Learning to Create Data-Integrating Queries", Journal of the Association for Computing Machinery PVLDB (2008) pp. 785-796, 12 pages, Doc 2232.
Thiemann, "Grammar Based Analysis of String Expressions", Journal of the Association for Computing Machinery (2005) pp. 59-70, 12 pages, Doc 2233.
Valiente, "Algorithms on Trees and Graphs", Tree Isomorphism (2002) pp. 151-251, 100 pages, Doc 2235.
Valiente, "Tree Isomorphism", Algorithms on Trees and Graphs (2002), 51 pages, Doc 2236.
Wagner, "The String-to-String Correction Problem", Journal of the Association for Computing Machinery, 21(1) (1974) pp. 168-173, 9 pages, Doc 2237.
Wu, "A Prime Number Labeling Scheme for Dynamic Ordered XML Trees", IEEE (2004) 13 pages, Doc 2238.
Xie, "S-Looper: Automatic Summarization for Multipath String Loops", Journal of the Association for Computing Machinery, (2015) pp. 188-198, 11 pages, Doc 2239.
Yates, "A New Approach to Text Searching", Communication of the Journal of the Association for Computing Machinery, 35(1) (1992) pp. 74-82, 9 pages, Doc 2240.
Zaks, "Lexicographic Generation of Ordered Trees," The Journal of Theoretical Computer Science, 10(1) (1980) pp. 63-82, 11 pages, Doc 2241.
U.S. Appl. No. 16/209,872: Issue Notification dated Dec. 1, 2021, 1 page.
U.S. Appl. No. 17/381,142: Notice of Publication dated Nov. 11, 2021, 1 page.
U.S. Appl. No. 16/379,674: Notice of Allowance/Allowability dated Dec. 8, 2021, 28 pages.
U.S. Appl. No. 16/164,535: Issue Notification dated Nov. 17, 2021, 1 page.
U.S. Appl. No. 16/209,872: Issue Fee Payment and 312 Response filed Oct. 11, 2021, 14 pages.
U.S. Appl. No. 16/909,899: Non-final Office Action dated Aug. 11, 2021, pages.
U.S. Appl. No. 16/909,899: Response to Non-final Office Action filed Nov. 11, 2021, 27 pages.
U.S. Appl. No. 16/459,930: Response to Non-final Office Action filed Oct. 12, 2021, 18 pages.
U.S. Appl. No. 16/513,021: Response to Non-final Office Action and Terminal Disclaimer filed Sep. 28, 2021, 36 pages.
U.S. Appl. No. 16/513,021: Final Office Action dated Nov. 2, 2021, 37 pages.
U.S. Appl. No. 15/464,205: Request for Continued Examination and 312 Response filed Aug. 26, 2021, 13 pages.
U.S. Appl. No. 15/464,205: Notice of Allowance/Allowability dated Sep. 9, 2021, 5 pages.
U.S. Appl. No. 15/464,205: Notice of Allowance/Allowability dated Oct. 29, 2021, 105 pages.
U.S. Appl. No. 16/427,054: Request for Continued Examination filed Aug. 25, 2021, 3 pages.
U.S. Appl. No. 16/710,731: Response to Non-Final Rejection filed Sep. 15, 2021, 24 pages.
U.S. Appl. No. 16/710,731: Final Office Action dated Nov. 2, 2021, 39 pages.
U.S. Appl. No. 17/396,488: Filing Receipt and Notice of Missing Parts dated Aug. 19, 2021, 7 pages.
U.S. Appl. No. 17/396,488: Response to Notice of Missing Parts and Preliminary Amendment filed Nov. 3, 2021, 95 pages.
U.S. Appl. No. 16/898,134: Notice of Allowance/Allowability dated Sep. 22, 2021, 8 pages.
U.S. Appl. No. 16/898,134: Supplemental Notice of Allowability dated Oct. 14, 2021, 23 pages.
U.S. Appl. No. 16/898,134: Supplemental Notice of Allowability dated Oct. 20, 2021, 23 pages.
U.S. Appl. No. 16/164,535: Issue Fee Payment and 312 Response filed Oct. 8, 2021, 17 pages.
U.S. Appl. No. 17/378,119: Response to Notice to File Corrected Application Papers dated Nov. 3, 2021, 27 pages.

* cited by examiner

Q(0) ⇒ 2
Q(1) ⇒ 3
Q(2) ⇒ 5
Q(3) ⇒ 7
Q(4) ⇒ 11
Q(5) ⇒ 13
Q(6) ⇒ 17
Q(7) ⇒ 19
Q(8) ⇒ 23
Q(9) ⇒ 29
Q(10) ⇒ 31
Q(11) ⇒ 37
Q(12) ⇒ 41

(((A(1) * B((((A(D(1) * B(C(1)))) * A(A(1)) * D(1)))) *A(1)) *C(D(1)))

| View 1 Trees | Symbol Strings | Numerals |
|---|---|---|
| • | <λ> | 0 |
| •–• | <( )> | 1 |
| tree | <( ) ( )> | 2 |
| tree | <(( )) > | 3 |
| tree | <( ) ( ) ( )> | 4 |
| tree | <(( ) ( ))> | 5 |
| tree | <( ) (( ))> | 6 |
| tree | <((( )))> | 7 |
| tree | <( )( ) ( )( )> | 8 |
| tree | <(( )) (( ))> | 9 |
| tree | <( )(( )( ))> | 10 |

Fig. 7

| View 1 Trees | Symbol Strings | Numerals |
|---|---|---|
|  | <λ> | 0 |
|  | <{ }> | 1 |
|  | <{ }{ }> | 2 |
|  | <{{ }}> | 3 |
|  | <{ }{ }{ }> | 4 |
|  | <{{ }{ }}> | 5 |
|  | <{ }{{ }}> | 6 |
|  | <{{{ }}}> | 7 |
|  | <{ }{ }{ }{ }> | 8 |
|  | <{{ }}{{ }}> | 9 |
|  | <{ }{{ }{ }}> | 10 |
Fig. 8

| View 1 Trees | Symbol Strings | Numerals |
|---|---|---|
| • | <λ> | 0 |
| (2-node chain) | <[ ]> | 1 |
| (root with 2 children) | <[ ][ ]> | 2 |
| (3-node chain) | <[[ ]]> | 3 |
| (root with 3 children) | <[ ][ ][ ]> | 4 |
| (root with 2 children, one having a child) | <[[ ][ ]]> | 5 |
| | <[ ][[ ]]> | 6 |
| (4-node chain) | <[[[ ]]]> | 7 |
| (root with 4 children) | <[ ][ ][ ][ ]> | 8 |
| | <[[ ]][[ ]]> | 9 |
| | <[ ][[ ][ ]]> | 10 |

| View 2 Trees | Symbol Strings | Numerals |
|---|---|---|
| • | <λ> | 0 |
| •—• (0) | <()> | 1 |
| •∧• (0,1) | <()()> | 2 |
| •—• (1) | <{}> | 3 |
| •∧• with three children (0,0,0) | <()()()> | 4 |
| •—•—• (0,0) | <(())> | 5 |
| •∧• (0,1) | <(){}> | 6 |
| •—•—• (1,0) | <{()}> | 7 |
| • with four children (0,0,0,0) | <()()()()> | 8 |
| •∧• (1,1) | <{}{}> | 9 |
| • with (0,0) and nested 0 | <()(())> | 10 |

Fig. 10

| View 1 Trees | Symbol Strings | Numerals |
|:---:|:---:|:---:|
| • | <λ> | 0 |
| A•—• | <( )> | 1 |
| A•—•—•A | <( )( )> | 2 |
| B•—• | <{ }> | 3 |
| A•—•—•A (with A) | <( )( )( )> | 4 |
| C•—• | <[ ]> | 5 |
| A•—•B | <( ){ }> | 6 |
| A•—A•—• | <(( ))> | 7 |
| A•—•—•—•A (four leaves) | <( )( ) ( )( )> | 8 |
| B•—•B | <{ }{ }> | 9 |
| A•—•C | <( )[ ]> | 10 |
| A•—B•—• | <{( )}> | 11 |
| A•—•—•B | <( )( ){ }> | 12 |
| C•—A•—• | <[( )]> | 13 |

Fig. 11 — 1100

METHOD AND/OR SYSTEM FOR TRANSFORMING BETWEEN TREES AND STRINGS

RELATED APPLICATION

This application claims priority to U.S. Provisional Patent Application Ser. No. 60/657,264 filed Feb. 28, 2005, entitled METHOD AND/OR SYSTEM FOR TRANSFORMING BETWEEN TREES AND STRINGS, assigned to the assignee of claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIGS. 7 through 9 are tables illustrating embodiments of a relationship among symbol strings, trees and natural numerals;

FIG. 10 is a table illustrating an embodiment of a relationship among natural numerals, BELTs and symbol strings comprising two types of grouping symbol pairs;

FIG. 11 is a table illustrating an embodiment of a relationship between natural numerals, tertiary A, B, C, edge labeled trees and symbol strings comprising three types of grouping symbol pairs;

DETAILED DESCRIPTION

Figure 1:
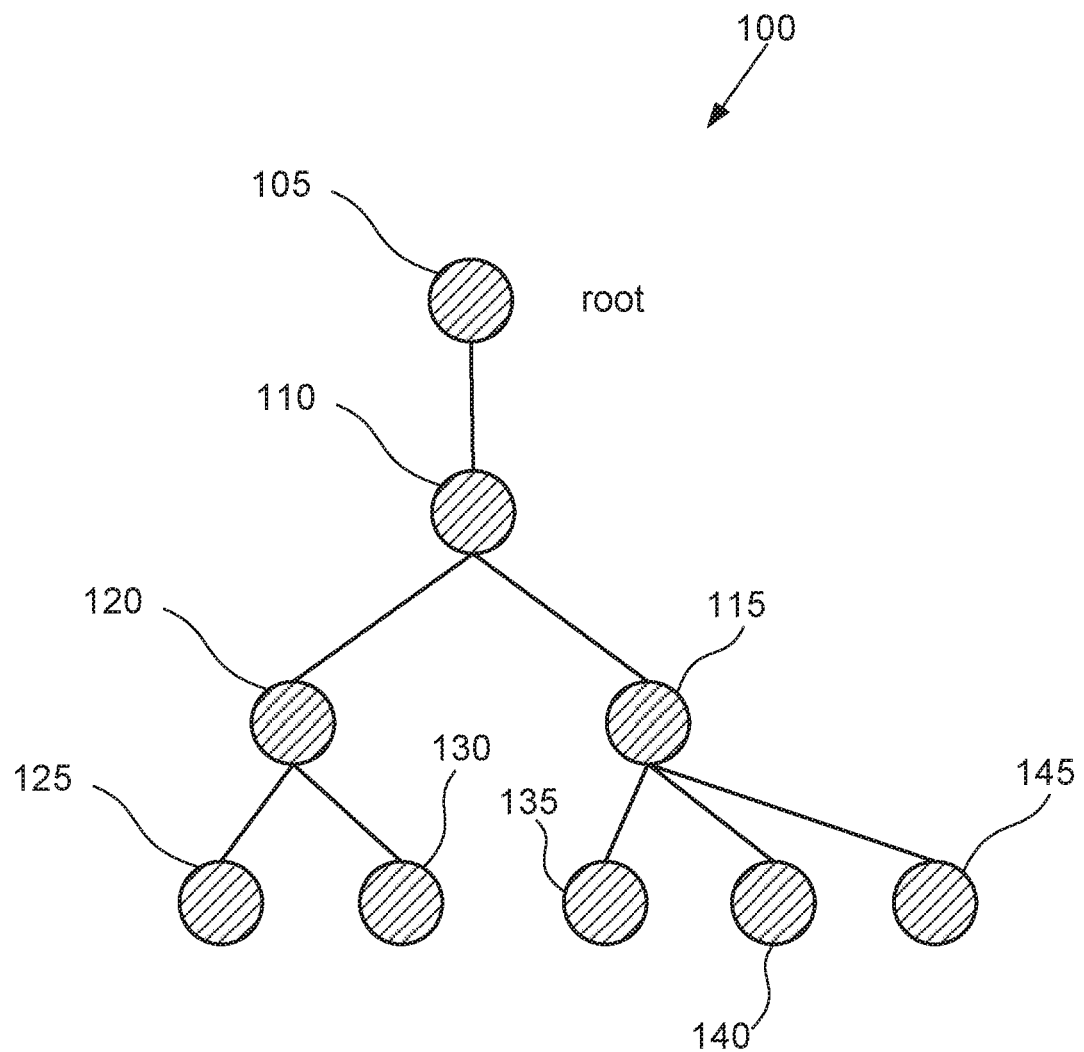
FIG. 1 is a schematic diagram of an unordered tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "transforming," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, non-empty (including at least one node), rooted, connected, acyclic graph. Likewise, such trees may be either ordered or unordered. Further discussion of non-empty trees may be found in *The Art of Computer Programming, Vol. 1, Fundamental Algorithms*, Donald Knuth, Addison Wesley. Here, ordered refers to the notion that there is an ordering or precedence among nodes attached to a common node corresponding to the order of the attached nodes shown in a graphical illustration. An unordered tree is illustrated here, for example, in FIG. 1 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete non-backtracking loop.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values represented as "edge label values." Similarly, in another particular embodiment, a tree may include nodes that are labeled with data and/or values represented as "node label values." Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with three values, such as 0, 1, 2. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with the numerals previously described. Any distinctly identifiable labels may be employed; however, in this context, it shall be understood that employing numerals to label the edges is sufficiently general to encompass any sort of data labels that may be desirable, regardless of their form.

To reiterate, in this context, a tree comprises an edge labeled tree if each edge of the tree respectively holds, stores and/or represents a value or piece of data. Likewise, in this context, two nodes are employed to support an edge storing, holding and/or representing a piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

According to an embodiment, trees or portions of trees may be represented by natural numerals according to an association of trees and natural numerals. Without belaboring the present discussion, additional descriptions of how natural numerals may be associated with trees are discussed in greater detail below and in U.S. patent application Ser. No. 11/005,859, filed on Dec. 6, 2004, by J. J. LeTourneau, titled, "Manipulating Sets of Hierarchical Data," assigned to the assignee of the presently claimed subject matter. It should be understood, however, that while the particular embodiments illustrated are directed to particular associations of numerals and trees, there may be many associations of trees to numerals according to corresponding particular "association embodiments," and the claimed subject matter is not limited to any such particular association.

According to an embodiment, although the claimed subject matter is not limited in scope in this respect, a method of enumerating a set of unordered trees may begin with enumeration of a one node binary edge labeled tree. The one node tree, which holds no data, is associated with the natural numeral one and has a graphical representation of a single node in this embodiment. For higher natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985.

As illustrated, for this particular embodiment, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one. It should be understood that, while this particular embodiment associates a single node tree with the numeral one, and associates other trees with other numerals based, at least in part, upon this association, other embodiments illustrated below associate a single node tree with the numeral zero, or different numerals. Other trees in this association embodiment may then be based, at least in part, on this association.

Continuing with this example, to obtain the binary edge labeled tree for position four, observe that numeral four is the product of numeral two times numeral two. Thus, a union is formed at the root of two trees, where, here, each of those trees is associated with the natural numeral two. Likewise, to obtain the binary edge labeled tree for position five, begin with the binary edge labeled tree for position two and follow the previously articulated approach of adding a root and an edge and labeling it with a binary zero.

Figures 3, 4:
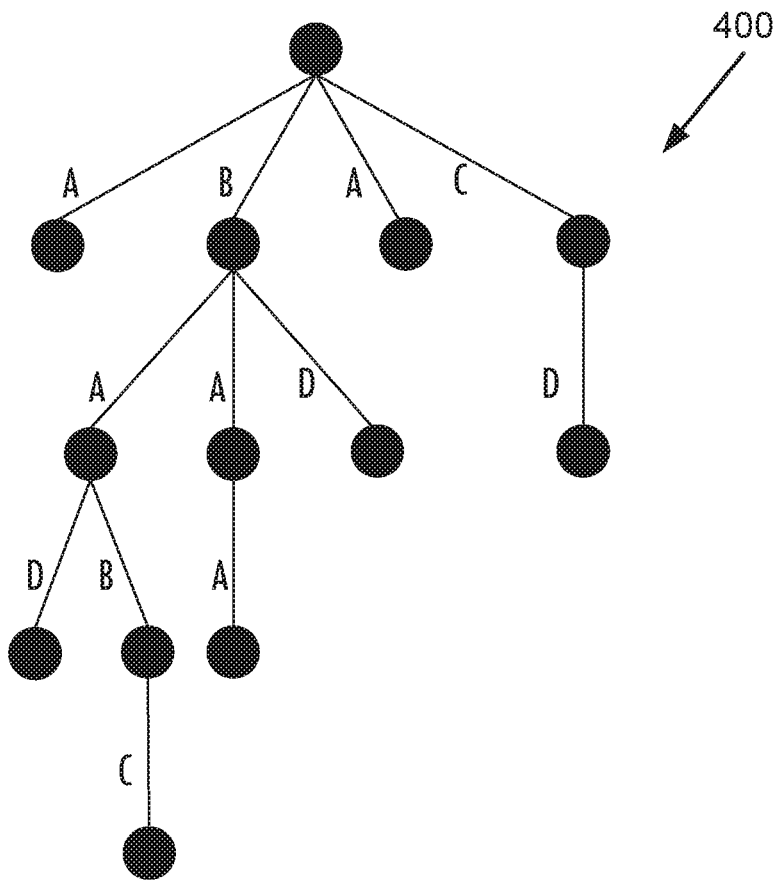
FIG. 3 is a table providing an embodiment of a function that relates natural numerals to non-composite numerals.
FIG. 4 is a schematic diagram illustrating an embodiment of an unordered edge-labeled tree and a symbolic expression mathematically representing the tree embodiment.

In this context, adding a root node and an edge to a BELT and labeling it binary zero is referred to as a "zero-push" operation and adding a root node and an edge to the BELT and labeling it binary one is referred to as a "one-push" operation. Here, a numeral associated with a tree resulting from either a zero-push or a one-push operation, according to a particular association embodiment, may be represented as a numerical operation on the numeral representing the BELT as follows:

zero-Push$(x)=Q(2x-2)$ one-Push$(x)=Q(2x-1)$ where:

$x$=numeral associated with BELT according to the particular association embodiment; and Q(k) is a function generating an ordered sequence of non-composite numerals as shown in FIG. 3.

Figure 2:
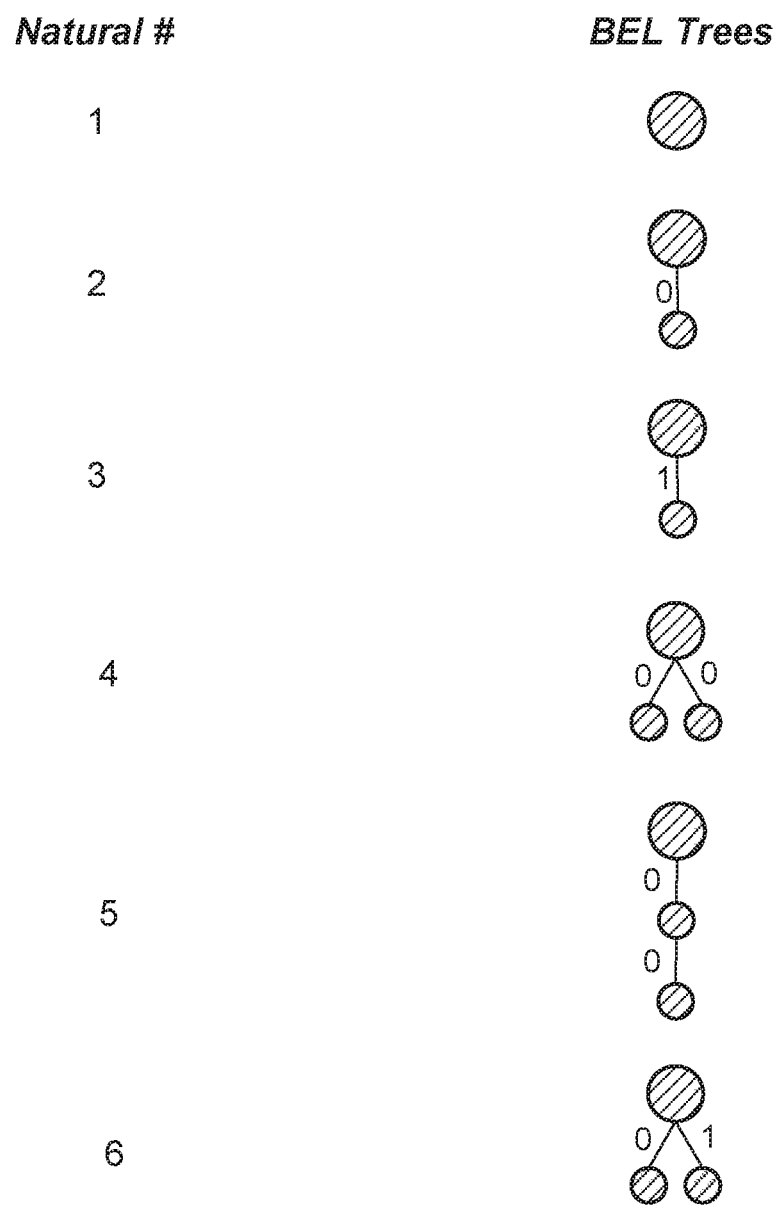
FIG. 2 is a table illustrating an embodiment of a relationship between binary edge labeled trees (BELTs) and positive natural numerals.

Thus, referring again to FIG. 2, the one-push of the root tree is the tree at position three. This follows since $Q((1*2)-1)=Q(1)=3$. Likewise, the tree at position five is the zero-push of the tree at position 2. This follows since $Q((2*2)-2)=Q(2)=5$.

In the presently illustrated embodiment, the function Q(k) relates to the well known Kleene enumeration function for the sequential enumeration of non-composite numerals P(k). Accordingly, in this context, the term prime numerals and non-composite numerals may be used interchangeably throughout. Here, the function Q(k) may be generated as $Q(k)=P(k+1)$ where the Kleene enumeration function is expressed, in part, as follows:

$$P(1)=2$$
$$P(2)=3$$
$$P(3)=5$$
$$P(4)=7$$
$$\ldots$$

In the embodiment just described, binary edge labeled trees use binary numerals "0" and "1." However, the claimed subject matter is not limited in scope to binary edge labeled trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree.

The foregoing discussion has begun to characterize an algebra involving trees, in this particular embodiment, an algebra for unordered edge labeled trees or unordered ELTs, such as BELTs. The foregoing discussion define a value one, a one node tree for this particular embodiment, and a monadic operation, previously described as zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality. For this particular embodiment, an additional operation may be characterized, a "merger" operation. The merger operation with respect to trees refers to merging two trees at their roots.

As will now be appreciated, the merger operation comprises a dyadic operator or, in this context, also known as a binary operator. Likewise, the constants zero/one, referred to above, may be viewed as an operation having no argument or as a zero valued argument operator or operation. Thus, this operation, in effect, returns the same value whenever applied. Here, for this particular embodiment, the constant value, or zero valued argument operation that returns "c" and is denoted as "c." The merger operator is denoted as "*".

FIG. 4 is schematic diagram illustrating an embodiment of an edge labeled tree, here a four valued edge labeled tree. In this particular embodiment, four distinct values are employed to label the edges. Here, the labels comprising A, B, C and D, although, of course, the claimed subject matter is not limited to four valued edge labeled trees, to edge labeled trees, or to employing these particular edge labels. It is noted that the labels A, B, C, and D in this embodiment are similar to the labels binary 0 and binary 1 for BELTs. Below tree 400 in FIG. 4 is a symbolic expression mathematically representing tree 400. Performing the operations indicated by the expression shown in FIG. 4 below tree 400 will provide a natural numeral that corresponds, for this particular embodiment, to this particular tree, as described in more detail hereinafter.

Figure 5:
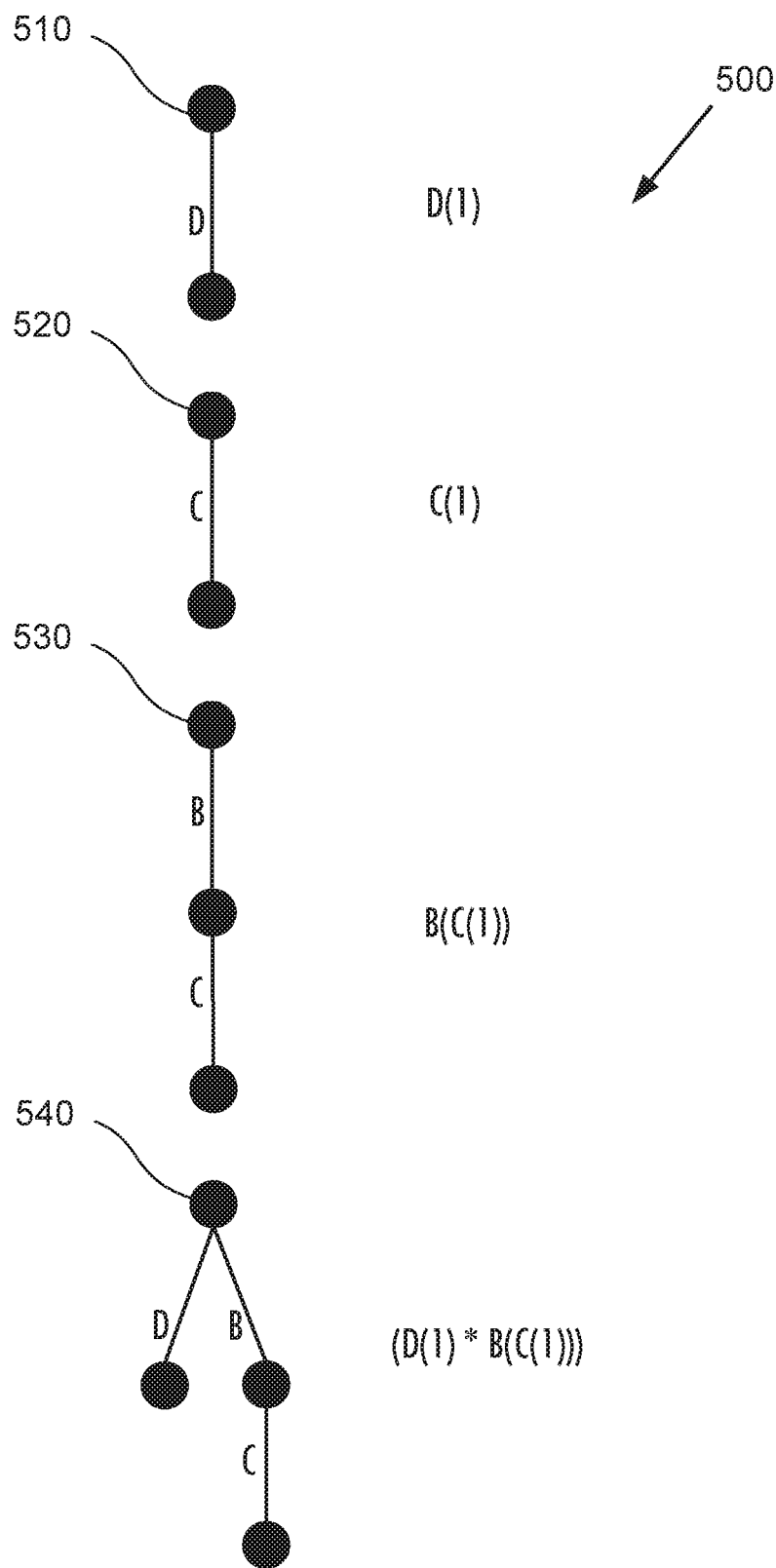
FIG. 5 is a schematic diagram of embodiments of unordered edge-labeled trees and symbolic expressions mathematically representing the tree embodiments.

To assist in understanding the relationship between the symbolic expression shown in FIG. 4 and tree 400, for this particular embodiment, FIG. 5 provides an embodiment 510 of another tree. As illustrated, tree 510 comprises an edge label D connecting two nodes. For this particular context, this embodiment may be expressed symbolically as follows: D(1). Thus, a technique to describe the embodiment of tree 510 would refer to the "push" of the natural numeral 1. Here, for this particular embodiment, this particular push operation comprises the "D" push of 1, resulting in D being the label of the edge connecting the two nodes. More specifically, as previously described, a single node is associated with the natural numeral 1 in this particular embodiment. To perform a push operation, an edge is attached to that node and labeled. Here, applying a D push, the label provided comprises the label D.

Continuing, the "C" push of "1" is illustrated as two nodes with an edge labeled C connecting the two nodes for tree embodiment 520. Applying similar reasoning provides an edge labeled tree embodiment 530 representing the following expression: B(C(1)). Likewise, for this particular embodiment, the operation of merger may be represented as "*", as previously suggested. Thus, applying a merger operation provides tree embodiment 540 at the bottom of FIG. 5 corresponding, for this particular embodiment, to the following expression: (D(1)*B(C(1))).

Figure 6:
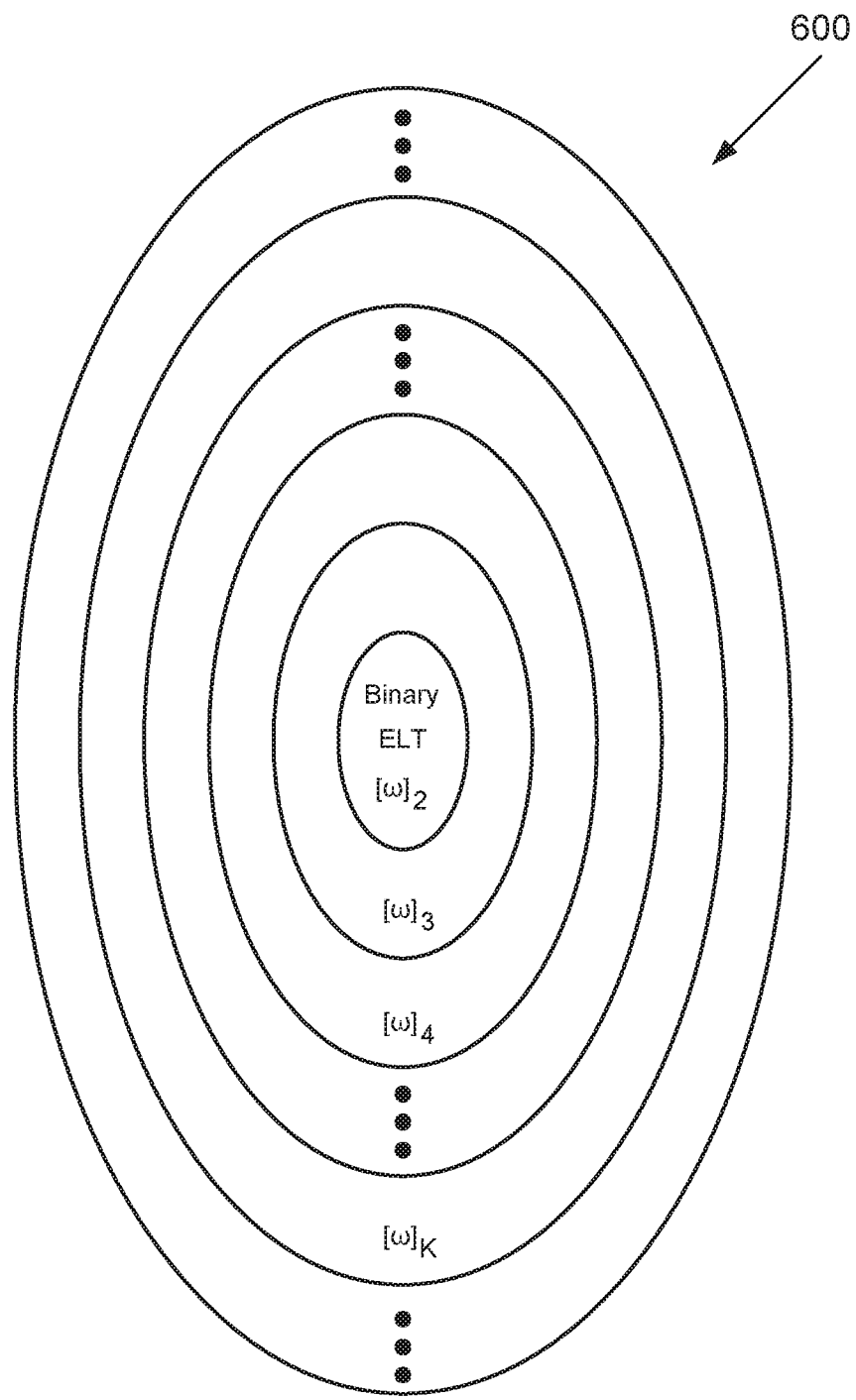
FIG. 6 is a schematic diagram illustrating all N-valued rooted, unordered, edge-labeled trees, where N is a natural numeral greater than or equal to two.

Previously, an embodiment for manipulating binary edge labeled trees or BELTs was described in connection with the aforementioned U.S. patent application Ser. No. 11/005,859. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Referring now to FIG. 6, a Venn diagram 600 is illustrated providing the set of all edge labeled trees, structured or organized in a particular manner here. In the center of the diagram, binary or two valued edge labeled trees are depicted as a subset. Furthermore, as illustrated, two valued edge labeled trees are also depicted as a subclass or subset of tertiary or three valued edge labeled trees. Likewise, three valued edge labeled trees are depicted as a subclass or subset of four valued edge labeled trees and so forth. Thus, depending at least in part on the particular set of distinct values employed to label the edges, an edge labeled tree that employs two distinct values may comprise an example of a three valued edge labeled tree in which one of the values is specifically not employed in the particular tree. As shall be explained in more detail hereinafter, this raises a question regarding proper interpretation of the data that the tree may hold, represent and/or store. More specifically, an identical tree may represent different data depending at least in part on whether the tree is "viewed" as, to continue with this example, a two valued edge labeled tree or a three valued edge labeled tree. For example, up to two views of a two valued tree may be obtained and up to three views of a three valued tree may be obtained.

Thus, in this embodiment, we refer to this as the "view" of the particular expression. While particular embodiments illustrated herein relate to obtaining views of particular expressions known as trees, other embodiments may relate to obtaining views of other types of expressions such as symbol strings as illustrated below. However, symbol strings and trees are merely examples of expressions from which a view may be obtained and claimed subject matter is not limited in this respect. For a particular example of expressions comprising trees, for the purposes of illustration, a two valued edge labeled tree is referred to as view 2 and a three valued edge labeled tree is referred to as view 3, although, for example, the particular tree may not contain three different values. The view in this embodiment is determined, at least in part, by the set of distinct values from which the labels may be selected, as previously described. FIG. 6 therefore depicts the set of all edge labeled trees as the union of all such edge labeled trees in which the edge values are selected from a set having a specific number of distinct values.

Previously in the aforementioned U.S. patent application Ser. No. 11/005,859, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, according to particular association embodiments, for example, three valued edge label trees may be expressed as numerals, four valued edge labeled trees may be expressed as numerals and so forth. Thus, manipulations, such as those previously described, for example, in aforementioned U.S. patent application Ser. No. 11/005,859, as well as additional manipulations, may be applied to N valued edge labeled trees, as described in U.S. patent application Ser. No. 11/006,446, filed on Dec. 6, 2004 by J. J, LeTourneau, titled "Method and/or System for Tagging Trees," and assigned to the assignee of the presently claimed subject matter. However, these are merely examples of how edge labeled trees may be manipulated and the claimed subject matter is not limited in this respect.

According to an embodiment, a "set" may define a collection of unique unordered elements or members. For example, for the purpose of illustration, a set may contain members or elements of a distinct classification, such as the set of all automobiles in a parking lot of a particular color. In a particular embodiment illustrated in FIG. 6, for example, trees may be classified into sets defined by certain characteristics, such as the particular view expressed, and the like. However, this is merely an example of how trees may be classified into distinct sets and the claimed subject matter is not limited in this respect. As illustrated below, symbol strings may similarly be classified based, at least in part, on the particular view that may be expressed in such symbol strings.

According to an embodiment, a "transformation" may define a process by which elements of a first set may be mapped between and/or associated with elements of a second set. For example, in a particular embodiment, a transformation may map and/or associate a member of the set of trees with a member of the set of symbol strings. Similarly, according to a particular embodiment, a transformation may map and/or associate a member of the set of natural numerals to a member in either the set of trees or the set of symbol strings. However, these are merely examples of how a transformation may map and/or associate members of one set to members of another set, and the claimed subject matter is not limited in these respects.

According to an embodiment, a transformation may associate and/or map an element in a first set with an element in a second set as an "elementary equivalent." Here, in a particular embodiment, such a transformation may associate such elementary equivalent elements in different sets in a one-to-one and onto mapping in which the transformation defines for elements in a first set corresponding, unique elementary equivalents in a second set. Similarly, a transformation may also map and/or associate members of the second set to or between corresponding elementary equivalents in the first set. Examples of a transformations mapping and/or associating elementary equivalent elements of different sets may be found in, for example, *Logical Number Theory, An Introduction*, by Craig Smorynski, p. 305. However, this is merely an example of how a transformation may map and/or associate members of different sets as elementary equivalents, and the claimed subject matter is not limited in these respects.

FIGS. 7 through 11 are tables illustrating strings of grouping symbols according to an embodiment. As discussed in the aforementioned U.S. patent application Ser. No. 11/005,859, strings may be associated with numerals according to particular association embodiments. Grouping symbols may comprise symbols in a string of symbols that define relationships or groupings among symbols in the string. Particular embodiments relate to pairs of such grouping symbols. However, grouping symbols are not limited to grouping symbols in such grouping symbol pairs, and that grouping symbols may comprise grouping symbol triplets, quadruplets, etc.

As illustrated in FIGS. 7 through 11, in this particular embodiment, such strings may be formed from grouping symbol pairs to obey rules of parenthetical association. For example, in this particular case, including an "open symbol" (e.g., "(," "[" or "{", in particular embodiments) for every corresponding "close symbol" (e.g., ")," "]" or "}") and including a close symbol for every corresponding open symbol. The symbol strings may also be formed with symbol character pairs indicating a "close" or "end" for a particular string and/or portion of a string (e.g., in a particular embodiment, "{([( )])} ( )" and not "{([([]))}"). As in one example, if a first open symbol of a first type of grouping symbol pair is followed by a second open symbol of a second type of grouping symbol pair, a close symbol corresponding to the first open symbol may follow a close symbol corresponding to the second open symbol for proper parenthetical association. Symbol strings comprising grouping symbol pairs obeying these rules of parenthetical association are referred to herein as "well formed" symbol strings. However, these are merely examples of how strings may be formed from character symbols and the claimed subject matter is not limited in these respects.

The embodiments of FIGS. 7 through 11 show grouping symbols which are selected from characters set forth by the American Standard Code for Information Interchange (ASCII). However, these are mere examples of grouping symbols that may be used to represent information in a symbol string and the claimed subject matter is not limited in these respects.

Additionally, as with trees, as described above, such strings of grouping symbols may also define monadic and dyadic operations. For example, combining symbol strings end-to-end may define a dyadic "concatenation" operation in which a numeral representing the resulting combined string, according to an association embodiment, may comprise the product of numerals representing respective combined symbol strings. Also, encapsulating a symbol string with corresponding open and close symbols of a grouping symbol pair may define a monadic "encapsulation" operation. Here, in a particular embodiment as illustrated in FIGS. 7 through 11, an encapsulation of a symbol string "xxxxxx" may be represented as "(xxxxxx)", "[xxxxxx]" and/or "{xxxxxx}". However, these are merely examples of operations which may be used to manipulate a symbol string and the claimed subject matter is not limited to the use of these particular operations.

FIGS. 7 through 11 illustrate corresponding association embodiments associating symbol strings with corresponding numerals zero through ten. The symbol "A" is used to represent the empty symbol string comprising no symbols, but is associated with a single node tree in this particular embodiment. It should be observed that in these particular association embodiments, the single node tree is associated with the numeral zero. However, as illustrated above, other association embodiments may associate a single node tree with numeral one. Particular association embodiments may define associations of one or more non-composite numerals of an initial sequence of non-composite numerals with a symbol string comprising one or more grouping symbol pairs. For example, numeral one is associated with "( )" in association embodiments 700, 1000 and 1100. Numeral one is associated with "{ }" in association embodiment 800 and "[ ]" in association embodiment 900. Numeral two is associated with "( ) ( )" in association embodiments 700, 1000 and 1100. Numeral two is associated with "{ }{ }" in association embodiment 800 and "[ ] [ ]" in association embodiment 900. Numeral three is associated with "{ }" in embodiments 1000 and 1100. Numeral five is associated with "[ ]" in embodiment 1100. It should be understood, however, that these are merely examples of symbols that may represent initial non-composite numerals according to association embodiments and that other embodiments within the scope of the claimed subject matter may employ different symbols. As illustrated below, character strings representing remaining natural numerals of an association embodiment may be generated using the aforementioned concatenation and encapsulation operations.

As pointed out above, according to a particular embodiment, in general a concatenation of symbol strings for a concatenation operation results in a symbol string associated with a numeral that is a product of numerals representing respective concatenated symbol strings. However, an exception is that in the particular embodiments illustrated in FIGS. 7 through 11, multiplication of a numeral associated with a symbol string by a factor of two may be represented by the concatenation of a single pair of open and close symbols (e.g., "( )" for embodiments 700, 1000 and 1100, "{ }" for embodiment 800 and "[ ]" for embodiment 900) which in this embodiment represents a tree associated with numeral one. Thus, in these particular association embodiments, multiplication by a power of two, $2^n$, may be expressed as a concatenation of a symbol string comprising a sequence of n such grouping symbol pairs. However, this is merely an example of how a multiplication of numerals by a power of two may be represented as a concatenation of symbol strings and the claimed subject matter is not limited in these respects.

According to embodiment 700 of FIG. 7, an encapsulation operation may comprise providing a symbol string "(xxxxxx)" that is associated with the numeral Q(n) where n is the numeral associated with the symbol string "xxxxxx" according to this particular association embodiment. Accordingly, the symbol string associated with numeral three comprises "(( ))", an encapsulation of the symbol representing the numeral one "( )." The character string representing the numeral six may then be generated by concatenating the symbol strings "( )" (representing multiplication by a factor of two) and "(( ))", and the symbol string representing the numeral nine may be generated by concatenating the symbol strings "(( ))" and "(( ))." An encapsulation of the symbol string associated with numeral two "( )( )" generates a symbol string "(( )( ))" associated with the numeral five. Concatenating the symbol string "( )" then provides a symbol string "( ) (( ) ( ))" associated with the numeral ten. An encapsulation of the symbol string associated with numeral three "(( ))" generates a symbol string "((( )))" associated with the numeral seven. As should be observed, other than the symbol representing numerals one and two, symbol strings associated with non-composite natural numerals may be generated using the encapsulation operation. It should be evident by using the encapsulation and concatenation operations, symbol strings associated with remaining natural numerals may be generated in like fashion. However, these are merely examples of how the aforementioned concatenation and encapsulation operations may be used for generating symbol strings representing numerals and claimed subject matter is not limited in this respect.

It should be evident from the association of symbol strings and numerals illustrated above in embodiment 700 that symbol strings comprising different types of grouping symbols associated with numerals may similarly be generated for embodiments 800 and 900. Here, for example, multiplication of a numeral associated with a symbol string may be represented by concatenating grouping symbol pairs "{ }" or "[ ]" in embodiments 800 and 900, respectively. Also, by defining the symbol strings representing the numeral one ("{ }" in embodiment 800 and "[ ]" in embodiment 900) and two ("{ } { }" in embodiment 800 and "[ ] [ ]" in embodiment 900), symbol strings representing remaining non-composite numerals may be generated using encapsulation operations. Accordingly, concatenation and encapsulation operations in respective embodiments 700, 800 and 900 may be used to generate symbol strings associated with remaining natural numerals. Again, however, these are merely examples of how the aforementioned concatenation and encapsulation operations may be used for generating symbol strings representing numerals and claimed subject matter is not limited in this respect.

The particular embodiments illustrated with reference to FIGS. 7 through 9 are capable of expressing single views of a tree (e.g., trees having unlabeled nodes and/or edges or "unary" trees). Here, for example, symbol strings may comprise a single type of grouping symbol pair to express a single view while multiple types of grouping symbols may enable the expression of multiple views. In this embodiment, operations applied to symbol strings may express a push operation applied to trees and/or merger of trees at a root node, the former by encapsulating the symbol string and the later by concatenating symbol strings associated with the merged trees. Accordingly, the individual embodiments of FIGS. 7 through 9 may be capable of expressing unary trees as a symbol string comprising a single type of grouping symbol pairs. Again, as shall be made clear, the use of multiple types of grouping symbols may enable the expression of multiple views. As illustrated below with reference to FIGS. 10 and 11, for example, the use of two types of grouping symbol pairs (e.g., in one particular embodiment, "( )" and "{ }") in a symbol string enables the expression of both views of a binary tree and the use of three types of grouping symbols (e.g., in another particular embodiment, "( )," "{ }" and "[ ]") in a symbol string enables the expression of all three views of a tertiary tree. Accordingly, by having N types of grouping symbol, a symbol string may express a single view and up to an N number of views.

FIG. 10 is a table illustrating an association of numerals symbol strings comprising grouping symbol pairs "( )," and "{ }" which enables the expression of up to two views. Here, the aforementioned concatenation operation of embodiment 700 also applies in this particular association embodiment. That is, by this convention, multiplication of a numeral associated with a symbol string by a factor of two is represented by a concatenation of the symbol string "( )." Multiplication of numerals associated with other symbol strings may be represented by a concatenation of the symbol strings.

To generate symbol strings associated with non-composite numerals, embodiment 1000 defines two encapsulation operations corresponding with the grouping symbol pairs "( )" and "{ }." In this particular association embodiment, as pointed out above, symbol strings associated with the first three non-composite numerals, one, two and three, comprise "( )," "( )( )" and "{ }," respectively. Again, these are merely examples of symbol strings that may be selected as being associated with numerals one, two and three according to a particular association embodiment, and the claimed subject matter is not limited in these respects. As illustrated in FIG. 10, the symbol string associated with numeral three comprises "{ }," the symbol string associate with the next non-composite numeral, five, comprises "(( ))" and the symbol string associated with the next non-composite numeral, seven, comprises "{( )}." Accordingly, for this particular embodiment, an encapsulation operation on a symbol string associated with a numeral n provides a symbol string associated with a numeral may be defined as follows:

Q(2n)=numeral associated with an encapsulation by "( )" of a symbol string associated with numeral n (where n is a natural numeral greater than 0); and Q(2n+1)=numeral associated with an encapsulation by "{ }" of a symbol string associated with numeral n (where n is a natural numeral greater than or equal to 0).

Figure 12:
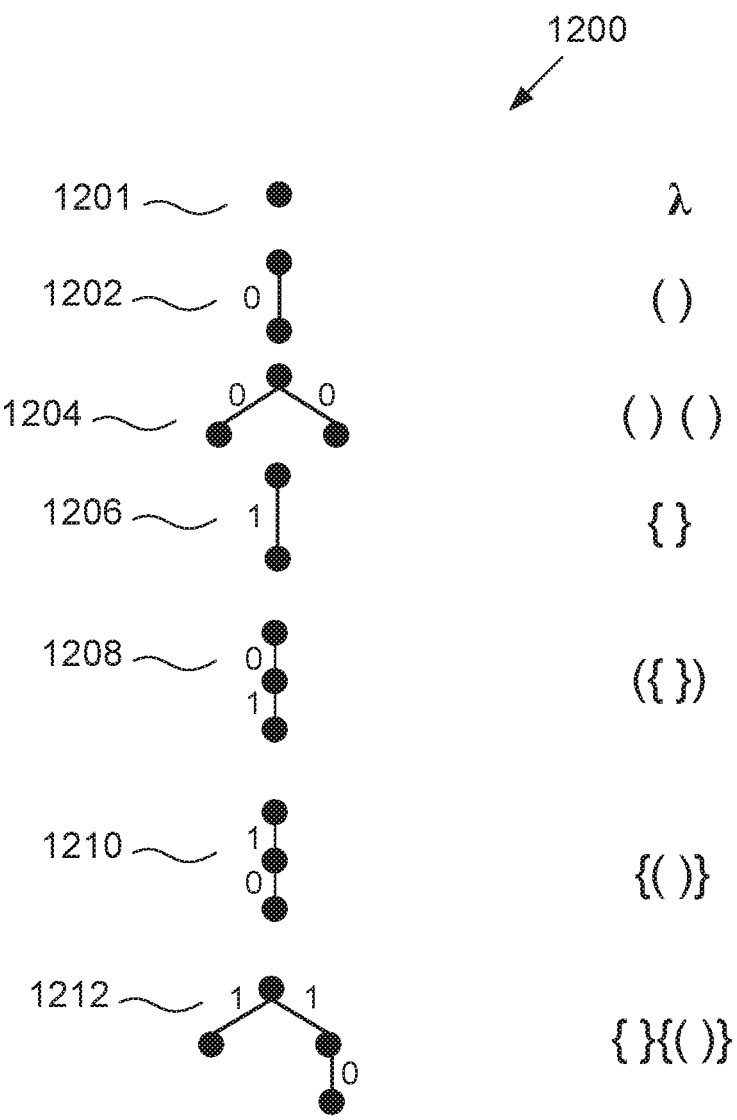
FIGS. 12 and 13 are schematic diagrams of embodiments of relationship between BELTs and symbol strings representing the BELT embodiments.

According to an embodiment, the association embodiment 1000 of FIG. 10 may be used to express a view two tree (e.g., a BELT) as a single string of grouping symbol pairs. In this particular embodiment, "1" and "0" are used to express two views but other distinct labels may be used to express two views. Here, in a particular embodiment, a single node tree may be associated with the grouping symbol pair "( )", which is associated with numeral one. As illustrated in FIG. 12, a single node connected by an edge having a zero label value may be represented as "( )" and a single node connected by an edge having a one label may be represented as "{ }." Encapsulation by "( )" of the symbol string associated with tree 1206 provides a symbol string "({ })" associated with tree 1208 and corresponding to a zero-push operation on tree 1206. Similarly, encapsulation by "{ }" of the symbol string associated with tree 1202 provides a symbol string "{( )}" which is associated with tree 1210 and corresponding to a one-push operation on tree 1202. Accordingly, there is a one-to-one correspondence between push operations on BELTs and encapsulation operations on corresponding symbol strings.

Tree 1202, associated with symbol string "( )" and numeral one in the presently illustrated association embodiment, may be merged with itself to form tree 1204 which is associated with the numeral two and a concatenation of the grouping symbol pair "( )" and symbol string "( ) ( )." Accordingly, concatenation of the symbol pair "( )" to a symbol string corresponds with a merger of tree 1202 with a tree corresponding to the symbol string. Similarly, tree 1206 associated with grouping symbol pair "{ }" may be merged with tree 1210 associated with symbol string "{( )}" to provide tree 1212. Here, the resulting tree 1212 is associated with the concatenation of the grouping symbol pair "{ }" and symbol string "{( )}." Accordingly, there is a one-to-one correspondence between merger operations on BELTs and concatenation operations on symbol strings in the presently illustrated association embodiment.

Figure 13:
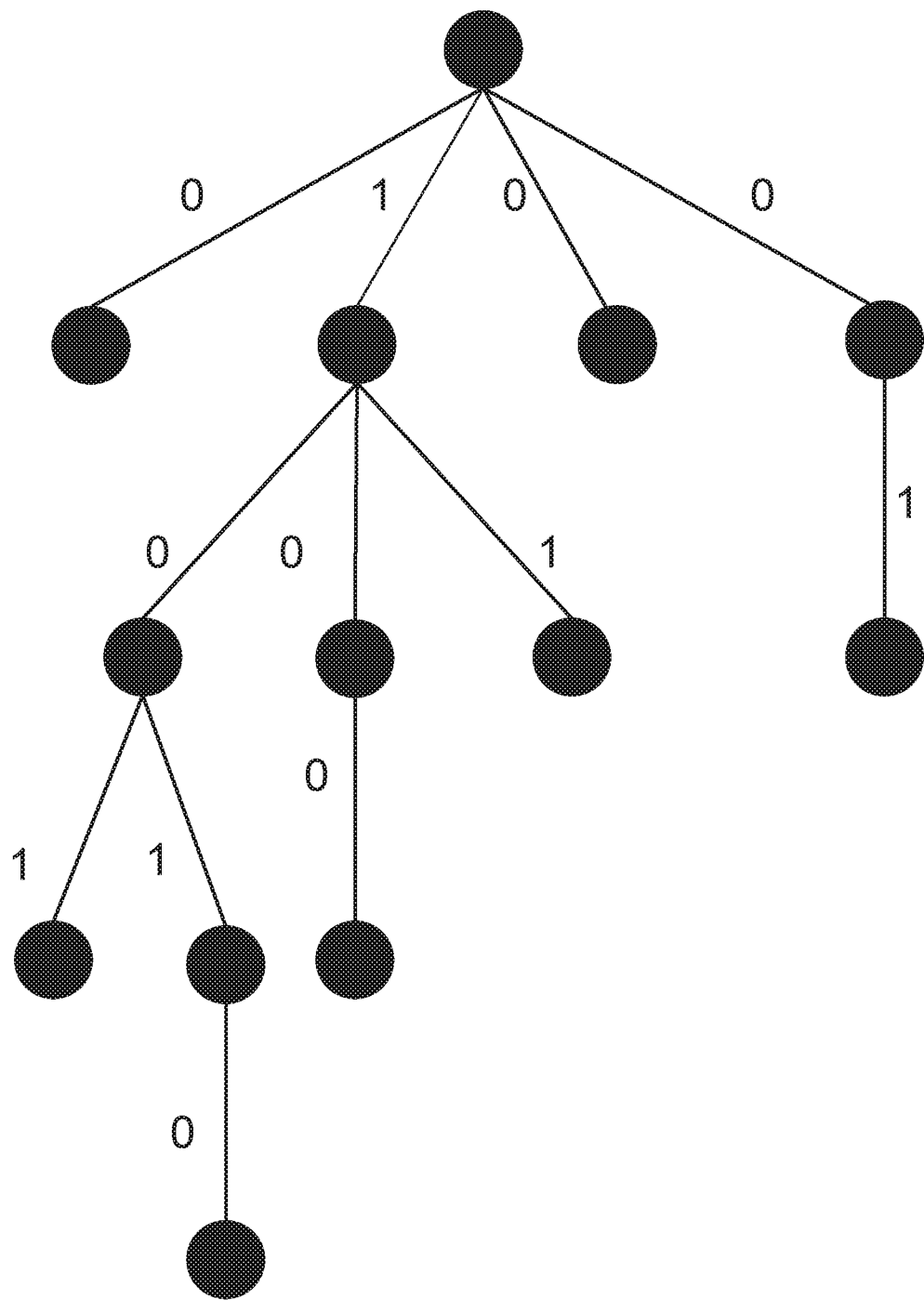

Using the same association of BELTs and symbol strings comprising grouping symbol pairs "( )" and "{ }" illustrated above with reference to FIG. 12, applying concatenation operations to symbol strings to represent associated tree merger operations on trees and applying encapsulation operations to symbol strings to represent associated push operations, any BELT may be transformed to a string of grouping symbol pairs. An additional example of such a transformation is shown in FIG. 13. As illustrated in this particular association embodiment, there exists a corresponding symbol string for any BELT and there exists a corresponding BELT for every symbol string formed according to embodiment 1000. Accordingly, such BELTs and symbol strings comprise elementary equivalents.

FIG. 11 shows a schematic diagram of an association of numerals and symbol strings comprising symbol pairs "( )," "{ }," and "[ ]." Here, the aforementioned concatenation operation of embodiment 700 also applies. That is, multiplication of a numeral associated with a symbol string by a factor of two is represented by a concatenation of the symbol string "( )." Multiplication of numerals associated with other symbol strings may be represented by a concatenation of the symbol strings.

To generate symbol strings associated with non-composite numerals, embodiment 1100 defines three encapsulation operations corresponding with the encapsulation symbol pairs "( )," "{ }" and "[ ]." In this particular association embodiment, symbol strings associated with the first four non-composite numerals, one, two, three and five comprise"( )", "( )( )," "{ }" and "[ ]," respectively. However, these are merely examples of symbol strings that may be selected as being associated with the first four non-composite numerals and the claimed subject matter is not limited in these respects. Three encapsulation operations may be used to generate symbol strings corresponding to non-composite numerals of seven or greater in an alternating fashion. As illustrated in FIG. 11, the symbol strings associated with the non-composite numerals seven, eleven and thirteen comprise "(( ))," "{( )}" and "[( )]," respectively. Accordingly, for this particular embodiment, encapsulation operation on a symbol string associated with a numeral n provides a symbol string associated with a numeral may be defined as follows:

Q(3n)=numeral associated with an encapsulation by "( )" of a symbol string associated with numeral n (where n is a natural numeral greater than 0);

Q(3n+1)=numeral associated with an encapsulation by "{ }" of a symbol string associated with numeral n (where n is a natural numeral greater than or equal to 0); and Q(3n+2)=numeral associated with an encapsulation by "[ ]" of a symbol string associated with numeral n (where n is a natural numeral greater than or equal to 0).

Figure 14:
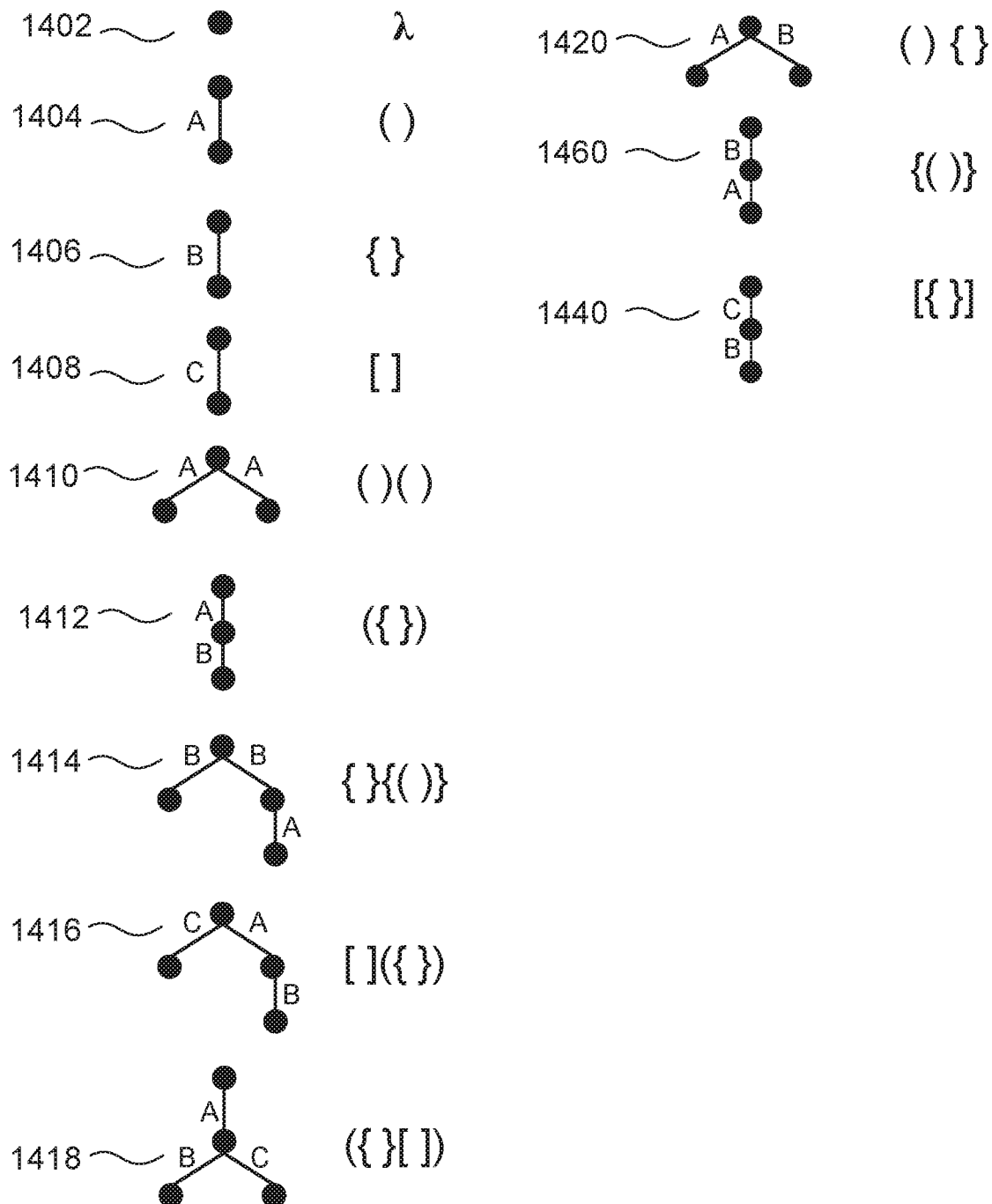
FIGS. 14 and 15 are schematic diagrams of embodiments of edge labeled trees and symbol strings representing the tree embodiments.

According to an embodiment, the association embodiment 1100 of FIG. 11 may be used to express a view three tree as a single string of grouping symbol pairs. Here, in this particular embodiment, by convention, a single node tree may be associated with the grouping symbol pair "( )", which is associated with numeral one. FIG. 14 is a schematic diagram illustrating an association of tertiary trees and symbol strings according to an association embodiment. In this particular embodiment, edges may be associated with a label value of A, B or C. However, these are merely examples of labels that may be used to express three views and that any other distinguishable three labels may be used. Here, a single node connected by an edge having a label value A may be represented as "( )," a single node connected by an edge having a label value B may be represented as "{ }"and a single node connected by an edge having a label value C may be represented as" [ ]." Encapsulation by "( )" of the symbol string associated with tree 1404 provides a symbol string "({ })" associated with tree 1208 and corresponding to an A-push operation on tree 1412. Similarly, encapsulation by "{ }" of the symbol string associated with tree 1404 provides a symbol string "{( )}" associated with tree 1430 and corresponding to a B-push operation on tree 1404. In yet another example, encapsulation by "[ ]" of the symbol string associated with tree 1406 provides a symbol string "[{ }]" associated with tree 1440 and corresponding to a C-push operation on tree 1440. Accordingly, there is a one-to-one correspondence between push operations on A, B, C edge labeled tertiary trees and encapsulation operations on corresponding symbol strings.

Tree 1404, associated with symbol string "( )" and numeral one in the presently illustrated association embodiment, may be merged with itself to form tree 1410 which is associated with the numeral two and a concatenation of the grouping symbol pair "( )" with itself. Accordingly, concatenation of the symbol pair "( )" to a symbol string corresponds with a merger of tree 1404 with a tree corresponding to the symbol string. Similarly, tree 1406 associated with grouping symbol pair "{ }" may be merged with tree 1430 associated with symbol string "{( )}" to provide tree 1414. Here, the resulting tree 1414 is associated with a symbol string comprising a concatenation of the grouping symbol pair "{ }" and symbol string "{( )}." In another example, tree 1408 associated with grouping symbol pair "[ ]" may be merged with tree 1412 associated with symbol string "({ })" to provide tree 1416. Here, the resulting tree 1416 is associated with a symbol string comprising a concatenation of the grouping symbol pair "[ ]" and symbol string "({ })." Accordingly, there is a one-to-one correspondence between merger operations on A, B, C edge labeled tertiary trees and concatenation operations on symbol strings in the presently illustrated association embodiment.

Figure 15:
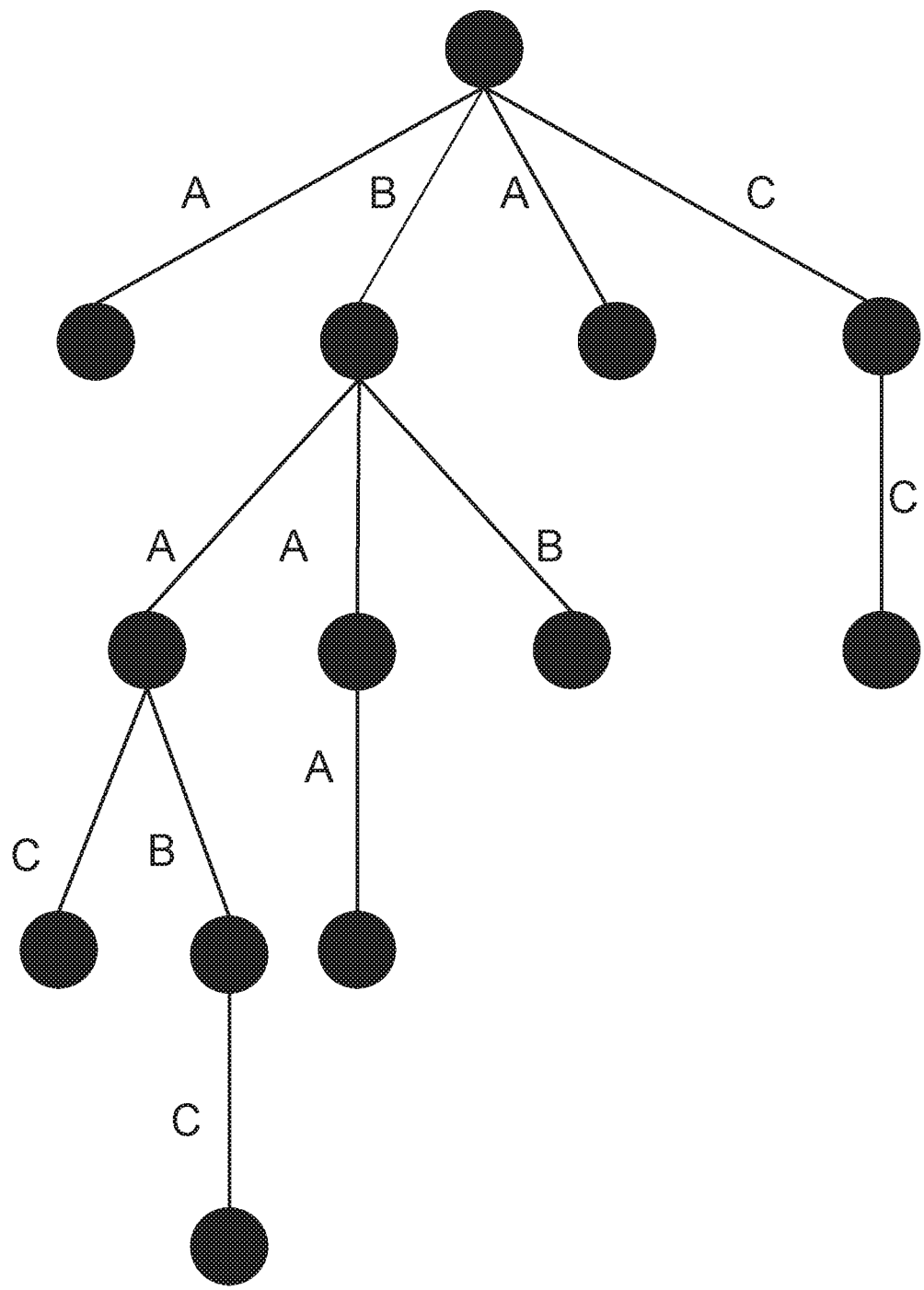

Using the same association of A, B, C edge labeled tertiary trees and symbol strings comprising grouping symbol pairs "( )," "{ }" and "[ ]" illustrated above with reference to FIG. 14, applying concatenation operations on symbol strings to represent associated merger operations on trees and applying encapsulation operations on symbol strings to represent associated push operations, any A,B,C edge labeled tertiary tree may be transformed to a string of grouping symbol pairs and vice-versa. An additional example of such a transformation is shown in FIG. 15. As illustrated in this particular association embodiment 1100, as illustrated above with BELTs in embodiment 1000, there exists a corresponding symbol string for any A,B,C edge labeled tertiary tree and there exists a corresponding A,B,C edge labeled tertiary tree for every symbol string formed according to this particular association embodiment. Accordingly, such A,B,C edge labeled trees and symbol strings comprise elementary equivalents.

As discussed above operations and/or manipulations applied to symbol strings may be related to "arithmetic operations" applied to the numerals that correspond with the manipulated symbol strings. One example above, in a particular embodiment, illustrates that the dyadic concatenation operation applied to symbol strings relates to a dyadic multiplication operation on numerals representing the concatenated symbol strings. Another example above, according to a particular embodiment, illustrates that the monadic encapsulation operation on symbol strings relates to a monadic operation applied to numerals representing the encapsulated symbol strings to provide corresponding non-composite numerals. However, these are merely examples of arithmetic operations that may correspond with manipulations of and/or operations applied to symbol strings, and claimed subject matter may include other such arithmetic operations.

As discussed above in connection with embodiments 1000 and 1100, for a symbol string formed according to the corresponding association embodiment there exist a unique numeral and/or tree (here, a BELT or labeled tertiary tree in these particular examples). Accordingly, these relationships and/or associations among symbol strings, numerals and/or trees provide various associations between numerals and trees. Here, numerals associated with symbol strings in association embodiments 1000 and 1100 may also be associated with the trees associated with the symbol strings. Therefore, these numerals and trees associated with the symbol strings themselves form an associations of trees and numerals according to particular association embodiments.

The embodiments of FIGS. 10 and 11 illustrate that using multiple types of grouping symbol pairs, a symbol string may represent multiple views of a tree. Also, the embodiments of FIGS. 7 through 11 employ arbitrarily chosen grouping symbol pairs. It should be understood that other grouping symbol pairs may be formed from character pairs (ASCII or otherwise) that distinguish between open and close symbols such as, for example, "< >," "\/," "$ %," "! @," "T t," "A a," etc., and that claimed subject matter is not limited in this respect. Also, it should be understood that such symbols may comprise more than one character if desired. Referring to the embodiments of FIGS. 4 and 5, for example, an encapsulation operation may be expressed using an open symbol "A(", "B(", "C(" or "D(" comprising two characters and followed by a close symbol ")".

Also, it should be understood that the grouping symbol pairs employed in the particular embodiments illustrated herein are chosen to be perceivable by human inspection for the purposes of illustrating particular examples of the claimed subject matter. However, it should be understood that the claimed subject matter is also directed to the use of grouping symbols that are not perceivable by human inspection including, for example, grouping symbols that are encoded in magnetic, optical, semiconductor and/or radio frequency energy mediums, or any other type of media capable of expressing information.

While particular embodiments illustrated herein show particular types of label values as being associated with edges connecting nodes, edge label values for other embodiments may not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to edge labeled trees, for example. However, again, this is provided for purposes of explanation and/or illustration. The claimed subject matter is not limited in scope to employing the approach of the previously referenced provisional patent application.

Thus, according to an embodiment, it may be desirable to transform between a tree and a symbol string for storing in a storage medium and/or processing in a computer platform, for example. If such a tree has a particular view, the symbols of such a string may also be chosen to express information for that view. In one embodiment, symbol strings comprising grouping symbol pairs such as "( )", "{ }" and "[ ]" may express trees as previously described. In the embodiment of FIG. 5, for example, encapsulation of a symbol string representing a tree by a grouping symbol pair "( )", "{ }" or "[ ]" may provide a symbol string representing an A-push, B-push or C-push applied to the tree. Accordingly, multiple views of a tree may be expressed by using corresponding multiple types of grouping symbol pairs. A merger of trees at a root node may be expressed by concatenating symbol strings representing the merged trees.

Particular embodiments distinguish among grouping symbol pair "types" to express corresponding multiple views of trees. In the embodiments of FIGS. 7 through 9, for example, a single grouping symbol type is used to express trees of view one. In the embodiment of FIG. 10, employing two grouping symbol pair types "( )" and "{ }", on the other hand, it is possible to express trees of view two. In the embodiment of FIG. 11, employing three grouping symbol pair types "( )", "{ }" and "[ ]", it is possible to express trees of view three. Other embodiments within the scope of the claimed subject matter may also be directed to the use of four or more grouping symbol pair types to express views of higher value trees.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. A method of converting signal values for a first expression for more convenient processing and/or storage, the method comprising:
accessing instructions from one or more physical memory devices for execution by one or more processors;
executing the instructions accessed from the one or more physical memory devices by the one or more processors;
storing, in at least one of the physical memory devices, signal values resulting from having executed the accessed instructions on the one or more processors, wherein the one or more physical memory devices are also to store a database, or a portion thereof;
wherein the accessed instructions transform the database, or the portion thereof, to one or more first expressions in a second view;
wherein the executing the database transformation instructions comprises:
accessing, from the at least one of the physical memory devices, signal values for the first expression in a first view;
transforming the signal values for the first expression in the first view to signal values for the first expression in the second view,
wherein the signal values for the first expression in the second view comprise the following: content accessed from the database, or the portion thereof, transformed to the form of a hierarchical edge and/or a hierarchical node labeled tree;
wherein the signal values for the first expression in the first view comprise at least a symbol value designating the content accessed from the database, or the portion thereof; and
storing, in the memory, the signal values corresponding to the first expression in the second view, wherein the signal values after the transformation correspond to and/or designate the content accessed from the database, or the portion thereof.

2. The method of claim 1, comprising, after the transforming, performing operations with respect to the signal values for the first expression in the second view that comprise the content accessed from the database, or the portion thereof.

3. The method of claim 1, comprising, prior to the transforming, employing operations with respect to the signal values for the first expression in the first view that comprise at least the symbol value designating the content to be accessed from the database, or the portion thereof.

4. The method of claim 1, wherein the at least a symbol value comprises at least a numerical symbol value.

5. An apparatus comprising:
one or more processors that are coupled to one or more physical memory devices, the one or more physical memory devices are to store executable instructions and are to store binary digital signal quantities, as physical memory states, wherein the executable instructions are accessible from the one or more physical memory devices for execution by the one or more processors;

wherein the one or more processors are able to store in at least one of the physical memory devices, binary digital signal quantities, if any, that are to result from execution of the instructions on the one or more processors, wherein the one or more physical memory devices are also to store a database, or a portion thereof, wherein the executable instructions are to transform the database, or the portion thereof, to one or more first expressions in a second view;

wherein the database transformation instructions are to:

access, from the at least one of the physical memory devices, signal values for the first expression in the first view; and transform the signal values for the first expression in the first view to signal values for the first expression in the second view;

wherein the signal values for the first expression in the second view are to comprise: content to be accessed from the database, or the portion thereof, and to be transformed to the form of a hierarchical edge and/or a hierarchical node labeled tree;

wherein the signal values for the first expression in the first view are to comprise at least a symbol value to designate the content to be accessed from the database, or the portion thereof; and store, in the one or more physical memory devices, the signal values to correspond to the first expression in the second view, wherein the signal values after the transformation are to correspond to and/or to designate the content to be accessed from the database, or the portion thereof.

6. The apparatus of claim 5, wherein the database transformation instructions, after the transformation, are to perform operations with respect to the signal values for the first expression in the second view to comprise the content to be accessed from the database, or the portion thereof.

7. The apparatus of claim 5, wherein the database transformation instructions, prior to the transformation, are to employ operations with respect to the signal values for the first expression in the first view to comprise at least the symbol value to designate the content to be accessed from the database, or the portion thereof.

8. The apparatus of claim 5, wherein the at least a symbol value is to comprise at least a numerical symbol value.

9. An article comprising:

a non-transitory storage medium that includes executable instructions stored thereon; wherein the instructions are executable by one or more processors to be coupled to one or more physical memory devices, the one or more physical memory devices are to store instructions, including the executable instructions, and are to store binary digital signal quantities, as physical memory states, wherein the executable instructions are accessible from the one or more physical memory devices for execution by the one or more processors;

wherein the one or more processors are able to store in at least one of the physical memory devices, binary digital signal quantities, if any, that are to result from execution of the instructions on the one or more processors, wherein the one or more physical memory devices are also to store a database, or a portion thereof, wherein the executable instructions are to transform the database, or the portion thereof, to one or more first expressions in a second view;

wherein the database transformation instructions are to:

access, from the one or more physical memory devices, signal values for a first expression in a first view;

transform the signal values for the first expression in the first view to signal values for the first expression in the second view;

wherein the signal values for the first expression in the second view are to comprise: content to be accessed from the database, or the portion thereof, and to be transformed to the form of a hierarchical edge and/or a hierarchical node labeled tree;

wherein the signal values for the first expression in the first view are to comprise at least a symbol value to designate the content to be accessed from the database, or the portion thereof; and store, in the one or more physical memory devices, the signal values to correspond to the first expression in the second view, wherein the signal values after the transformation are to correspond to and/or to designate the content to be accessed from the database, or the portion thereof.

10. The article of claim 9, wherein the database transformation instructions, after the transformation, are to perform operations with respect to the signal values for the first expression in the second view to comprise the content to be accessed from the database, or the portion thereof.

11. The article of claim 9, wherein the database transformation instructions, prior to the transformation, are to employ operations with respect to the signal values for the first expression in the first view to comprise at least the symbol value to designate the content to be accessed from the database, or the portion thereof.

12. The article of claim 9, wherein the at least a symbol value is to comprise at least a numerical symbol value.

13. A method of converting signal values for a first expression for more convenient processing and/or storage, the method comprising:

accessing instructions from one or more physical memory devices for execution by one or more processors;

executing the instructions accessed from the one or more physical memory devices by the one or more processors;

storing, in at least one of the physical memory devices, signal values resulting from having executed the accessed instructions on the one or more processors, wherein the one or more physical memory devices also store a database, or a portion thereof;

wherein the executed instructions transform the database, or the portion thereof, to one or more second expressions having a second expression type;

wherein the executing the database transformation instructions comprises:

accessing, from the one or more physical memory devices, signal values for a first expression, wherein the signal values for the first expression comprise one or more symbol values designating content to be accessed from the database, or the portion thereof;

transforming the signal values for the first expression to signal values for the second expression, the first expression having a first expression type and the second expression having the second expression type;

the second and first expression types comprising at least one of the following expression types: a hierarchical edge labeled tree and/or a hierarchical node labeled tree; and storing, in the one or more physical memory devices, the signal values corresponding to the second expression having the second expression type, wherein the signal values after the transformation correspond to the content designated to be accessed from the database, or the portion thereof.

14. The method of claim 13, comprising, after the transforming, performing operations with respect to the signal values for the second expression having the second expression type, which comprises the content accessed from the database, or the portion thereof.

15. The method of claim 13, comprising, prior to the transforming, employing operations with respect to the signal values for the first expression having the first expression type, which comprises one or more symbol values designating the content to be accessed from the database, or the portion thereof.

16. The method of claim 13, wherein the one or more symbol values comprise one or more numerical symbol values.

17. An apparatus, comprising:
one or more processors that are coupled to one or more physical memory devices, the physical memory devices are to store executable instructions and are to store binary digital signal quantities, as physical memory states, wherein the executable instructions are accessible from the one or more physical memory devices for execution by the one or more processors;
wherein the one or more processors are able to store in at least one of the physical memory devices, binary digital signal quantities, if any, that are to result from execution of the instructions on the one or more processors, wherein the one or more physical memory devices are also to store a database, or a portion thereof, wherein the executable instructions are to transform the database, or the portion thereof, to one or more second expressions to have a second expression type;
wherein the database transformation instructions are to:
access, from the one or more physical memory devices, signal values for a first expression, the signal values for the first expression are to comprise one or more symbol values to designate content to be accessed from the database, or the portion thereof;
transform the signal values for the first expression to signal values for the second expression, the first expression to have a first expression type and the second expression to have the second expression type;
the second and first expression types to comprise at least one of the following expression types: a hierarchical edge labeled tree and/or a hierarchical node labeled tree; and
store, in the memory, the signal values corresponding to the second expression to have the second expression type, wherein the signal values after the transformation are to correspond to the content designated to be accessed from the database, or the portion thereof.

18. The apparatus of claim 17, wherein the database transformation instructions to transform the signal values, after the transformation, perform operations with respect to the signal values for the second expression to have the second expression type, which are to comprise the content to be accessed from the database, or the portion thereof.

19. The apparatus of claim 17, wherein the database transformation instructions to transform the signal values to, prior to the transformation, perform operations with respect to the signal values for the first expression to have the first expression type, which are to comprise at least the one or more symbol values to designate the content to be accessed from the database, or portion thereof.

20. The apparatus of claim 17, wherein the one or more symbol values are to comprise one or more numerical symbol values.

21. An article comprising:
a non-transitory storage medium that includes executable instructions stored thereon; wherein the instructions are executable by one or more processors to be coupled to one or more physical memory devices, the one or more physical memory devices are to store instructions, including the executable instructions, and are to store binary digital signal quantities, as physical memory states, wherein the executable instructions are to be accessible from the one or more physical memory devices for execution by the one or more processors;
wherein the one or more processors are able to store in at least one of the physical memory devices, binary digital signal quantities, if any, that are to result from execution of the instructions on the one or more processors, wherein the one or more physical memory devices are also to store a database, or a portion thereof, wherein the executable instructions are to transform the database, or the portion thereof, to one or more second expressions to have a second expression type;
wherein the database transformation instructions are to:
access, from the one or more physical memory devices, signal values for a first expression, wherein the signal values for the first expression are to comprise one or more symbol values to designate content to be accessed from the database, or the portion thereof;
transform the signal values for the first expression to signal values for the second expression, the first expression to have a first expression type and the second expression to have the second expression type;
the second and first expression types to comprise at least one of the following expression types: a hierarchical edge labeled tree and/or a hierarchical node labeled tree; and
store, in the memory, the signal values corresponding to the second expression to have the second expression type, wherein the signal values after the transformation are to correspond to the content designated to be accessed from the database, or the portion thereof.

22. The article of claim 21, wherein the database transformation instructions to transform the signal values, after the transformation, are to perform operations with respect to the signal values for the second expression to have the second expression type, which are to comprise the content to be accessed from the database, or the portion thereof.

23. The article of claim 21, wherein the database transformation instructions to transform the signal values, prior to the transformation, are to perform operations with respect to the signal values for the first expression having the first expression type, which are to comprise at least the one or more symbol values to designate the content to be accessed from the database, or the portion thereof.

24. The article of claim 21, wherein the one or more symbol values are to comprise one or more numerical symbol values.

* * * * *